Sept. 25, 1956 W. V. GOODHUE ET AL 2,764,362

WINDING MACHINE

Filed April 26, 1951 18 Sheets-Sheet 1

Inventors:
William V. Goodhue
and Frank W. Higgins
By [signature]
Attorneys.

Inventors:
William V. Goodhue
and Frank W. Higgins
By [signature]
Attorneys.

Inventors:
William V. Goodhue
and Frank W. Higgins
By [signature]
Attorneys.

WINDING MACHINE

Filed April 26, 1951 18 Sheets-Sheet 4

Inventors:
William V. Goodhue
and Frank W. Higgins
By [signature]
Attorneys.

Inventors:
William V. Goodhue
and Frank W. Higgins
By [signature]
Attorneys.

Sept. 25, 1956 W. V. GOODHUE ET AL 2,764,362

WINDING MACHINE

Filed April 26, 1951 18 Sheets-Sheet 6

Inventors:
William V. Goodhue
and Frank W. Higgins
By [signature]
Attorneys.

Sept. 25, 1956 W. V. GOODHUE ET AL 2,764,362

WINDING MACHINE

Filed April 26, 1951 18 Sheets-Sheet 7

Inventors:
William V. Goodhue
and Frank W. Higgins
By [signature]
Attorneys.

Inventors:
William V. Goodhue
and Frank W. Higgins
By [signature]
Attorneys.

Sept. 25, 1956 W. V. GOODHUE ET AL 2,764,362

WINDING MACHINE

Filed April 26, 1951 18 Sheets-Sheet 9

Inventors:
William V. Goodhue
and Frank W. Higgins
By [signature]
Attorneys.

Inventors:
William V. Goodhue
and Frank W. Higgins
By [signature]
Attorneys.

Sept. 25, 1956 W. V. GOODHUE ET AL 2,764,362

WINDING MACHINE

Filed April 26, 1951 18 Sheets-Sheet 11

Inventors:
William V. Goodhue
and Frank W. Higgins
By [signature]
Attorneys.

Inventors:
William V. Goodhue
and Frank W. Higgins
By [signature]
Attorneys.

WINDING MACHINE

Inventors:
William V. Goodhue
and Frank W. Higgins
By [signature]
Attorneys.

Inventors:
William V. Goodhue
and Frank W. Higgins
By [signature]
Attorneys.

WINDING MACHINE

Filed April 26, 1951 18 Sheets-Sheet 15

Inventors:
William V. Goodhue
and Frank W. Higgins
By [signature]
Attorneys.

Inventors:
William V. Goodhue
and Frank W. Higgins
By [signature]
Attorneys.

Inventors:
William V. Goodhue
and Frank W. Higgins
By [signature]
Attorneys.

WINDING MACHINE

Inventors:
William V. Goodhue
and Frank W. Higgins
By [signature]
Attorneys.

2,764,362

WINDING MACHINE

William V. Goodhue, Warwick, and Frank W. Higgins, Cranston, R. I., assignors to Universal Winding Company, Boston, Mass., a corporation of Massachusetts Application April 26, 1951, Serial No. 223,022

32 Claims. (Cl. 242—35.6)

This invention relates to winding machines for winding yarn or like strandular materials into cops, cones and other forms of packages.

In the present specification and claims the term "yarn" is used in a general sense to designate all types of attenuated materials and the term "package" is employed for convenience of description to apply to any usual form of wound mass.

In general, the object of the invention is to provide a fully automatic winding machine, requiring practically no attention on the part of the operator during its normal operation except to remove the fully wound packages and apply cop-tubes or other yarn-carriers to the holders therefor.

Another object of the invention is to provide a winding unit adapted to be assembled in multiple on a bed or other support to form a gang machine with each unit complete in itself as regards the automatic mechanism, such as end-finding means and knot-tying means for uniting the end on the package with an end from the supply when the yarn feeding to the package breaks or its supply is exhausted.

Another object is to provide a machine of the type indicated having automatically-operated means for detecting breakage of the winding yarn strand and means actuated thereby for retrieving the broken end of the supply yarn and the end of the yarn on the winding package and uniting the two ends to continue the winding operation.

Another object is to provide a machine of the type indicated with end-finding means for selectively retrieving the end of the yarn from one of a plurality of supply bobbins, either the broken end from the previously-delivering bobbin when a supply still remains thereon, or the end from a "spare" or reserve bobbin when the yarn on the first bobbin is exhausted, and automatically uniting one of said ends with the end on the winding package.

Another object is to provide means for repeating the operation of the end-finding means and knot-tying means if their initial operation fails to properly unite the two ends of the yarn so as to insure against misses in the automatic servicing of the winding machine.

Another object is to provide in a winding machine means for finding the end on the winding package and separate means for retrieving the end from the supply bobbin with control means for automatically operating said end-finding means and knot-tying means conjointly to unite said ends.

Another object is to provide means for rotating the winding package in reverse direction during the end-finding operation thereon with suction-means for withdrawing the end therefrom and other suction-means for selectively taking the end from one of the supplies and thereafter transferring both ends to the knot-tier to unite the ends for continuing delivery of the yarn to the winding package.

Another object is to provide a machine of the type indicated having a relatively stationary suction-nozzle for retrieving the end on the package with mechanical means for taking the end therefrom and transferring it to the knot-tier.

Another object is to provide a suction-nozzle movable to take the end from one of the supplies and carry it to the knot-tier with means for shifting the end from the reserve bobbin into position to be grasped by said suction-nozzle when the yarn from the previously-delivering bobbin is exhausted.

Another object is to provide a machine of the type indicated having means for automatically holding the spare end from a reserve bobbin and placing said end in the tension-device when the yarn on the previously-delivering bobbin is exhausted.

Another object is to provide in a machine of the type indicated means for opening the tension-device to receive the new end and means for opening the slub-catchers.

Another object is to provide in a machine of the type indicated means for applying jets of air to the tension-device and slub-catchers as they are opened whereby to remove the lint, fluff or other foreign particles therefrom and valve-means for automatically operating the jets.

Another object is to provide a multiple spindle or gang machine with the winding units substantially complete in themselves as regards the automatically-operated control-mechanism and capable of being individually removed from the gang for repair or replacement without interfering with the operation of the units remaining in place in the gang.

Further objects of the invention are set forth in the following specification which describes a preferred form of construction of the winding machine by way of example as illustrated by the accompanying drawings. In the drawings.

The present invention is herein shown and described as embodied in a winding machine of the drum-driven type in which the winding package is driven by surface contact with a rotating drum or drive-roll, preferably a grooved traversing roll for distributing the yarn on the package. It is to be understood, however, that the invention is also applicable to use with other types of winding units, for example, precision winders in which the package is rotated by a positively-driven spindle and the yarn distributed thereon by a reciprocating traversing guide.

*Main elements of the winding unit*

The present embodiment of the invention comprises, in general, a winding unit embodying a helically grooved drive-roll for rotating the package by peripheral contact therewith and simultaneously traversing the yarn longitudinally thereof; a winding spindle carrying a rotary mandrel or holder for the cop-tube or other package-core; and means for movably supporting the winding spindle to adapt the package to contact with the periphery of the drive-roll and permit the package-core to recede therefrom as the yarn builds up on the core. These main elements are common to machines of the drum-driven type and, in addition thereto, the present winding unit includes a tension-device for tensioning the yarn feeding to the winding package; a pair of slub-catchers for cleaning the yarn as it feeds from the tension-device; means for guiding the yarn through the tension-device and slub-catchers to the winding package; an automatic knot-tier; means for holding the end of the yarn from a reserve supply bobbin; means for shifting said reserve end and applying it to the tension-device; a stationary suction-nozzle for retrieving the broken end from the package with ejector-means for transferring the end to the knot-tier; and a movable suction-nozzle for selectively taking one or the other end from the tension-assembly and carrying it to the knotter for uniting it to the end on the package.

*General arrangement of the gang machine*

Figure 1:
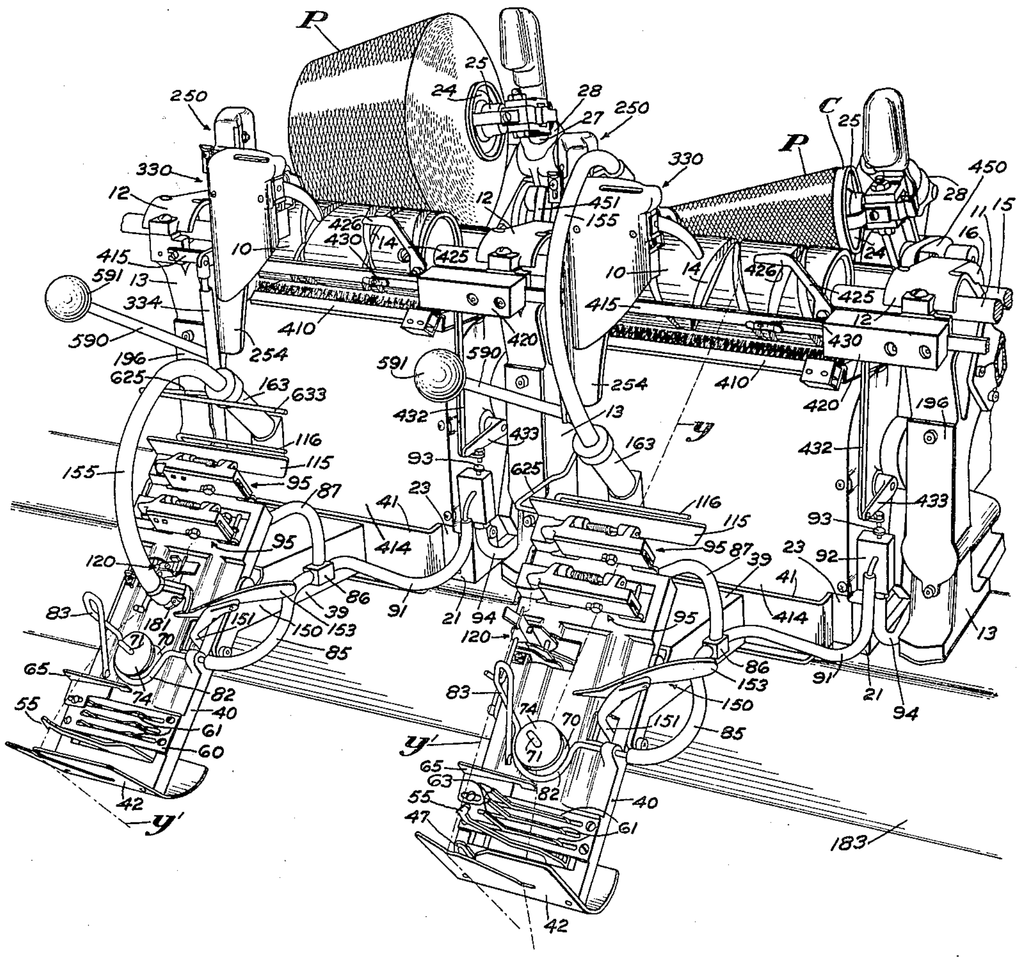
Fig. 1 is a perspective view illustrating two of the winding units of a gang machine shown in their operative relationship and mounted on a bed which may be supported from the floor by suitable standards or legs.

Referring particularly to Fig. 1, the individual winding units may be arranged in any suitable number, for example six, spaced along each side of the bed 2. The bed 2 may be constructed of angle-irons or plates to provide a frame-work supported from the floor. A drive-shaft 5, Figs. 2 and 4, extends the whole length of the machine, being journaled in suitable bearings 6 fastened to the bed 2. Power-transmission means are enclosed in a casing, not shown, at the head end of the gang machine with power taken from a suitable source such as an electric motor within the casing. A series of drive-rolls 10 are mounted fast on a horizontal shaft 11 that extends longitudinally of the gang and is driven continuously from the power-transmission means in the end casing with the rolls disposed in spaced relationship corresponding to the spacing of the winding spindles of the several units. The roll-shaft 11 is journaled in bearings 12 on a plurality of spaced brackets 13 rising from the bed 2.

A second horizontal shaft 15, constituted as a "reverse-roll," is also journaled in stationary bearings 16 on the several brackets 13. The reverse-roll shaft 15 is likewise driven continuously from the power-transmission means in the casing at the head end of the gang machine, being rotated in the opposite direction from that of the drive-roll shaft 11. The reverse-roll shaft 15 is at the rear of the drive-roll shaft 11, see Figs. 2 and 4, and arranged slightly therebelow in position to adapt the winding package to be transferred into peripheral engagement therewith for rotating it therefrom in a direction opposite to its rotation during the winding of the package. It thus will be understood that when the package P is transferred into surface contact with the reverse-roll shaft 15 it will be driven in a direction to unwind the yarn to assist in drawing off the broken end from the package by means of the stationary suction-nozzle shown in Figs. 17 and 18 and later described. With the exception of the two continuously driven shafts 11 and 15, the parts of the winding mechanism, end-finding means, knot-tier, tension-assembly, and certain other elements are supported from a U-shaped frame 20 comprising a base 21 and upstanding side walls 22 and 23, see Figs. 2, 4 and 63.

*The winding unit*

As herein illustrated, each winding unit of the machine is adapted for winding a conical package rotated by surface contact with its respective drive-roll 10; each drive-roll being formed with helical grooves 14 extending in opposite directions and crossing each other which receive the strand of yarn and traverse it from end to end of the package in a manner well known to those versed in the art. The packages or cones P are wound on conical paper tubes C that serve as cores for supporting the yarn mass. The cop-tubes or cores C are suitably held on winding mandrels or cop-holders 24, each rotatably mounted on a winding spindle 25 supported by a pivoted arm 26. The support or pivoted arm 26 for the cop-holder 24 may be of usual construction having an extension rod 27, see Fig. 2, rotatably held in a bearing 28 pivoted on a stud-shaft 29 to adapt the arm to swing upwardly and permit the winding spindle to recede from the drive-roll 10 during the building of the package on the cop-tube C. The stud-shaft 29 is supported at the end of a link 30 fixedly mounted on the end of a shaft 31 extending through bearings in the sides 22 and 23 of the frame 20, see Figs. 2 and 4. The extension rod 27 is adapted to turn in its bearing 28 to allow the winding spindle 25 to tilt or cant with respect to the axis of the drive-roll 10 so that as the taper of the package changes during the winding its surface will be maintained in full contact with the periphery of the roll. The bearing 28 is mounted fast on a sleeve 33 which is rotatable on the stud-shaft 29, see Fig. 3. The sleeve 33 fits snugly in an axial bore 34 in the bearing 28 and the bearing is clamped to the sleeve by means of a pair of slidable plug-like bushings 35 in a transverse bore which are drawn together by a screw 36. The adjacent ends of the bushings 35 are milled with concavities for engaging frictionally with the periphery of the sleeve 33 to clamp the bearing 28 thereto when the screw 36 is tightened.

*Tension-assembly*

Figures 4, 5:
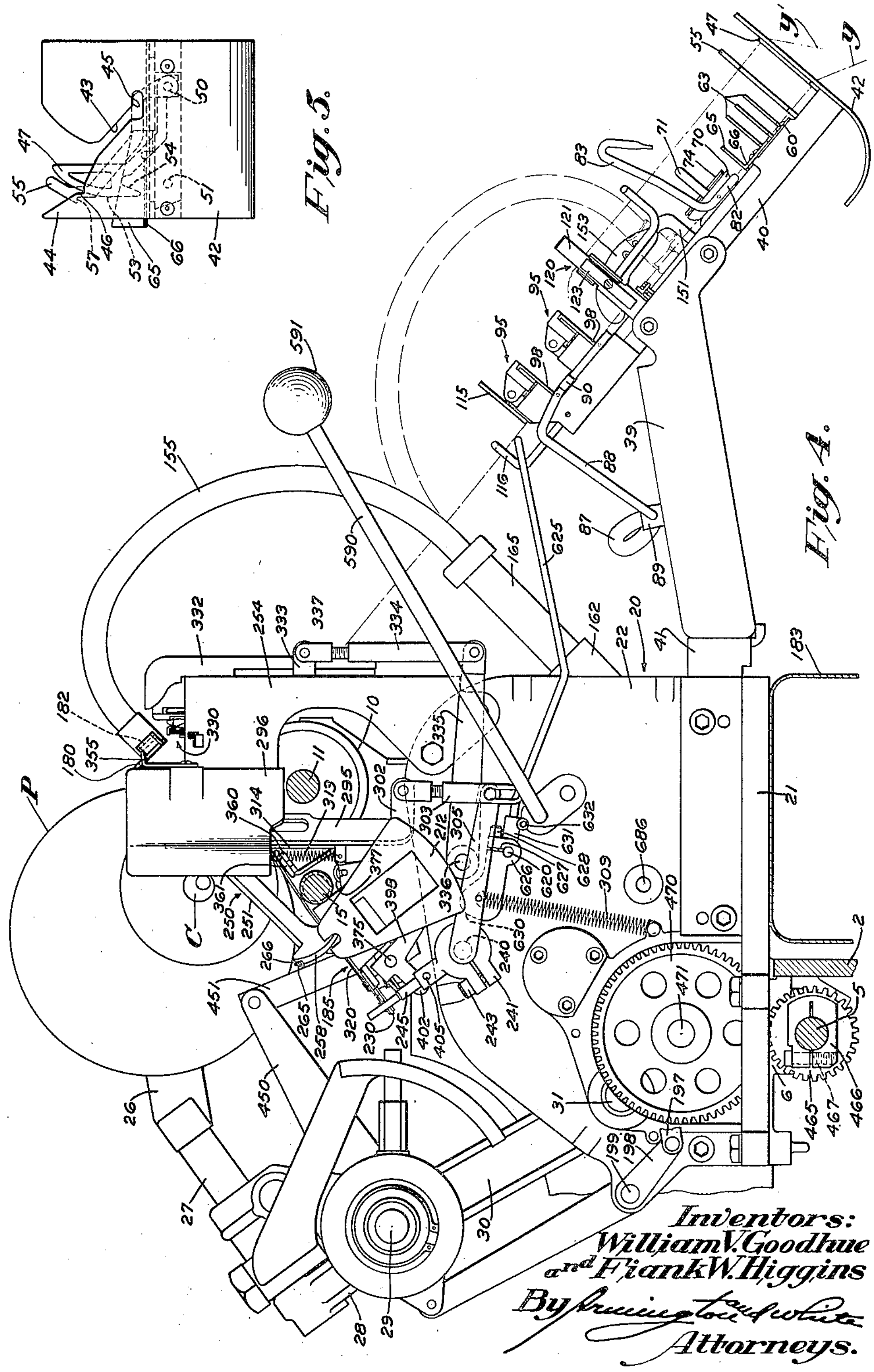
Fig. 4 is a side elevational view showing the winding unit in slightly reduced scale as viewed in the opposite direction from that of Fig. 2 and illustrating its driving connections, the tension-assembly, and certain other parts including the suction-nozzle or end-finding means in its relation to the tension-assembly and the knot-tier for uniting the ends of the yarn.
Fig. 5 is an end view of the tension-assembly showing the yarn-guiding elements.

The tension device; the means for retaining the spare yarn end in reserve; the means for threading the spare yarn between the tension-disks; and the other instrumentalities cooperating therewith are mounted in a group, called the "tension-assembly", which is carried by a bracket 39 projecting forwardly from the frame 20, see Fig. 4 and detailed views 6 to 11 inclusive. The tension-assembly mounting consists in a relatively flat panel 40 supported in inclined relationship by the bracket 39 that is bolted to a U-shaped yoke 41 fastened to the sides 22 and 23 of the frame 20, see Fig. 63. Fastened to the forward end of the panel 40 is a yarn-guide in the form of a plate 42 having its lower portion curved inwardly and rearwardly as shown in Figs. 4 and 5. The upper portion of the guide-plate 42 is formed with a slot 43 having a re-entrant opening at the top and extending downwardly at an angle with a relatively short horizontal portion 45 at the bottom. The right-hand edge of the slot 43 recedes arcuately toward the top of the plate 42 while to the left of the re-entrant opening of the slot is an upstanding finger 44 tapered to a rounded point at the top. The running yarn *y* is guided in the lateral extension 45 at the lower end of the slot 43 in the plate 42 as it feeds to the tension-device and thence to the winding package; while the spare end *y'* is normally held in reserve on a rest 46 formed by a shoulder on the edge of the slot 43 at the side of the tapered finger 44, being retained in this reserve position by the arcuate edge of a detention lever 47, see Fig. 5.

Figures 6, 7, 8, 9, 10, 11, 12, 13:
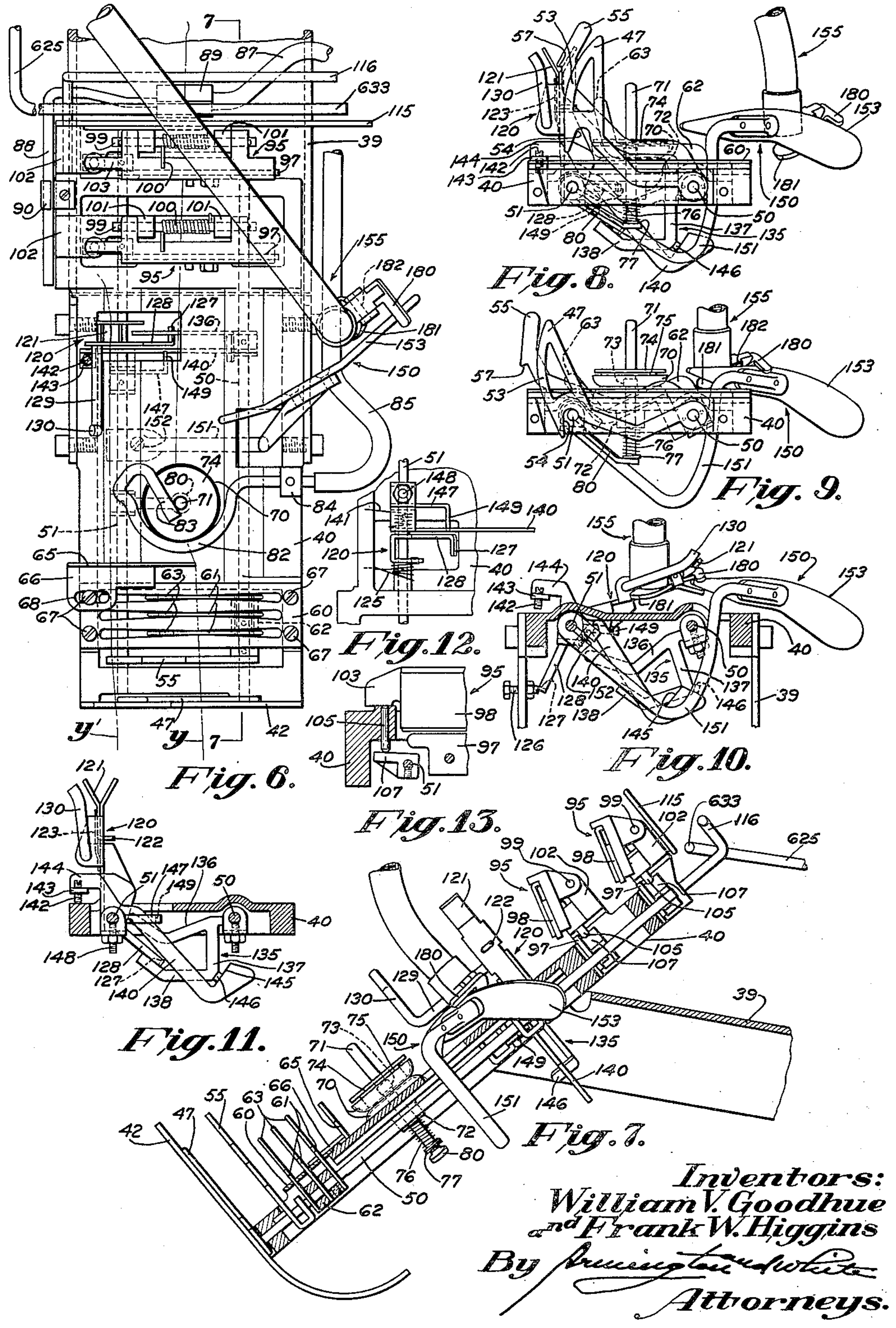
Fig. 6 is a plan view of the tension-assembly including the pair of slub-catchers and the means for cleaning the elements with air-jets.
Fig. 7 is a part-sectional side elevational view of the tension-assembly taken on line 7—7 of Fig. 6.
Figs. 8 and 9 are detailed views of the tension-device and the means for shifting the reserve supply yarn into position to be picked up by the tension-nozzle.
Figs. 10 and 11 are part-sectional detailed views of the same.
Fig. 12 is a fragmentary bottom plan view of one of the operating shafts of the tension-assembly.
Fig. 13 is a part-sectional view in elevation showing the means for opening the slub-catchers.

The detention lever 47 is mounted fast on the forward flatted portion of a rod or rock-shaft 50 which extends longitudinally beneath the panel 40 with its terminal portions rotatable in suitable bearings at the ends thereof. A second rock-shaft 51 is similarly mounted in bearings on the under side of the panel 40 in parallel spaced relation to the shaft 50. These two shafts 50 and 51 carry the several elements which function cooperatively for threading the spare end *y'* down into the guiding slot 45 of the plate 42 and also into the tension-device during the operation of retrieving the spare end and transferring it to the knotter for uniting it to the end on the winding package. The lever 47 consists in an elbow-shaped arm, see Fig. 8, extending laterally from a hub-portion 52 fast on the rock-shaft 50 and rising upwardly in a skeleton head having a vertical arm and a curved portion 53 forming its arcuate edge. With the lever 47 in normal position as illustrated in Figs. 5 and 8 the arcuate edge of its curved portion 53 cooperates with the edge of the tapered finger 44 to form a sort of crotch for retaining the spare yarn *y'* resting on the shoulder 46. The lower portion of the head of the lever 47 is shaped as a hook 54 adapted to engage around the rock-shaft 51 to limit the downward rocking movement of the lever and thereby the turning of the shaft 50.

Beyond the detention-lever 47 is a slack-yarn take-up lever 55, also mounted fast on the rock-shaft 50. The lever 55 consists in an arm of angular contour having its bifurcated hub fast on the shaft 50 and extending in an upright portion formed with a notched shoulder 57 for engaging the spare yarn *y'* as it rests on the shoulder 46 of the plate 42, this lever being operative to take up slack in the yarn in the manner later explained.

Beyond the two levers 47 and 55 is a sheet-metal plate 60 slotted to form a grid which is fastened to the top of the panel 40 overlying an opening therein. Cooperating with the bars of the grid 60 are a series of elbow-shaped detector-fingers 61, three in number as herein shown, extending from a single hub-portion 62 fastened to the rock-shaft 50, see Figs. 1, 6 and 7. The horizontal arms of the fingers 61 are normally supported slightly above the yarn *y* feeding across the bars of the grid 60, being sustained in this relationship by latching means, later described, which act to prevent the shaft 50 from rocking. The detector-fingers 61 have angular extensions 63 projecting upwardly at their ends to assist in guiding the yarn under their horizontal arms and across the bars of the grid 60. The fingers 61 act like drop-wires to permit release of the latching means for the shaft 51 after the yarn *y* from the first supply has been exhausted. Beyond the grid 60 is a yarn-guiding member 65, see Figs. 1, 6 and 7, having a foot 66 adjustably fastened in place by one of the screws 67 which attach the grid 60 to the panel 40. The foot 66 is formed with a slot 68 through which the screw 67 extends. The guide-member 65 comprises an upright blade with an inclined upper edge which assists in causing the yarn *y* to slide down into position across its vertical edge, thereby serving to retain it in the tension-device.

*Tension-device*

The tension-device may comprise the usual concavo-convex disks 70 rotatably mounted on a pin 71 which is slidable through the bore of a boss 72 on the under side of the panel 40. The pin 71 has a shouldered enlargement 73, see Fig. 9, located in position to engage with and lift one or more weights 74 which apply pressure to the upper disk 70, whereby to relieve the pressure thereon as the yarn is threaded into the tension-device. The weight 74 normally bears against a felt washer 75 to press the upper tension-disk towards the lower disk and apply resistance to the passage of the yarn therebetween. A helical spring 76 encircling the pin 71 between a split ring 77 and the bearing boss 72 acts to normally draw the pin downwardly.

Mounted fast on the opposite rock-shaft 51 is a lever 80 arranged with its end engaging under the end of the pin 71 to adapt it to slide the pin upwardly against the tension of the spring 76, whereby to remove the pressure of the weight 74 on the upper tension-disk 70 and thereby open the tension-device for threading the yarn between the disks. Means are provided for cleaning the tension-disks when they are thus opened by blowing lint or any other foreign particles therefrom. The tension-disks 70 are cleaned by air-jets projected from a tube 82 having a semicircular portion partially surrounding the periphery of the disks and provided with small orifices (not shown) on its side for emission of the air forced through the tube. The semicircular portion of the tube 82 serves as a guide for directing the yarn into place between the tension-disks 70 and has an extension 83 projecting upwardly at one end and terminating in a loop at the top. This extension 83 of the tube 82 serves as a guard to direct the yarn down under its semicircular portion. The upper end of the tube extension 83 is also provided with an orifice for projecting an air-jet across the detector-fingers 61 to remove the lint accumulation therefrom. A straight length of the tube 82 is supported in a lug 84 rising from the side of the panel 40 with the end of the tube projecting therefrom and connected to a flexible hose 85 through which the air is supplied. The air-hose 85 is connected to a pipe-T 86 on the side of the bracket 39, see Figs. 1 and 14, and thence to a valve, later described, in the supply line from a suitable source of compressed air, not herein shown.

Figures 2, 3:
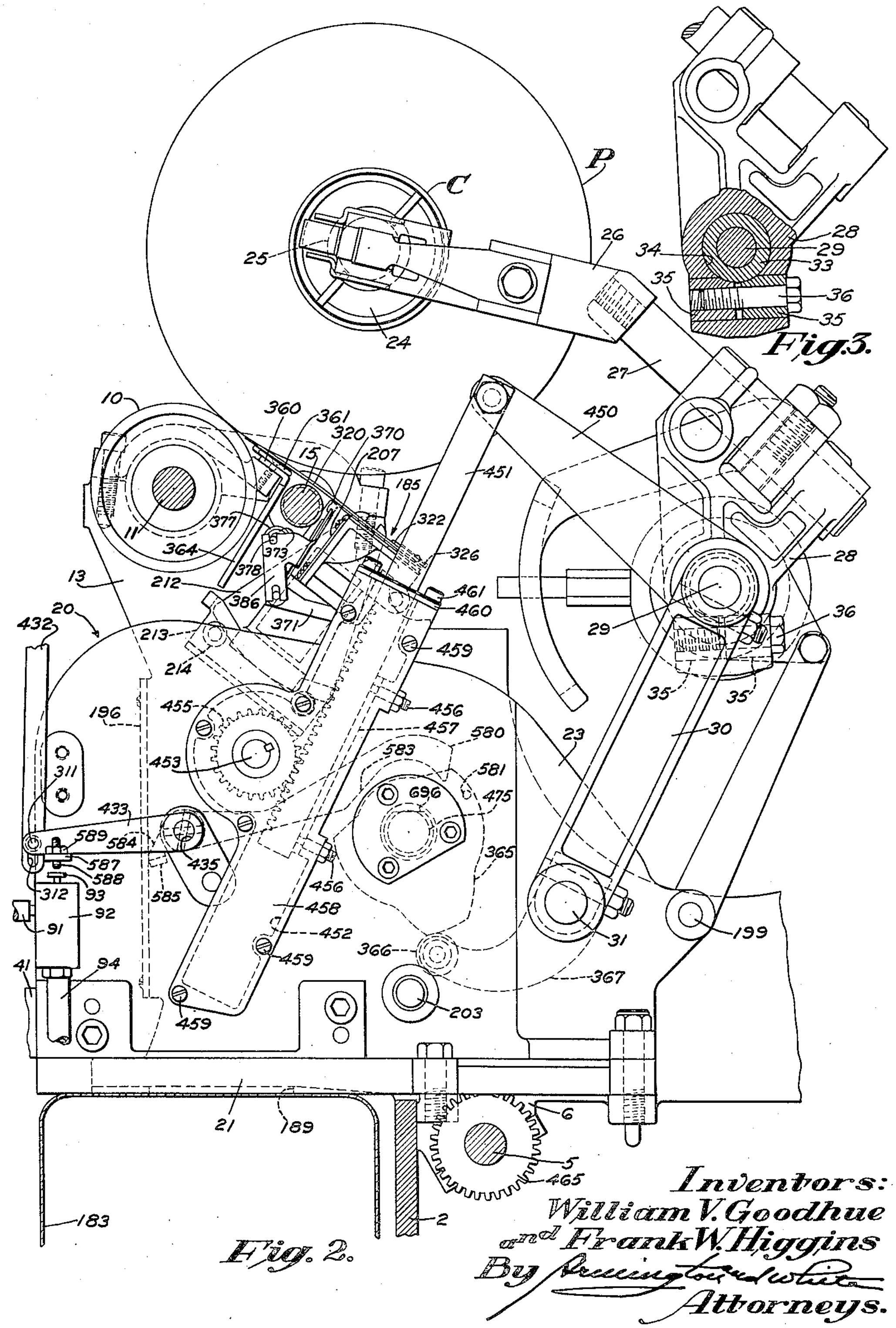
Fig. 2 is a side elevation of one unit of the gang machine showing its principal winding elements comprising the traversing drive-roll, the spindle on which the winding package is supported, and the pivoted arm carrying the spindle to adapt it to move toward and away from the drive-roll.
Fig. 3 is a part-sectional detailed view of the means for pivotally mounting the spindle-carrying arm.

A branch hose 87 from the T 86 extends across the under side of the panel 40 for connection to another tube 88 employed for cleaning the slub-catchers, later described as mounted at the rearward end of the panel 40. The slub-catcher cleaning tube 88 overlies the side of the panel 40 with a length bent downwardly and fastened at its end to a union 89 mounted on the bracket 39, see Fig. 4. The tube 88 may be fastened to the panel 40 by a clamp 90. The branch hose 87 which extends from the three-way pipe-T 86 is connected to the union 89, see Fig. 4. From the pipe-T 86 a hose 91 leads to the air-valve 92 shown in Fig. 1. The air-valve 92 may be of any suitable construction, preferably of the plunger-operated type as illustrated in Fig. 2, with its plunger 93 adapted to be forced downwardly to open the valve through the operation of certain instrumentalities later described.

*Slub-catchers*

Mounted at the rearward or upper end of the panel 40 are a pair of slub-catchers 95, see Figs. 6 and 7, for cleaning the yarn before it feeds to the winding package. The slub-catchers 95 are of usual construction, each comprising a lower fixed blade 97 and an upper hinged blade 98 pivoted on a rod 99 with a spring 100 for rocking the upper blade to maintain its lower edge in spaced relation to the edge of the lower blade. The rods 99 are supported in bearings 101 on standards 102 formed as a part of the panel 40. The upper blade 98 of each slub-catcher has an arm 103 projecting at the left as viewed in Figs. 6 and 13 and overlying the end of a plunger-pin 105 which is slidable in the bore of a bearing forming part of the standard 102. The lower end of the plunger-pin 105 is engaged by the end of a lever 107, see detailed view Fig. 13, secured fast on the rock-shaft 51 so that when the latter is rocked the lever 107 will slide the pin upwardly and thereby rock the upper blade 98 of the slub-catcher 95 to open the latter as shown in Fig. 7 for threading the yarn thereinto. When opened the slub-catchers are cleaned by air-jets emitted from the tube 88, previously referred to as connected through the union 89 and pipe-T 86 to the hose 91 from the valve 92, see Figs. 4 and 6. The tube 88 has jet orifices on its side directed toward the openings between the blades of the slub-catchers 95. Another orifice at the bend in the tube 88 causes an air-jet to be ejected therefrom along the crossbar 633 of the breakage-lever 625 to remove any length of yarn tending to cling thereto when the yarn is broken.

Supported rearwardly beyond the slub-catchers 95 is a plate-like guard 115 fastened to the rearward standard 102 with its lower rounded edge in position to adapt the yarn to feed thereunder. Beyond the edge of the guard 115 is a wire bail 116 arranged parallel therewith and under which the yarn feeds, the wire having a right-angular bent portion fastened in a bore at the end of the panel 40.

*Spare yarn end-holding means*

It has been stated that the end of the spare yarn *y'* is held in reserve resting on the shoulder 46 in the guide-plate 42, see Fig. 5, and retained in place by the lever 47. A transfer lever 120, see Fig. 11, mounted to turn on the rock-shaft 51, extends upwardly therefrom through an opening in the panel 40, being provided with a clip 121 at its upper end for seizing the end of the reserve yarn *y'*. The lower end of the lever 120 has a bifurcated hub-portion with bores in its bifurcations that serve as bearings for pivotally supporting the lever on the rock-shaft 51. The upper terminal portion of the lever 120 is bent outwardly at an angle to adapt it to cooperate with a reversely-bent angular extension of the clip 121, thus forming a crotch therebetween into which the end of the yarn *y'* may be inserted and carried down between the main arm of the lever and the parallel portion of the clip to grip it therein. The clip 121 is rockably mounted on the upright arm of the lever 120 by means of its laterally-projecting finger 122 engaging loosely through a slot in the arm. A leaf-spring 123 fastened to the rearward side of the lever 120 with its offset portion bearing against the back of the clip 121 tends to hold the latter pressed against the yarn *y'* to bind it to the lever. The clip-lever 120 is normally held cocked in upright relationship as shown in Fig. 11 by latching means arranged below the panel 40 and mounted on the opposite rock-shaft 50.

A helical spring 125, see Fig. 12, is coiled around the rock-shaft 51 and has one end engaged across a portion of the panel 40 with its other end hooked through a hole in one of the bifurcations of the hub of the lever 120. The spring 125 acts to rock the clip-lever 120 downwardly toward the top of the panel 40 to draw the end of the reserve yarn *y'* into place to thread it between the tension-disks 70. Movement of the lever 120 in this direction is limited by the end of a stud 126 in the side of the bracket 39, see Fig. 10, engaging with the bent end 127 of a downwardly-extending latching arm 128 on the lever 120. The upright portion of the clip-lever 120 carries a laterally-extending wire rod 129 terminating in a right-angular extension 130, this rod being used for rocking the clip-lever upwardly and rearwardly to latch it in its upright position in the manner later explained.

*Latching means for clip-lever*

Referring to Figs. 10 and 11, a latching lever 135 has its bifurcated hub-portion secured fast on the rock-shaft 50. The upper arm 136 of the latching lever 135 is inclined downward and then upwardly near its end in a sort of crook, the terminal portion of which is adapted to be engaged by the right-angular bent end 127 of the latching arm 128 on the clip-lever 120 when the latter is swung back into upright position to cock it in this relationship. Projecting downwardly from the upper arm 136 of the latching lever 135 is a vertical extension 137 carrying a bent or crooked arm 138 shaped like the end of the upper arm but somewhat shorter. The bent end 127 of the latching arm 128 on the clip-lever 120 is adapted to engage with the under edge of the bent end of the upper arm 136 of the latching lever 135 to raise the latter and permit the end of the latching arm to enter between the two arms 136 and 138 of the latching lever and be held by the crook in its lower arm, see Fig. 11, against the force of the coiled spring 125 on the shaft 51. The latching lever 135 is maintained raised in engagement with the latching arm 128 on the clip-lever 120 by means of a hooked lever 140 having a bifurcated hub-portion rotatably mounted on the rock-shaft 51 and normally held in the position shown in Fig. 11 under the tension of a spring 141 coiled around the shaft 51, see Fig. 12. A stud 142 supported in an ear 143 on the upper arm 144 of the lever 140 with its end adapted to engage against the top of the panel 40 acts to limit the rocking motion of said lever 140 under the tension of the spring 141. The hooked end of the lever 140 terminates in an inclined cam-edge 145 adapted to slidably engage with a finger 146 projecting laterally from the lower portion of the latching lever 135 and thereby cause said finger to enrter into locking engagement with the hooked end of said lever 140, see Fig. 11, to maintain the clip-lever 120 latched in upright position. A lever 147 has its bifurcated hub-portion secured fast on the rock-shaft 51 by a screw 148 and terminates in a right-angular bent arm 149, see Fig. 12. The arm 149 overlies the upper portion of the lever 140 to rock it downwardly so as to cause the finger 146 to be released from the cam-edge 145 of the lever 140.

*Means for unlatching yarn-clip lever*

The release of the latching means for the yarn-clip lever 120 is effected by the operation of a cam-lever 150 mounted fast on the shaft 51 and employed for rocking the latter. As shown most clearly in Fig. 10, the cam-lever 150 consists of a U-shaped wire arm 151 having one terminal portion bent around the rock-shaft 51 and secured fixedly thereto by means of a binder-screw 152. The opposite end of the U-shaped lever 150 has fastened thereto a cam-plate 153 of substantially ovate shape in outline. The upper edge of the cam-plate 153 is of arcuate contour extending inwardly towards the center of the panel 40 with its under edge of reversely-curved contour and joining the upper edge in a circular end. The cam-lever 150 is actuated to oscillate the rock-shaft 51 through the engagement therewith of means at the end of a suction-nozzle 155, termed for convenience the "tension-nozzle." As will be explained later, a finger 180 on the end of the tension-nozzle 155 rides along the upper curved edge of the cam-plate 153 to rock the lever 150 downwardly during the movement of the nozzle for picking up the reserve yarn end *y'* held by the clip 121 on the lever 120 when the latter is in its depressed relationship shown in Fig. 10. The end of the tension-nozzle 155 continues its movement from the cam-plate 153 to engage the laterally-extending rod 129 on the clip-lever 120 and rock the latter into upright position, thereby cocking it to be held by its latching means described above. On the return motion of the tension-nozzle 155 the finger 180 rides under the cam-plate 153 along its curved edge to lift the lever 150 and oscillate the lever 80 on the rock-shaft 51 to slide the pin 71 upwardly for raising the weight 74 from the upper tension-disk 70 in the manner and for the purpose later more fully explained.

*Tension-nozzle*

Figures 14, 15:
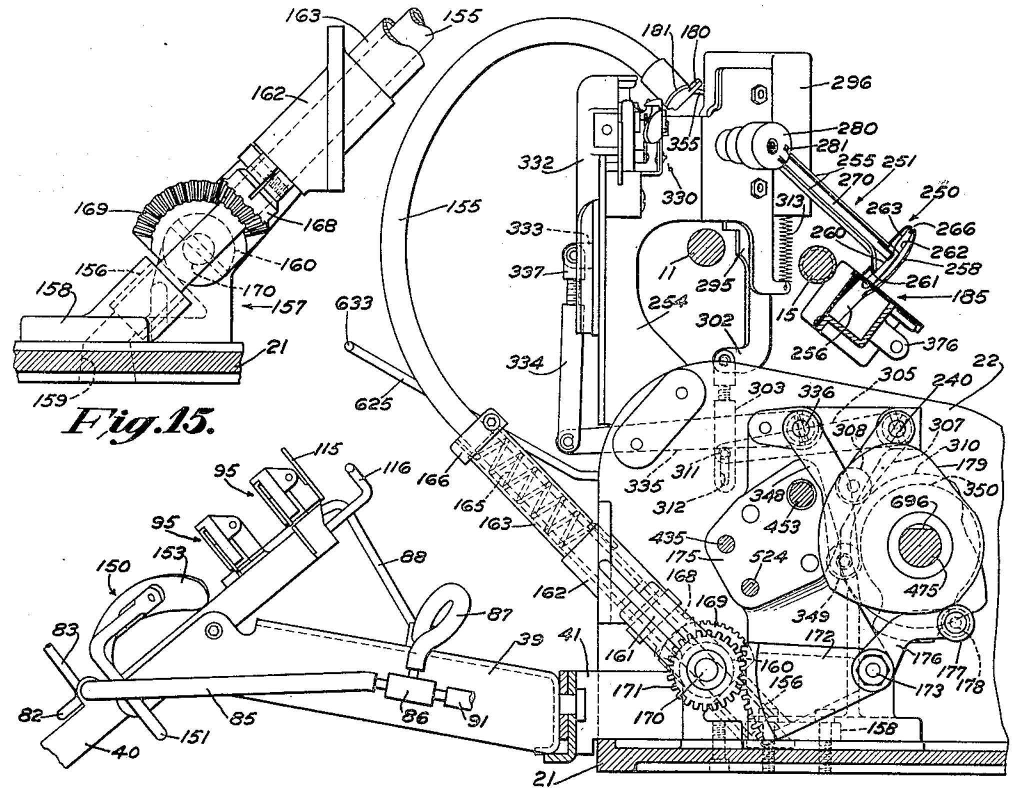
Fig. 14 is a side elevational view of the end-finding means including the suction-nozzle and their operating means.
Fig. 15 is a detailed view of the gearing for swinging the tension-nozzle toward the tension-assembly and back to the knot-tier.

The tension-nozzle 155, see Figs. 4, 14, 15 and 16, consists in a loop-shaped tube having its lower end portion rotatably mounted in a step-bearing 156 on a bracket 157 fastened to the base 21 of the frame 20. Referring particularly to Figs. 14 and 15, the bracket 157 has a foot 158 bolted to the base 21 of the frame 20 and laterally offset therefrom is a horizontal bearing 160, from which rises an arm 161 formed at its upper end with a cylindrical bearing 162. An opening 159 in the base 21 of the frame 20 communicates with the interior of the vacuum-duct 183, shown in Fig. 19, to connect the end of the tube of the nozzle 155 therewith. Surrounding a portion of the tube of the suction-nozzle 155 above the bearing 162 is a sleeve 163 enclosing a helical spring 165, see Fig. 14, and held in place by a split binder-collar 166. One end of the spring 165 is anchored in a bore in the end of the bearing 162 and its opposite end held in a bore in the collar 166, thereby tending to rotate the tube and swing its nozzle-end in contraclockwise direction as viewed in Fig. 6.

The tension-nozzle 155 is swung in the opposite direction to cause its yarn-engaging mouth to move down across the tension-assembly, for retrieving the yarn from the tension-device, by means of gearing shown in Figs. 14 and 15. Fast on the lower end of the tube of the nozzle 155 between the two bearings 156 and 162 is a bevel-pinion 168 arranged with its teeth meshing with a similar bevel-gear 169 on a stub-shaft 170 journaled in the horizontal bearing 160, before mentioned. The bevel-pinion 168 may have a full set of teeth while the teeth on the driving gear 169 may be interrupted to surround only part of its circumference, but of sufficient number to turn the pinion 169 through slightly more than one hundred and eighty degrees. The driving gear 169 which is fast on the shaft 170 is rotated by a spur-gear 171 at the opposite end of the bearing 160. The spur-gear 171 is rotated by means of a toothed segment 172 journaled on a stud 173 which is fixedly held in a bracket or standard 175 rising from the base 21 of the frame 20. The standard 175 also serves for supporting and journaling certain other shafts as later explained. The gear-segment 172 has formed integral therewith a crooked arm 176 extending rearwardly therefrom and carrying a roller 177 journaled on a stud 178 at its end. The roller 177 is engageable with a cam 179 shown in Figs. 14 and 16, whereby to rock the gear-segment 172 to drive the gearing last referred to and thereby swing the suction-nozzle in clockwise direction to carry its end downwardly and across the tension-assembly and thereafter swing back adjacent the knot-tier and slightly therebeyond.

Figures 16, 21, 27, 28:
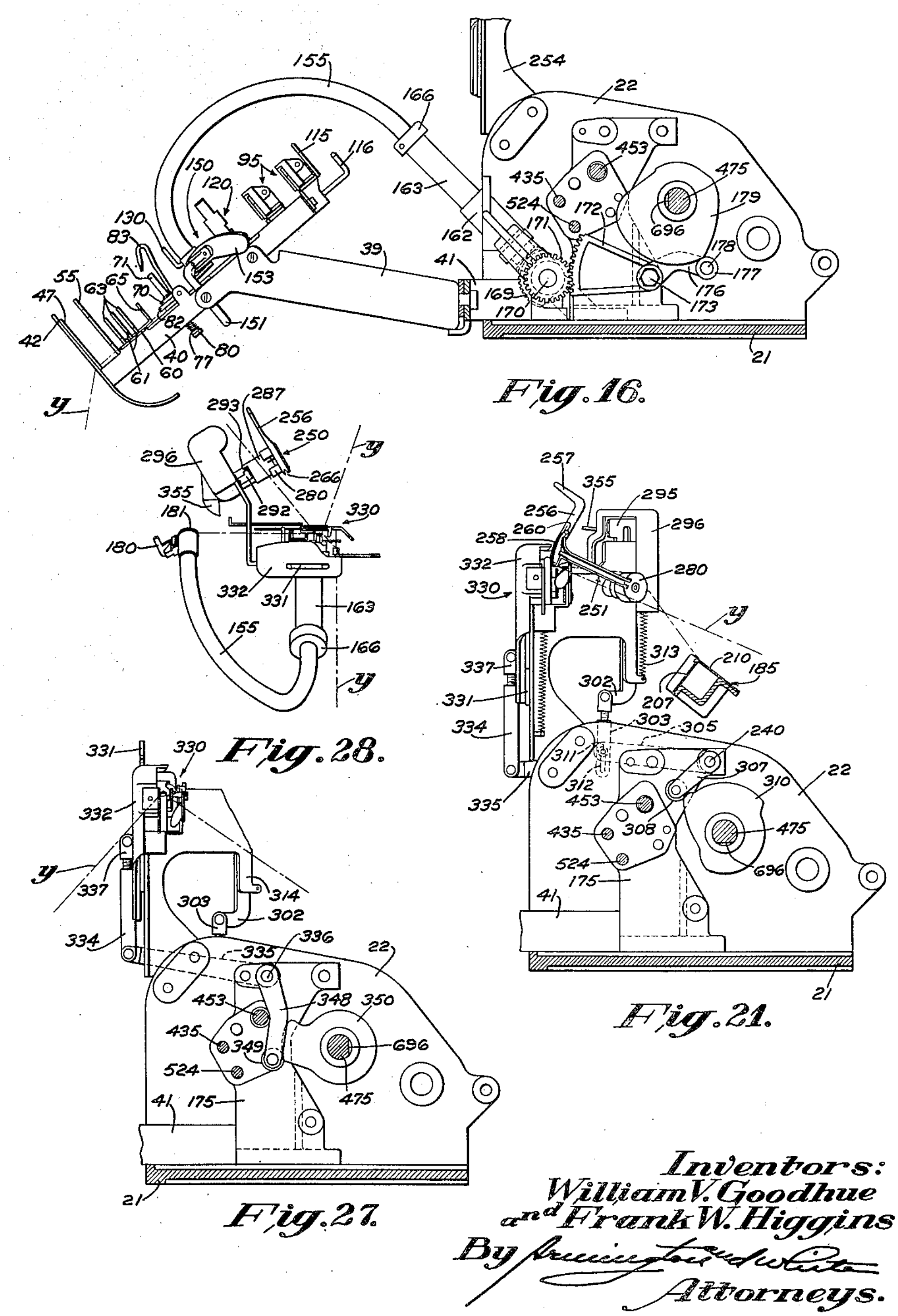
Fig. 16 is a view similar to Fig. 14, but in reduced scale, showing the tension-nozzle after it has been swung into position above the tension-assembly.
Fig. 21 is a similar view of the package end-finding means showing the yarn-ejector and the means for operating it to take the yarn end from the nozzle and carry it to the knot-tier.
Fig. 27 is a side elevation of a portion of the machine in reduced scale showing its mounting and the operating means for the knot-tier.
Fig. 28 is a plan view of the knot-tier in reduced scale showing the relation thereto of the yarn-ejector for the package-nozzle and the tension-nozzle.

It has been explained that means at the end of the nozzle 155 wipes across the edge of the cam-plate 153 on the lever 150 to depress the latter, this contact being made by a finger 180 formed as a part of a cap or closure 181 pivoted at the open end of the nozzle 155. As shown in Fig. 28, the cap 181 is pivoted at 182 to adapt it to be swung open as its finger 180 engages with the edge of the cam-plate 153, all as later more fully explained. The cap 181 may carry a gasket engageable with the open end of the nozzle 155 to effect a substantially airtight closure therefor, being normally held in closed relationship by the suction within the tube of the nozzle. The lower end of the nozzle-tube is connected to the vacuum duct 183 which extends the full length of the gang machine parallel with the bed 2, see Fig. 2, the air being exhausted by suitable means such as a vacuum pump (not shown) at the head end of the machine.

*Package vacuum-nozzle*

Figure 17:
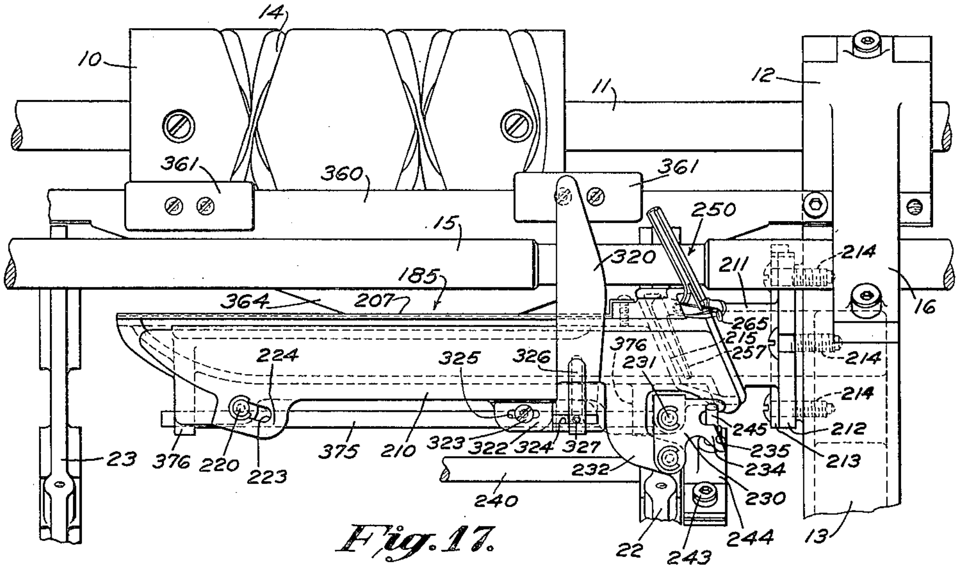
Fig. 17 is an enlarged plan view of the stationary suction-nozzle for the package showing its relation to the traversing drive-roll and the reverse-roll shaft and illustrating the operating means for the cover of the nozzle with the latter shown in open position.
Figure 18:
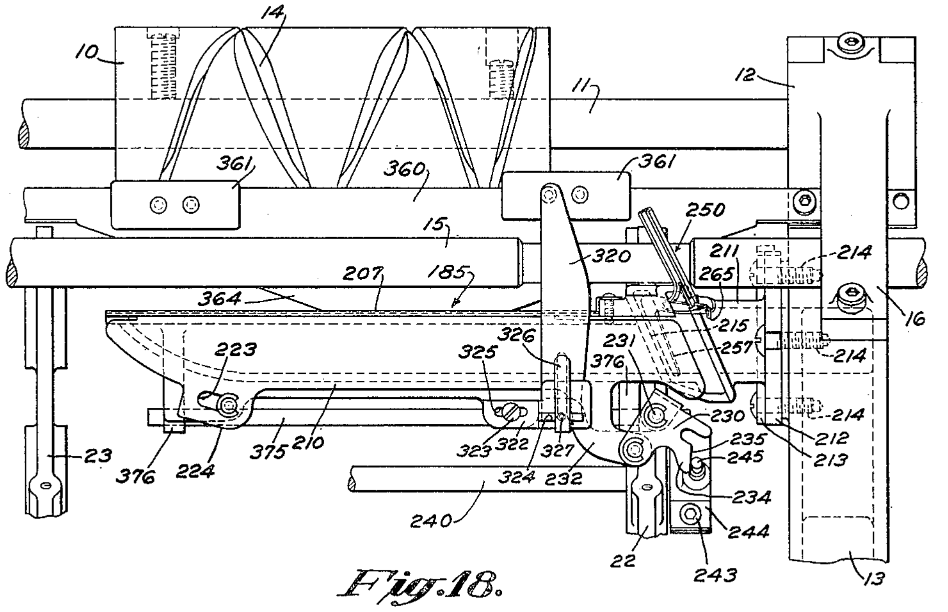
Fig. 18 is a similar plan view showing the cover of the package-nozzle closed by its operating means.
Figure 19:
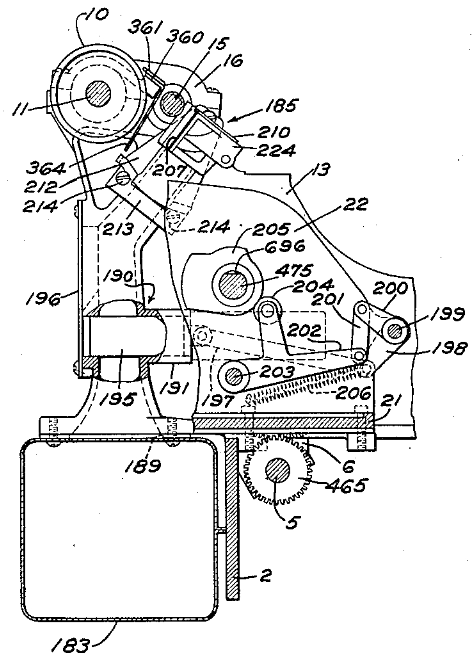
Fig. 19 is an end view of the package-nozzle in reduced scale showing the valve for controlling the vacuum in the nozzle as closed by its operating means.
Figure 20:
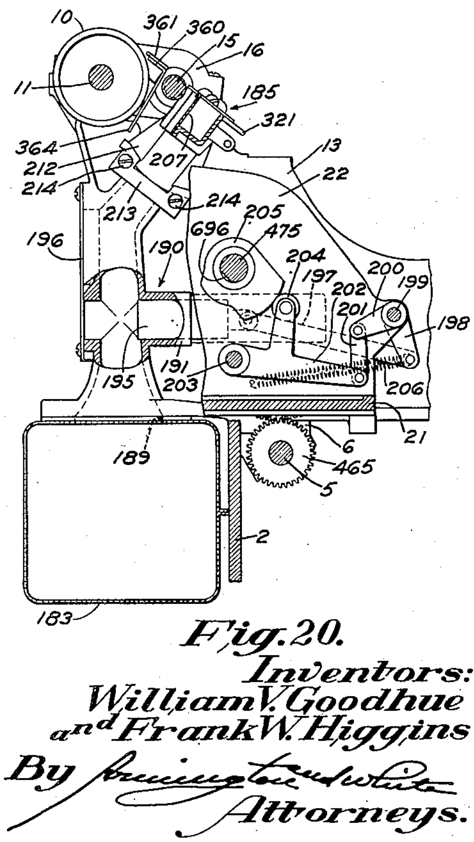
Fig. 20 is a similar view showing the nozzle partly in section and its vacuum-control valve as open.

It has been stated that the vacuum-nozzle for retrieving the end of the yarn from the package is stationary and, as shown in Figs. 17, 18, 19 and 20, it comprises a rectangular trough-like compartment 185 supported in angular relationship extending substantially the length of the drive-roll 10 at the rear thereof and closely adjacent the reverse-roll shaft 15. Referring to Figs. 19 and 20, the nozzle 185 may be supported on the left-hand bearing bracket 13 which is mounted on the bed 2 of the machine at one side of each winding unit. Each bracket or standard 13 has a tubular structure with its upper end canted at an angle and opening into the nozzle 185 through a neck at its end. The interior of the hollow or tubular portion of the standard 13 communicates with an opening 189 in the top of the vacuum duct 183 and the exhaust is controlled by a plunger-type valve 190 thereabove shown in the views of the drawing last referred to. Near the base of the standard 13 is a tubular extension 191 in which is slidably mounted a plunger 195 adapted to be projected across the main opening in the hollow standard 13 to close the valve as shown in Fig. 19; or to be withdrawn to open it as shown in Fig. 20. A cover-plate 196 closes the open side of the tubular portion of the standard 13 to give access to its interior for cleaning it. Fastened to the rearward end of the sliding plug or valve-closure 195 is a link 197 pivotally connected to a lever 198 which is fast on a rock-shaft 199 journaled in bearings on the side walls of the frame 20. A similar lever 200 fast on the shaft 199 is connected by a link 201 to an operating lever 202 which is free to rock on a shaft 203 suitably supported in bearings in the frame 20. The operating lever 202 has an upwardly-extending right-angular arm carrying a roller 204 engageable with a cam 205, later described as rotated by the control-unit of the machine. Depression of the lever 202 acts to rock the levers 198 and 200 to withdraw the plug or closure 195 toward the right for opening the valve as shown in Fig. 20. A helical spring 206 anchored to the side of the frame 20 and connected to the end of the lever 198 tends to rock said lever to slide the closure plug 195 across the opening in the hollow standard 13 to close the valve as shown in Fig. 19.

*Package vacuum-nozzle closure*

As shown in Figs. 2 and 20, one side of the suction-nozzle 185 is closed by a plate 207 riveted thereto and a slidable cover-plate 210 overlies its open top. The nozzle 185 has a neck 211 at one end extended in a flange 212 fastened to the finished face of a pad on the bearing bracket 13, see Figs. 2, 17 and 18, and is held in place by overlapping portions of a sheet-metal plate 213 secured to the bracket by screws 214. This right-hand end of the nozzle opens into the interior of the hollow bracket 13 for communication with the vacuum controlled by the valve at the bottom thereof. The right-hand end wall of the nozzle 185 is offset at an angle in conformity to the inclined relationship of a yarn-ejector, later described, which is adapted to enter the space between the end wall of the nozzle and the edge of the cover-plate 210 when the nozzle is closed along its forward edge as shown in the plan view, Fig. 18. It is also to be noted that at this end of the nozzle its bottom wall is depressed to form a sort of sump or pocket 215 in which the yarn-ejector is normally depressed to adapt its beak to be located under the strand of yarn for lifting it out to carry it to the knotter.

The cover-plate 210 is held down on the nozzle 185 by a screw 220 inserted through an elongate angular slot 223 in an ear 224 at the left-hand end of the cover as viewed in Figs. 17 and 18. Through this connection the cover-plate 210 is adapted to slide longitudinally and laterally for opening and closing the nozzle. The cover-plate 210 is slid to the right into position to open the nozzle along its forward edge as viewed in Fig. 17, this action also closing the right-hand end of the nozzle while the ejector is depressed thereinto with its beak adjacent the bottom of its sump or pocket 215. With the cover-plate in this relationship the nozzle is open along its edge underlying the package after the latter has been shifted onto the reverse-roll 15. When the valve at the base of the bracket 13 is open the end of the yarn will be sucked down into the nozzle to extend lengthwise thereof into its neck 211. After the yarn has been thus retrieved from the package and carried into the suction-nozzle 185 the cover-plate 210 is slid to the left as viewed in Fig. 17 and caused to move laterally to close the opening along its edge, see Fig. 18, this motion also opening a space at the right-hand end of the nozzle for the egress of the ejector in lifting the yarn out of the nozzle.

Figures 34, 35:
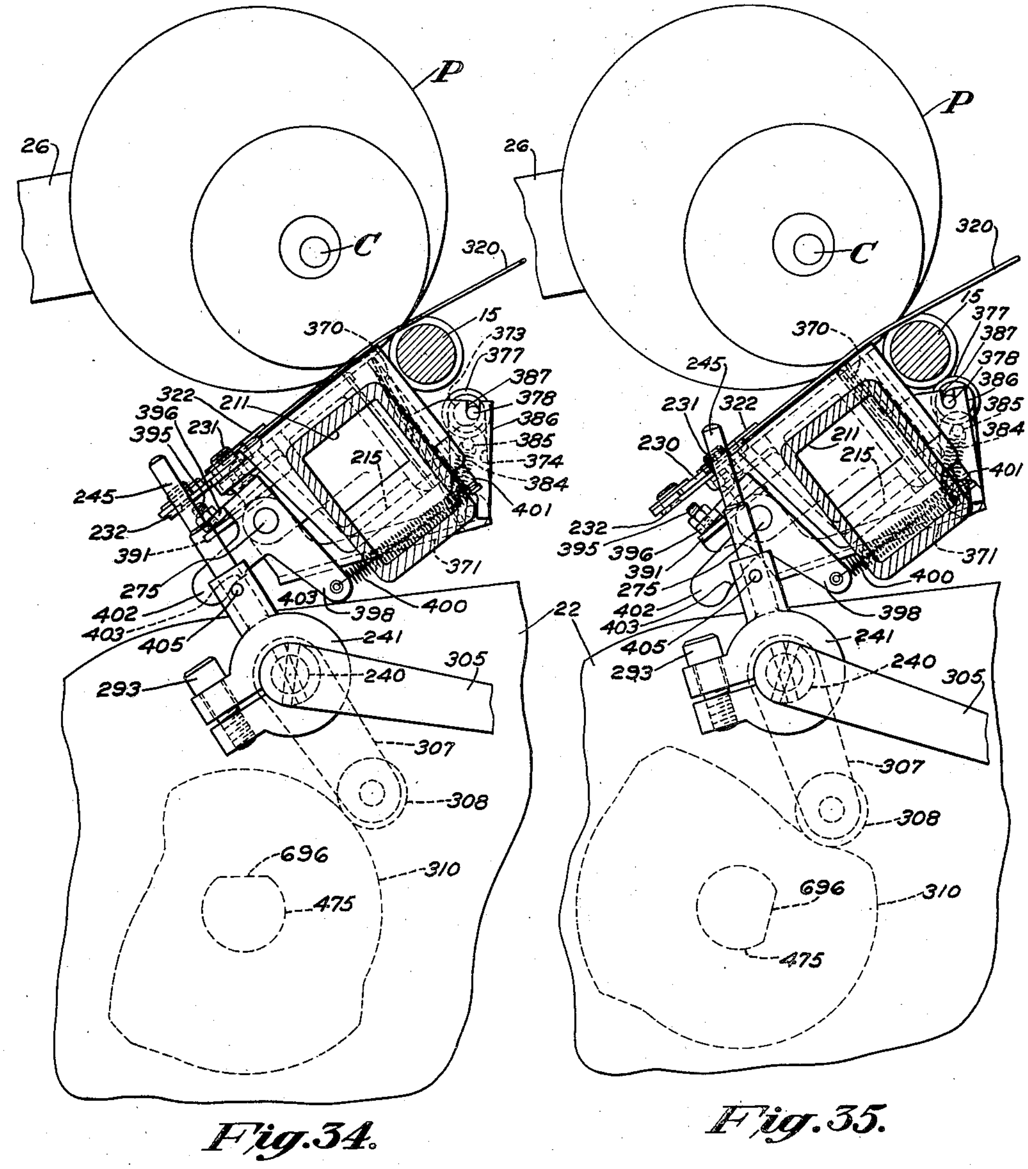
Fig. 34 is an enlarged detailed view of the beater-operating means shown in its relation to the suction-nozzle with the beater illustrated as inoperative.
Fig. 35 is a similar view showing the beater as carried into operative relationship by cam-operated means.

The cover-plate 210 is slid to shift it longitudinally and laterally for closing the nozzle 185 along its greater length by means of a cam-shaped lever 230 pivoted on a stud 231 screwed into a ledge on the side wall of the nozzle. One arm of the lever 230 is pivotally connected to an elbow-shaped arm 232 formed integral with the cover plate 210 and projecting forwardly therefrom, see Figs. 17 and 18. The other arm of the lever 230 is slotted at 233 and formed with a forwardly-extending portion 234 having a straight cam-edge 235 at one side. Referring to Figs. 34 and 35, a rock-shaft 240 journaled in suitable bearings on the frame 20 carries an oscillating member 241 at its end formed with a split hub clamped to the shaft by a binder-screw 243. Projecting upwardly from the hub of the member 241 is a stem 244 in which is held a pin 245 formed with a reduced end portion engageable in the slot 233 of the lever 230, see Fig. 17. When the shaft 240 is rotated in contraclockwise direction as viewed in Fig. 34 the pin 245 will rock the lever 230 to slide the cover-plate 210 back into closed position as shown in Fig. 18, the pin 245 eventually sliding along the cam-edge 235 of the lever 230 to hold the cover in closed position. During this sliding motion of the cover-plate 210 toward the left, as viewed in Fig. 18, the pocket 215 in the end of the nozzle 185 is opened for the ejector 250 to swing upwardly for transferring the end of the yarn to the knotter.

*Yarn-ejector for package-nozzle*

Figures 22, 23, 24, 25, 26:
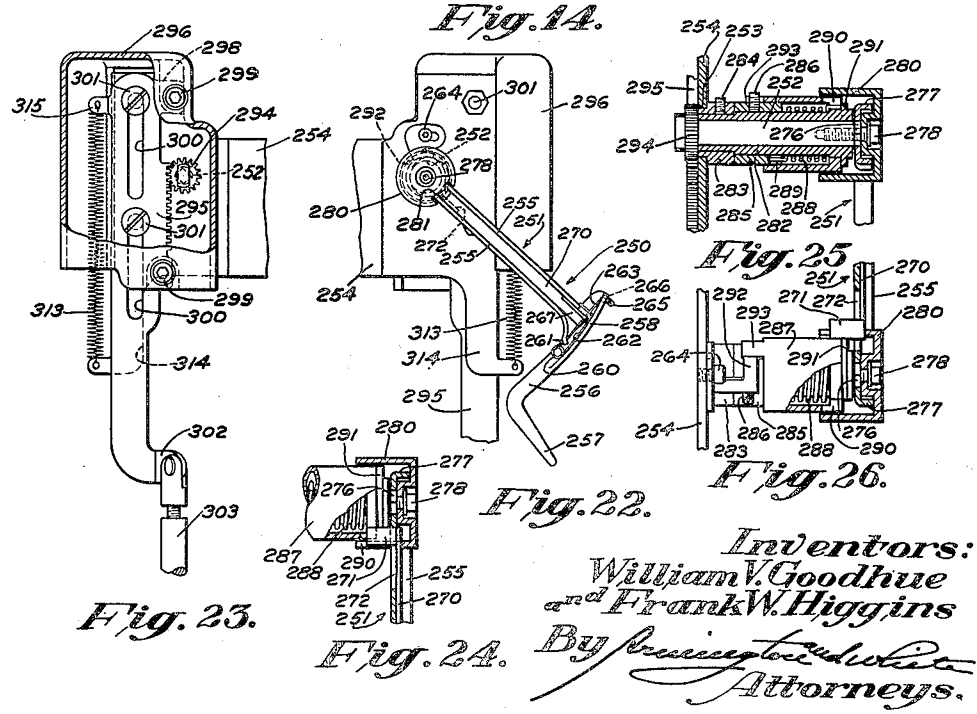
Fig. 22 is an enlarged side elevation of the yarn-ejector for the package-nozzle and its mounting.
Fig. 23 is a view of the operating means for the yarn-ejector shown with its casing in partial section to disclose the elements contained therein.
Fig. 24 is a part-sectional detailed view of the operating means for the ejector.
Fig. 25 is a longitudinal sectional view of the operating mechanism for the ejector taken in a vertical plane common to the axis of its shaft.
Fig. 26 is a part-sectional plan view of the ejector-operating means shown in Fig. 25.

Referring to Figs. 21, 22 and 23, the ejector 250 consists in a sheet-metal arm 251 secured to a shaft 252 journaled in a bearing which projects from the side of the upper portion of an arm-like bracket 254 fastened to the side wall 22 of the frame 20. The arm 251 is shaped with flanges 255 projecting from its sides which form a recess extending throughout its length. The outer end of the arm 251 is formed with a lateral extension 256 terminating in a substantially right-angular beak 257 which normally is retained in the pocket 215 at the end of the nozzle 185 in position to pick up the length of yarn held therein by suction. Referring to Fig. 22, a flange 258 extending along one side of the lateral extension 256 of the arm 251 projects outwardly therefrom to form a sort of ledge. Secured to this part of the ejector 250 is a hairpin-shaped spring 260 coiled at one end and held in a slot 261 in the end of one of the flanges 255 on the side of the arm 251. One leg 262 of the wire spring 260 lies alongside the flange 258 and is fixedly held thereby while the opposite leg 263 extends out to the end of the lateral extension 256 and is bent or folded around to provide a detent-projection 265 adapted to slide through a slot 266 at the end of the flange 258. The leg 263 of the spring 260 is engaged in a notch 267 at the end of a reciprocable pusher 270 constituted by a flat strip of sheet-metal slidably mounted between the two flanges 255 on the arm 251. At the opposite end of the pusher 270 is a lug 271 projecting laterally therefrom through an elongate slot 272 in the arm 251, see Figs. 24 and 26. The pusher 270 is adapted to be reciprocated by means of its lug 271 to compress the hairpin spring 260 and project the detent 265 through the slot 266, thereby to provide a guard to prevent the yarn from sliding off from the end of the lateral extension 256 of the arm 251.

*Ejector-operating means*

The ejector 250 is rotated contraclockwise, as viewed in Fig. 22, by the shaft 252 to swing its beak 257 upwardly and out from the package-nozzle 185 for picking up the yarn and carrying it to the knotter. The outer end of the shaft 252 is squared off at 276 to engage through a square opening in the enlarged hub 277 of the ejector 250, see Figs. 24 and 26, with a stud 278 screwed into the shaft against the recessed end of a cap 280 to secure the ejector fixedly in place on the shaft. The projecting ends of the flanges 255 on the sides of the ejector-arm 251 are engaged in slots 281, see Fig. 22, formed in the end of the cap 280 to connect the cap to turn with the pivoting motion of the ejector. The bearing for journaling the shaft 252 comprises a cylindrical bushing 282 held in a collar 283 which has a reduced neck forced into a bore 253 in the bracket 254 to rigidly support it thereon. The bushing 282 is secured fast with the collar 283 by a set-screw 284 to prevent it from turning therein. Surrounding the bushing 282 is a second collar 285 abutting the end of the collar 283 and held against rotation by a set-screw 286. The collar 285 serves as a bearing for one end of an outer sleeve 287, the opposite end of which is formed to bear on a shouldered enlargement at the end of the bushing 282, see Fig. 25. The sleeve 287 encloses a helical spring 288 surrounding the bushing 282 with one end anchored in a slot 289 in the end of the collar 285 and its opposite end engaging a slot 290 in the end of the sleeve 287.

Formed integral with the enlarged outer end of the bushing 282 is a flange 291 having its periphery eccentrically disposed with respect to the axis of the bushing to provide a cam employed for the purpose as next explained. It has been stated that the slidable pusher 270 on the ejector-arm 251 is connected to operate the hairpin spring 260 by means of its right-angular laterally-projecting lug 271, see Fig. 24. The lug 271 is adapted to ride around the periphery of the cam 291 when the ejector is rotated by the shaft 252 through substantially 195 degrees. When the ejector 250 is depressed into the position shown in Fig. 22 with its beak 257 overlying the bottom of the pocket 215 at the end of the nozzle 185, the lug 271 will ride around the periphery of the cam 191 to hold the pusher 270 projected longitudinally of the arm 251 and thereby maintain the detent 265 extended at the end of the arm 256 of the ejector. When, however, the ejector 250 is swung upwardly to carry the yarn to the knotter, as it approaches the end of its stroke and reaches the position shown in Fig. 21, the lug 271 will be alined with the slot 290 in the end of the sleeve 287, see Fig. 24, and will be caused to enter thereinto by the expansion of the hairpin spring 260. Consequently, the detent 265 will be withdrawn through the slot 266 at the end of the arm 256 of the ejector so that the yarn being carried thereby will be free to slide off from this end of the ejector-arm. After the end of the yarn has been released from the end of the ejector 250 and the knot has been tied, the shaft 252 is operated to swing the ejector downwardly to enter its beak into the nozzle 185. During this turning motion of the ejector 250 the lug 271 on the pusher 270 will ride around the periphery of the cam 291 and be forced outwardly at the high point thereon to release it from the slot 290 in the end of the sleeve 287. At this juncture the pusher 270 will be slid outwardly on the arm 251 to cause the detent 265 on the spring 260 to be projected through the slot 266 as shown in Fig. 22 for again providing a guard to prevent the yarn from sliding off from the end of the ejector. It will be understood that as the ejector 250 is swung from its upper position shown in Fig. 21 to that illustrated in Fig. 22 the engagement of the lug 271 in the slot 290 at the end of the sleeve 287 will rotate the sleeve with the ejector thereby causing the spring 288 to be wound up and tensioned. Immediately the lug 271 is released from the slot 290, however, the sleeve 287 will be freed and the spring 288 will come into play to rotate the sleeve in the opposite direction whereby to restore it to first position. The return rotary movement of the sleeve 287 is arrested by means of a stop-finger 292, see Figs. 22 and 26, having its end engageable with a lug 293 on the end of the sleeve 287. The stop-finger 292 projects from a flange having a slotted opening, see Fig. 22, for adjustably mounting it on the casing 254 by means of a screw 264. It will be understood that the sleeve 287 is returned to first position by the spring 288 for locating its slot 290 in proper relationship for the lug 271 to engage therewith as the ejector 250 is carried to the knotter so that the pusher 270 may be released for retracting the detent 265 at the end of the ejector.

The ejector 250 is rotated by the shaft 252 in clockwise direction as viewed in Fig. 21 to enter its beak 257 into the pocket in the package-nozzle 185 and in the opposite direction for raising it out therefrom to carry the yarn to the knotter. The shaft 252 is rotated by means of a toothed pinion 294 fast on its inner end and arranged with its teeth meshing with those on a slidable rack-bar 295. The rack-bar 295 is slidable on the bracket 254 and carries a casing 296 enclosing certain of the operating parts of the mechanism, see Fig. 23. The casing 297 has its rearward open side overlying the face of the bracket 254, being fastened to ears 298 on the side of the rack-bar 295 by bolts 299 to adapt it to slide therewith. The rack-bar 295 is formed with spaced elongate slots 300 through which project studs 301 fast in the bracket 254 to slidably support the bar for vertical movement. Projecting from the side of the rack-bar 295 is an ear 302 connected to a turnbuckle form of link 303 having its lower end pivotally connected to the end of an operating lever 305. The lever 305 is fast on the shaft 240, before mentioned as rockably mounted in bearings in the left-hand side wall 22 of the frame 20 and a second bearing in the standard 175, previously referred to. A lever 307 fastened to the end of the shaft 240 that projects beyond the standard 175, see Fig. 21, carries a roller 308 journaled on its lower end and engageable with a cam 310 to be later described. A spring 309 connected to the lever 305, see Fig. 4, and anchored to the frame 20 at its opposite end tends to rock the shaft 240 to maintain the roller 308 bearing on the cam 310. It will be understood that when the lever 307 is actuated by the cam 310 it will rock the lever 305 upwardly to cause the link 303 to raise the rack-bar 295; it being noted that the rack-bar is connected to the link 303 by means of a pin 311 engaging in an elongated slot 312, see dotted lines Figs. 14 and 21, so as to permit lost motion between the movement of the lever and the sliding motion of the link. A helical spring 313 anchored to an ear on an arm 314 depending from the bracket 254 with its upper end hooked into a projecting ear 315 on the side of the rack-bar 295 tends to maintain the rack-bar depressed.

*Package-nozzle bail*

Mounted on the package-nozzle 185, see Figs. 17 and 18, is a thin sheet-metal finger 320, called the "nozzle bail," that is adapted to guide the yarn as it is being drawn out of the nozzle and carried to the knotter so as to prevent it from becoming entangled with other parts of the mechanism. The finger or bail 320 is mounted on a ledge 321 projecting forwardly from the wall of the nozzle and held in place by an L-shaped plate 322. The lower bifurcated end of the bail 320 is curled around tightly to project through a slot 324 in the plate 322 and the latter is fastened to the ledge 321 by means of a screw 323 inserted through a slot 325 therein. A spring clip 326 for holding the parts in assembled relationship has a portion underlying the end of the bail 320 and an upper portion overlying the plate 322 with a detent-protuberance 327 engaging in the slot 324 between the bifurcations of the bail to fasten it in place.

*Knot-tier*

Referring to Figs. 14, 27 and 28, the knot-tier for uniting the end of the yarn from the tension-assembly to the end retrieved from the winding package may be of any suitable construction and arrangement comprising the usual rotary tying-bill and other appurtenances for cooperation therewith; these elements not being herein shown in detail as they form no part of the present invention. As herein illustrated the knot-tier 330 is mounted on the bracket 254 which supports the ejector-mechanism previously described. As herein provided, the tying bill and other parts of the knot-tier may be operated by means of a vertical rack-bar 331 slidably mounted in the casing 332 of the knotter and actuated by a cam in the control-unit as later explained. The rack-bar 331 is provided with a lug 333 projecting through a slot in the casing 332 and pivotally connected to a link 334. The link 334 has its lower end pivoted to a lever 335, see Fig. 27, fixedly mounted on a rock-shaft 336 held in bearings on the side wall 22 of the frame 20 and on the central standard 175, previously referred to as rising from the base of the frame. The link 334 is preferably of turn-buckle form having a screw-threaded extension 337 screwed into the end of the main portion of the link to adapt it for lengthwise adjustment to vary the connection between the rack-bar and the lever 335. An elbow-shaped lever 348 fast on the end of the shaft 336 carries a roller 349 journaled on its lower end for engaging a cam 350, later described as a part of the control-unit. It has been explained that the tension-nozzle 155 picks up the yarn from the tension-assembly and as it swings past the knot-tier 330 it draws the yarn across the tying bill of the knotter, see Fig. 28.

As the knotter completes the operation of joining the end of the supply yarn to the end on the package the tension-nozzle 155 swings back from the position shown in Fig. 28 to locate it adjacent the knotter for collecting one of the yarn ends cut from the knot. As the tension-nozzle 155 swings back toward the knotter its cap or closure 181 is opened by the engagement of the finger 180 thereon with a cam-shaped element 355 fastened to the side of the casing 296 for the ejector-mechanism. The cam-element 355 is positioned above the finger 180 on the cap 181 when the casing 296 is in its uppermost position so as to allow the nozzle to pass therebeyond. As the casing 296 is lowered, however, the cam-element 355 is carried down thereby to locate it in the path of the finger 180 to cause the latter to engage therewith and swing open the cap 181. As the nozzle 155 reaches a position adjacent the knotter 330 the suction therein will draw the severed end of the yarn downwardly through the nozzle-tube for disposal in the vacuum-duct 183.

*Means for arresting and then reversing rotation of the package*

It has been stated that the winding package is shifted from the drive-roll 10 to engage it with the roll 15 to reverse its direction of rotation and assist in retrieving the end of the yarn therefrom by means of the suction in the nozzle 185. Before the package is engaged with the reverse-roll 15 it is carried onto a stationary rest 360 where it remains for an instant to check its rotation, see Fig. 29, and is then shifted into driving contact with the reverse-roll 15, see Fig. 30. The reverse rotation of the package proceeds for an interval during which the end of the yarn thereon is retrieved and thereafter joined to the end from the supply; whereafter, the package must be shifted back into winding position in contact with the drive-roll 10. Before the package is returned into peripheral contact with the drive-roll 10 its reverse rotation is checked by again seating it on the rest 360. The rest 360 may consist of an angular sheet-metal member suspended between two of the shaft-bearing standards 13, its connections thereto not being shown in detail herein. The upper flat face of the rest 360 is provided with two raised pad-like sections 361 against which the base and smaller end of the conical package are adapted to seat. The rest 360 has a depending portion 364 which projects down between the reverse-roll 15 and the drive-roll 10, see Fig. 2, to form a guard for preventing the loose end of the yarn from winding upon the rolls before it is taken up by the suction in the nozzle 185. After the reverse rotation of the package has been arrested during the interval while it remains on the rest 360 it is returned into peripheral contact with the drive-roll 10.

*Means for shifting the package between the drive-roll and reverse-roll*

Figures 29, 30:
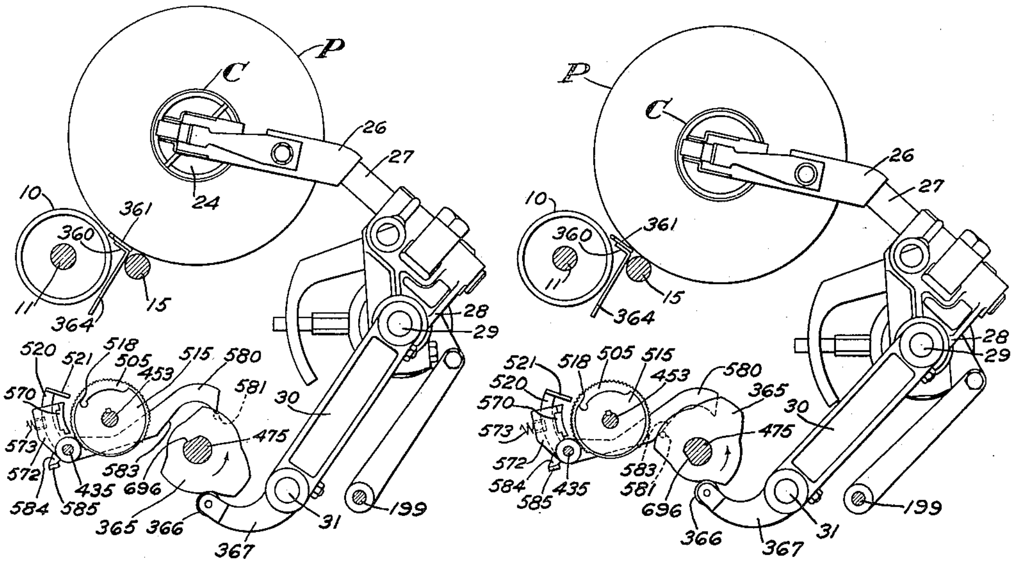
Fig. 29 is a view in reduced scale of the package-shifting mechanism for transferring the package from the drive-roll to the reverse-roll and illustrating the package as seated on the rest between the rolls for arresting its rotation.
Fig. 30 is a similar view showing the package transferred from the rest to the reverse-roll.

Referring to Figs. 29 and 30, the means for shifting the package from the drive-roll 10 onto the rest 360 and thence to the reverse-roll 15; and thereafter returning it to the rest and finally re-engaging it with the drive-roll consists of the following instrumentalities. A cam 365 in the control-unit has its periphery engaging a roller 366 on the end of a curved arm 367 secured fast to the shaft 31, previously described as having the link 30 fixedly mounted thereon. The upper end of the link 30 is secured fast to the shaft 29 on which the package-supporting arm 26 pivots. It will be understood that as the arm 367 is actuated by the cam 365 the shaft 31 will be rocked thereby to swing the link 30 secured thereto and thereby move the shaft 29 in a relatively flat arcuate path rearwardly and then forwardly during the shifting of the package from the drive-roll 10 to the reverse-roll 15 and back again to the drive-roll with an intervening dwell in each instance on the rest 360.

*Package-beater and wiper*

Figure 31:
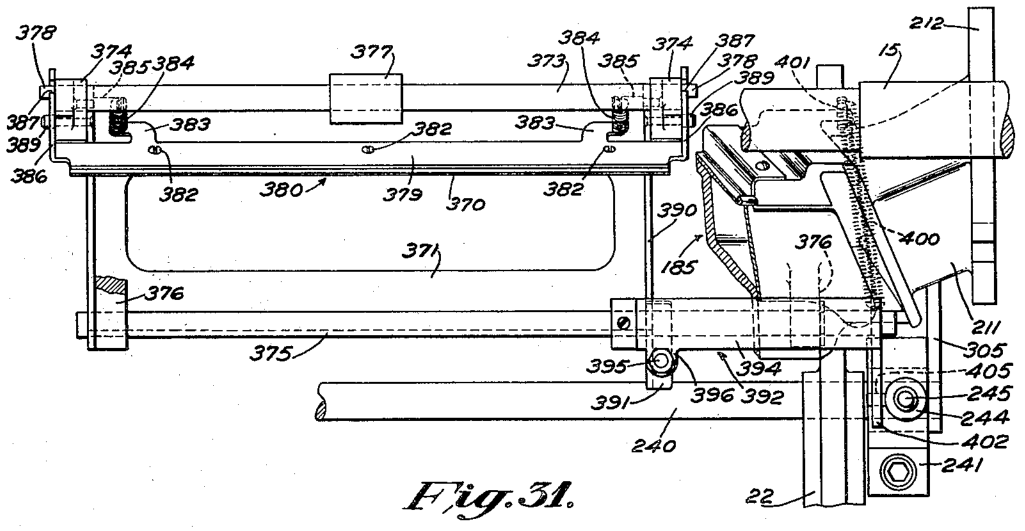
Fig. 31 is a plan view of the oscillatable beater for wiping the surface of the package to assist in removing the broken end of the yarn therefrom.
Figure 33:
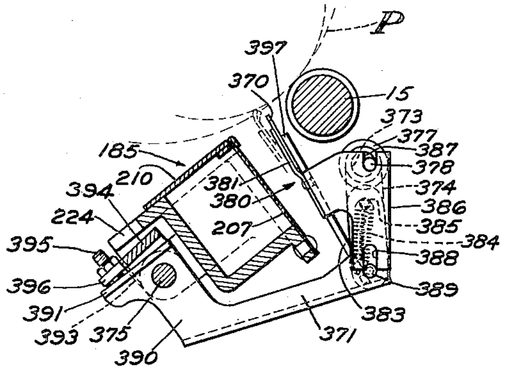
Fig. 33 is an end view of the operating means for the beater or wiper shown in its relation to the package suction-nozzle illustrated in section.
Figure 32:
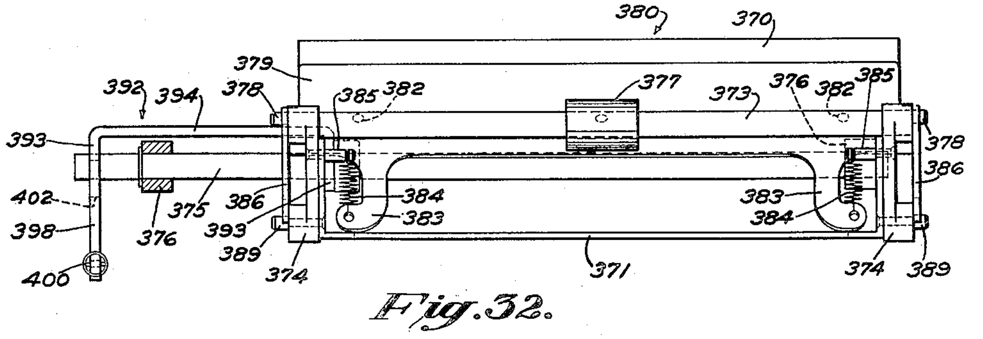
Fig. 32 is a front elevational view of the same.

To assist in retrieving the end of the yarn from the package P, an intermittently-oscillated resilient beater 370 is carried into contact with and wiped along the surface of the package, see Figs. 31, 32 and 33. The beater 370 may consist of a resilient strip of rubber or equivalent material carried by an oscillating frame 371 extending lengthwise of the package P. Normally the edge of the beater-strip 370 is out of contact with the surface of the package P, but when the package has been shifted to engage the reverse-roll 15 and the nozzle 185 is operative to retrieve the end of the yarn on the package the edge of the beater is carried into contact with the package and oscillated laterally to effect a wiping action on its surface, see dotted lines in Fig. 33. The beater 370 is oscillated by a shaft 373 journaled in bearings 374 at the opposite ends of the frame 371. The frame 371 is of cradle-shape in end view as shown in Fig. 33 with its ends pivotally mounted on a horizontal rod 375 held in lugs 376 projecting from the wall of the suction-nozzle 185. The bottom portion of the frame 371 is of skeleton rectangular shape in plan view as shown in Fig. 31. The rotary shaft 373 carries a roller 377 intermediate its ends which may be constructed of rubber or other resilient material and adapted to make contact with the periphery of the reverse-roll 15. On the opposite ends of the shaft 373 are eccentrically-disposed pins 378 from which the oscillating movement of the beater 370 is derived during the rotation of the shaft. The beater-strip 370 is fastened to the face of a plate-like portion 379 of a rocker-member 380, see Fig. 33, by means of a spring strip 381 riveted to said plate-portion at 382. The plate-portion 379 of the rocker 380 has downwardly-projecting arms 383, see Fig. 32, which are connected by helical springs 384 to a pair of pins 385 on the upright arms of the rectangular frame 371, previously described.

The rocker 380 is formed at its ends with arms 386 having slots 387 in their upper ends which are engaged by the eccentric pins 378, previously referred to. At the bottom of the arms 386 are longer slots 388 engaged by pins 389 projecting from the sides of the rectangular frame 371. As viewed in Fig. 31, the right-hand upright arm 390 of the frame 371 is formed with a shelf 391 projecting laterally above the rod 375, see also Fig. 33. A yoke-like member 392 has its legs 393 mounted on the rod 375 and is formed with a plate-like upper portion 394 extending between its legs and overlying the shelf 391 on the frame 271. A set-screw 395 threaded through a lug 396 projecting from the plate-portion 394 of the yoke 392 and locked in place by a nut 397 is adapted to engage with the shelf 391 to adjust the relationship of the frame 371 and thereby the elevation of the friction roller 377 on the shaft 373 which is rotated from the reverse-roll 15. The yoke 392 has one end formed as a lever 398 extending downwardly and connected at its end to a spring 400, see Figs. 31, 34 and 35, which has its opposite end anchored to a pin 401 on the nozzle 185. A laterally-extending arm 402 on the lever 398 terminates in a rounded portion with its lower edge of slightly arcuate cam-shape at 403. This cam-edge 403 is adapted to be engaged by a pin 405 projecting from the side of the stem 244 on the member 241 previously mentioned as secured fast on the rock-shaft 240. The rock-shaft 240 is operated by the lever 307 previously mentioned as carrying a roller 308 at its end which engages the periphery of a cam 310 in the control-unit. It will be understood that when the roller 308 is at the low point on the periphery of the cam 310 with the lever 398 in the position shown in Fig. 35 the pin 405 on the stem of the member 241 will be free from engagement with the cam-edge 403 on the arm 402 of the lever.

The lever 398 will thus be released to allow the spring 400 to rock the yoke 392 in a contraclockwise direction, thereby causing the set-screw 395 to act against the shelf 391 on the frame 371 to rock the latter and carry the roller 377 into contact with the periphery of the reverse-roll 15. The shaft 373 will thus be rotated to cause its eccentric pins 378 to oscillate the rocker-member 380 intermittently for wiping the edge of the beater-strip 370 along the surface of the package P as indicated by dotted lines in Fig. 33. This action by the beater assists in releasing the end of the yarn if it clings to the surface of the package so that it is more readily drawn into the vacuum-nozzle 185. On the other hand, when the lever 307 is swung in contraclockwise direction by the cam 310, as indicated in Fig. 34, the shaft 240 will be rocked in the same direction to carry the pin 405 against the cam-edge 403 on the arm 402 of the lever 398 and swing the yoke 392 clockwise on the shaft 375 to raise the set-screw 395 which bears on the shelf 391. The frame 371 will then be released to drop by gravity and lower the roller 377 away from the reverse-roll 15 so as to discontinue the oscillation of the beater 370.

*Anti-wrap roll-brush*

Figure 36:
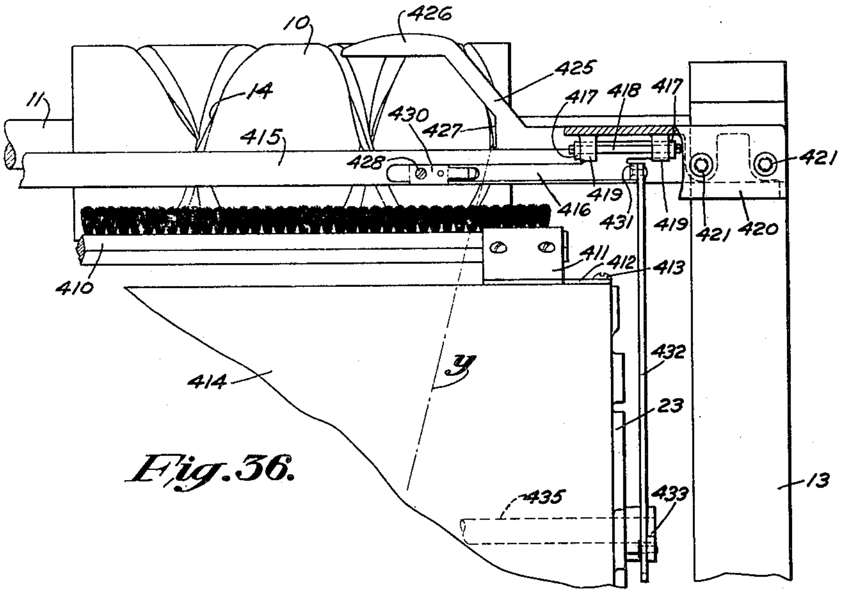
Fig. 36 is an enlarged elevational view of the drive-roll showing the brush for preventing the yarn from wrapping therearound and also the means for seizing the yarn and breaking it at the completion of winding a package.
Figures 37, 38:
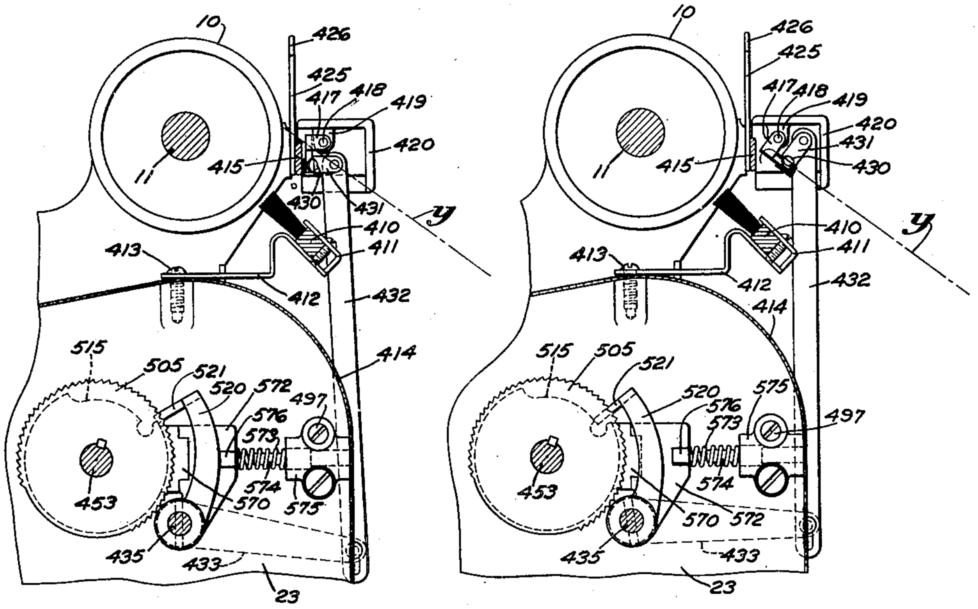
Fig. 37 is an end view of the same showing the end-breaking means in inoperative position before the yarn is seized thereby and illustrating its actuating means.
Fig. 38 is a similar view showing the end-breaking means thrown into operative relationship by its actuating means.

Referring to Figs. 36 to 38, brush 410 mounted below the drive-roll 10 is arranged with the ends of its bristles spaced slightly from the periphery of the roll for catching any loose length of yarn trailing from the package and tending to wind on the surface of the roll. The brush 410 extends longitudinally of the drive-roll 10 overlapping the ends thereof and is held in a clip 411 at the end of a sheet-metal arm 412 fastened to the side wall 23 of the frame 20 by a screw 413. A sheet-metal cover 414 closes the front of the frame 20 to protect the mechanism therein.

*Means for severing the yarn from the wound package*

Above the brush 410 is a horizontal rail or bail 415 having a rounded upper edge across which the yarn *y* feeds to the grooves 14 in the drive-roll 10 for traversing it lengthwise of the package. The bail 415 is fastened at its ends to the upper forward faces of the bearing-brackets 13. Normally lying flat against the forward face of the bail 415 is an elongate finger 416 formed by a sheet-metal strip provided at its end with ears 417 pivoted on a pin 418 which is held in lugs 419 on a sheet-metal angular bracket 420. The bracket 420 is fastened to the bearing-bracket 13 by screws 421, see Fig. 36, having their heads countersunk in the front of the bracket. An angular arm 425 fastened to one of the brackets 13 underlying the bail 415 has a horizontal extension 426 at its upper end and is formed therebelow with a vertical edge 427 located at a point inwardly from the end of the roll 10, thereby serving as a guard to prevent any broken end of the yarn from riding off the roll to overrun the end of the package. Fastened to the forward face of the finger 416 by a screw 428 is a clip 430 having its free end bent outwardly to provide a re-entrant opening between it and the finger for catching the yarn and holding it as indicated in Fig. 38 to break the strand when the package is completed and lifted off from the drive-roll 10. The finger 416 normally rests against the rail or bail 415 as shown in Fig. 37 during the winding of the package so that the clip 430 is out of the path of the yarn feeding thereto. At the completion of winding the package the finger 416 is swung outwardly from the bail 415 to cause the clip 430 to seize the yarn as it is traversed along the bail 415 and severs it from the package. Pivoted to an arm 431 projecting forwardly from the finger 416 is a link 432 pivotally connected at its lower end to a lever 433 fast on the rock-shaft 435 to be later described. When the lever 433 is rocked upwardly it will act through the link 432 to swing the finger 416 on its pivot 418 to carry the clip 430 into position to seize the yarn.

*Package-sizing mechanism*

It has been stated that as the yarn is wound on the cop-tube C the winding spindle 25 recedes from the drive-roll 10 with the increase in diameter of the winding mass with the arm 26 swinging upwardly about its pivot on the stud-shaft 29, see Figs. 1 and 2. To arrest the winding operation when the package reaches its predetermined diameter the arm 26 is swung upwardly positively to lift the package off from the drive-roll 10 through the operation of means next described. Fast on the end of the sleeve 33 to which the bearing 28 for the arm 26 is clamped is a lever 450, see Fig. 2, having its outer end pivotally connected to a rack-bar 451 that is slidably supported in a casing 452. The casing 452 is rockably mounted on the end of a horizontal shaft 453 journaled in a bearing in the side wall 23 of the frame 20 and a second bearing in the standard 175. The shaft 453 carries a spur-gear 455 with its teeth in mesh with those on the rack-bar 451 whereby through the rotation of the gear the rack-bar may be slid upwardly to rock the lever 450 and thereby raise the arm 26 to lift the package off from the drive-roll 10. The rack-bar 451 is adjustably held with its teeth in proper mesh with the teeth on the gear 455 by means of a pair of studs 456 engaging a guide- or wear-plate 457 that bears against the side of the bar to take the thrust of the gear. Suitable nuts on the ends of the studs 456 are set up against the casing 452 to lock the studs in adjusted position. A sheet-metal cover 458 attached to the open side of the casing 452 by screws 459 and a cap 460 fastened at its upper end by screws 461 protect the parts from lint and dirt; the cap 460 having a slotted opening through which the rack-bar 451 slides. A gasket, not shown, may be inserted between the cap 460 and the top of the casing to seal the opening through the cap and prevent lubricant from escaping at this point.

Rotation of the shaft 453 to turn the gear 455 and raise the rack-bar 451 to lift the package off from the drive-roll 10 for arresting the winding operation is accomplished by means, later described, actuated when the package reaches its predetermined diameter. To regulate the size of the package as desired the angular relation between the arm 26 which supports the package and the lever 450 may be altered by adjusting the bearing 28 around the sleeve 33. By unscrewing the bolt 36 the clamping plugs 35 may be released for turning the bearing 28 to adjust the arm 26 toward or away from the lever 450 so that the package P will be lifted off from the drive-roll 10 by the rack-bar 451 at an earlier or later stage in the winding operation to thereby control its size.

*Control means for sizing package*

Figures 41, 62:
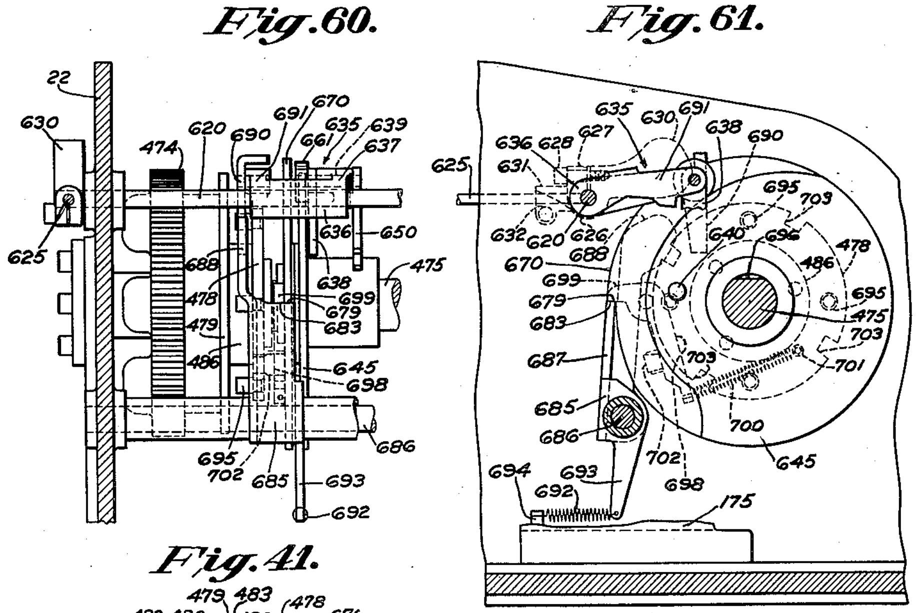
Fig. 41 is a front elevational view showing the end of the cam-shaft with its driving gear and the means for connecting said gear to turn the shaft.
Fig. 62 is a further view showing the locking means for the cam-shaft as operative.
Figure 42:
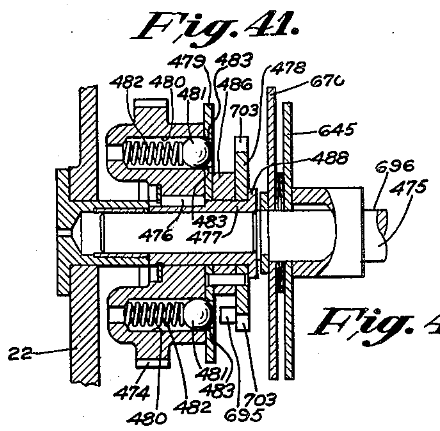
Fig. 42 is a sectional view of the same showing the yieldable clutch-means between the driving gear and the drive-plate for the cam-shaft.

As before indicated, automatically-operated means are provided for arresting the winding operation when the package reaches its predetermined size. The stopping mechanism is energized through connections actuated by the horizontal shaft 5, see Figs. 2 and 4, that is driven continuously from the power-means at the head end of the gang machine. The shaft 5 carries a spur-gear 465 for each unit of the gang machine, the gears being secured fast on the shaft by means of their split hubs 466 clamped thereto by screws 467, see Fig. 4. Each gear 465 meshes with a gear 470 fast on a stud-shaft 471 journaled in a suitable bearing in the wall 22 of the frame 20 of a winding unit and a bearing bracket 472, shown in Fig. 39, fastened to the base 21 of the frame. The stud-shaft 471 carries a smaller spur-gear 473 fast thereon at its opposite end and arranged in mesh with a larger gear 474. The gear 474 is normally rotatable on a horizontal shaft 475 journaled in bearings in the side walls of the frame 20 and constituted as the cam-shaft for the control-unit of the machine, see Fig. 39. Referring to Figs. 41 and 42, the gear 474 is keyed at 476 to a bushing 477 rotatable on the reduced end of the cam-shaft 475 and serves as a driver for an element 478, termed for convenience the "drive-plate" for the control-unit. The gear 474 is drivingly connected to a cam 479, called the oscillator-cam, and the drive-plate 478, preferably by ball-clutch means to adapt the connection to yield or be released under an abnormal increase in torque due to accident or obstruction to the movement of any of the driven parts including the control-cams. For this purpose the gear 474 is provided with a plurality of circumferentially-spaced pockets 480 slidably mounting balls 481 which are urged by helical springs 482 to engage in appropriate openings 483 in the disk-cam 479. The cam 479 is connected by rivets to the drive-plate 478 with a spacer-collar 486 therebetween. The collar 486 with its connected elements is rotatably mounted on the bushing 477 with the parts held from axial movement by a flange 488 at the end of the bushing. It will thus be understood that the gear 474 which is driven continuously from the lower drive-shaft 5, previously mentioned, is normally connected to drive the cam 479 throughout the continuous operation of the winding unit.

Figure 39:
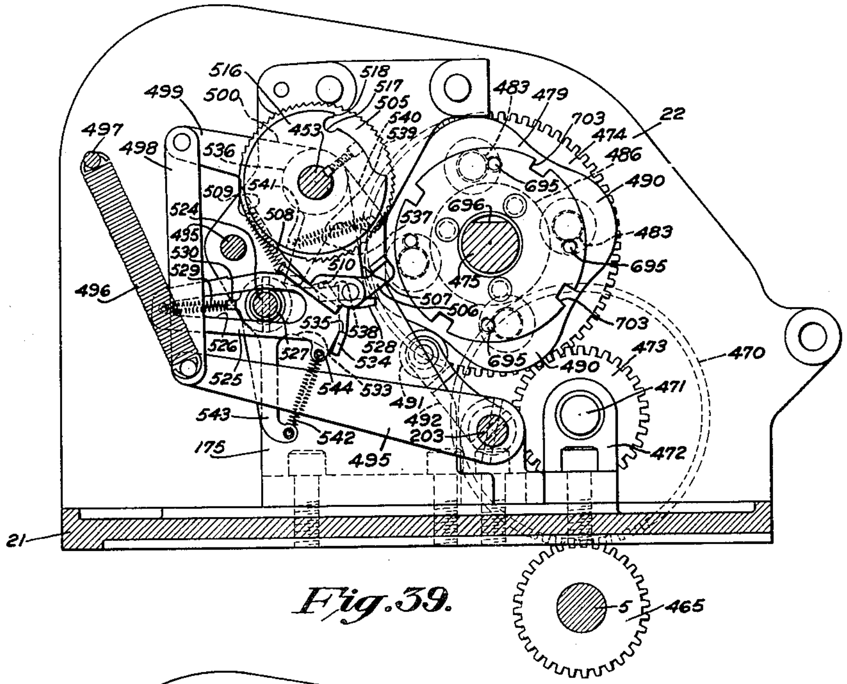
Fig. 39 is an elevational view illustrating the means for driving the cam-shaft, the continuously driven oscillator on the cam-shaft, and the package-lifting mechanism located within the main frame of the winding unit.
Figure 40:
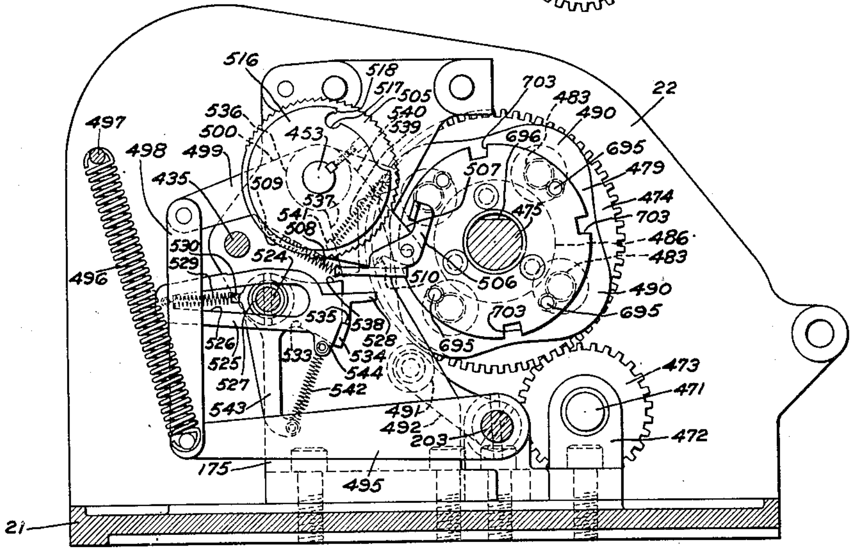
Fig. 40 is a similar view showing the parts in a different relationship during their operation.

The cam 479 serves as the prime-mover for actuating the stopping mechanism of the machine through connections described below that are thrown into operation when the package reaches its predetermined size. Referring to Figs. 39 and 40, the peripheral contour of the cam 479 is substantially quadrilateral with four rounded lobes 490 spaced equidistantly therearound. Engaging the periphery of the cam 479 is a roller 491 carried at the end of a forked lever 492 secured fast on the rock-shaft 203, previously mentioned, and supported in bearings in the bracket 472 and the end wall 23 of the frame 20. A second longer lever 495 also secured fast on the rockshaft 203 extends rearwardly therefrom with a helical spring 496 connected to its end and anchored at its opposite end by a pin 497 in the side wall 23 of the frame 20, see Fig. 44. The outer end of the lever 495 is pivotally connected to a link 498 having a pivotal connection at its upper end to an arm 499 extending from a member 500, termed an "oscillator" and somewhat similar to a "walking-beam," which is rockably mounted on the transverse shaft 453, previously mentioned. The spring 496 maintains the roller 491 in engagement with the periphery of the cam 479 which acts to rock the shaft 203 and lever 495 and thereby continuously oscillate the walking-beam or oscillator 500.

Figure 47:
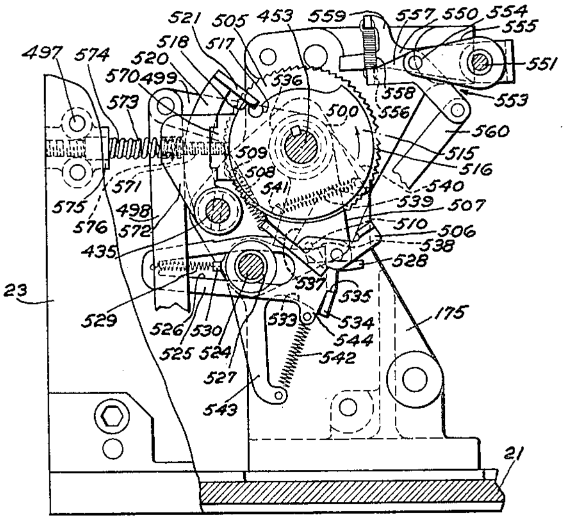
Fig. 47 is a view similar to Fig. 44 showing the package-sizing means with the safety-lever preventing its operation and illustrating the hold-back pawl disengaged from the ratchet-wheel which acts to lift the package from the drive-roll.
Figure 49:
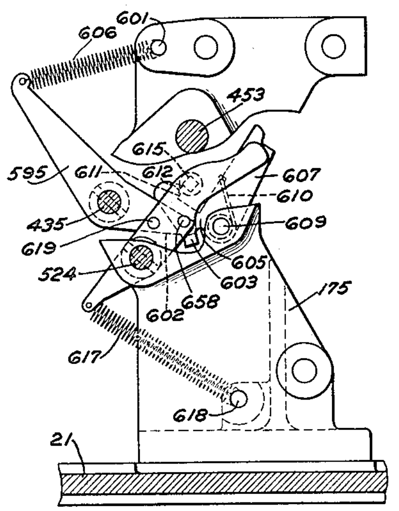
Fig. 49 is a further detailed view of the detent-means for the package-lifting means.

The shaft 453 carries fast thereon a ratchet-wheel 505 employed for rotating the gear 455, previously mentioned as meshing with the rack-bar 451, see Fig. 2, for sliding the bar to raise the cop-holder carrying arm 26 and lift the package off from the drive-roll 10. The ratchet-wheel 505 is rotated in contraclockwise direction, as viewed in Figs. 39 and 40, to turn the gear 455 and and lift the package off from the drive-roll 10 through the operation of a pawl 506 pivoted at the end of one arm 507 of the walking-beam or oscillator 500. A helical spring 508 hooked into the tail end of the pawl 506 has its opposite end fastened to a pin 509 on the oscillator 500, thereby normally tending to maintain the pawl disengaged from the ratchet-wheel 505 as shown in Fig. 47. The pawl 506 carries a pin 510 projecting from its side and adapted to be engaged by means later described to rock the pawl into engagement with the teeth of the ratchet-wheel 505. With the pawl 506 engaged with the ratchet-wheel 505, see Fig. 48, the rocking motion of the oscillator 500 will actuate the pawl to turn the ratchet-wheel and thereby rotate the gear 455 to slide the rack-bar 451 and lift the package off from the drive-roll 10.

At the side of the ratchet-wheel 505 is a disk 515 secured fast to the shaft 453 and formed with a peripheral face 516 of substantial width which is generally cylindrical throughout substantially two hundred and seventy degrees of its circumference. Interrupting this cylindrical face of the disk 515 its periphery is recessed to provide a circular face of less diameter terminating in a notch 517 which forms a radial shoulder 518. A curved lever 520 has its hub secured fast on the rock-shaft 435, previously mentioned, and terminates in a right-angular projection 521, the end of which normally rides on the peripheral face 516 of the disk 515, see Fig. 43. It will be understood that as the arm 26 carrying the winding mandrel 24 rises with the growth in diameter of the package, see Fig. 2, the gear 455 will be rotated by the rack-bar 451 to turn the shaft 453 and the disk 515 fast thereon. As the package reaches its predetermined diameter the disk 515 will have been turned sufficiently to carry its shoulder 518 past the projection 521 on the end of the lever 520 to permit it to drop into the notch 517. The lever 520 will thus be released to move in clockwise direction to rock the shaft 435, see Fig. 44, and initiate the operation of instrumentalities, later described, for arresting the operation of the machine. The lever 520 is released from engagement with the shoulder 518 on the disk 515 by rocking the shaft 435 through manual operation of the starting mechanism of the machine as later explained.

*Package-lifting means*

Figure 44:
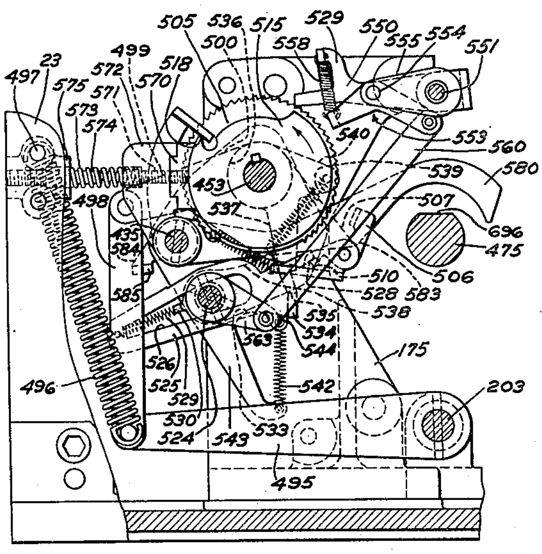
Fig. 44 is a similar elevational view showing certain of the parts of the package-sizing mechanism.
Figures 48, 50, 51:
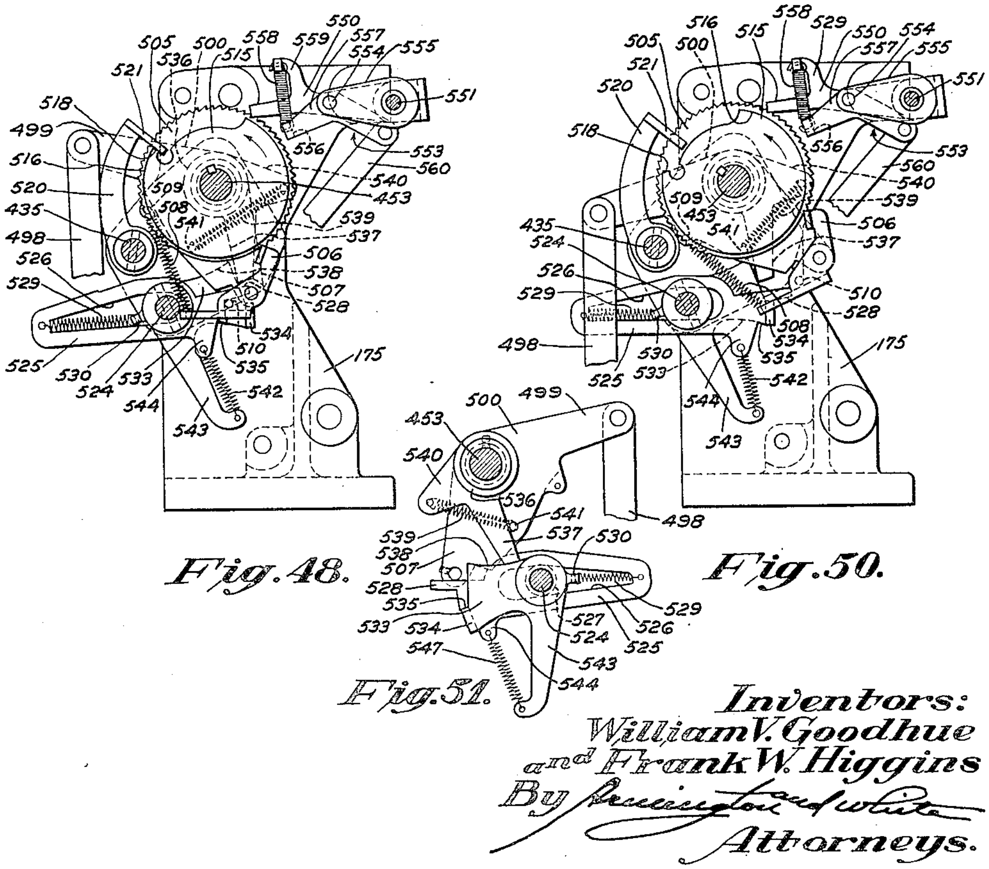
Fig. 48 is a similar view showing the package-lifting pawl engaged with the teeth on the ratchet-wheel to rotate the wheel and the hold-back pawl also engaged therewith.
Fig. 50 is a view similar to Fig. 48 showing the parts in different relationship after the ratchet-wheel has been rotated to lift the package from the drive-roll.
Fig. 51 is a detailed view of the anvil and trigger mechanism for controlling the operation of the package-lifting mechanism.

The ratchet-advancing pawl 506 is carried into engagement with the teeth on the ratchet-wheel 505 by means shown in Figs. 44, 47 and 48 and next described. A horizontal shaft 524 is rockably mounted in the side wall 23 of the frame 20 and a bearing in the central standard 175. Slidably and rockably mounted on the rock-shaft 524 is a member 525, called a "trigger," formed with an elongate slot 526 through which the shaft projects. The forward portion of the slot 526 is of a width to adapt it to enclose a sleeve 527, shown by dotted lines in Fig. 51, on the shaft 524 while its rearward portion is tapered throughout the remainder of its length. The forward end of the trigger is formed with a horizontal projection or shelf 528 which functions to control the operation of the pawl 506 in the manner as later explained. A helical spring 529 attached to the rearward end of the trigger 525 has its opposite end connected to a lug 530 on the hub of a member 533 called the "anvil" which is mounted fast on the shaft 524. The spring 529 tends to slide the trigger 525 forwardly, or to the right as viewed in Figs. 44 and 47.

Referring more particularly to Fig. 51, the anvil 533 is disposed alongside the trigger 525 and formed with a right-angular extension or ear 534 adapted to be engaged by a detent-shoulder 535 below the shelf 528 at the end of the trigger whereby to latch the parts in connected relationship. Free to turn on the shaft 453 which carries the oscillator 500 is a so-called safety lever 536 having a downwardly-projecting arm 537 with its end of arcuate contour to adapt it to slide back and forth above the curved upper edge 538 of the anvil 533. The safety lever 536 is employed as a precautionary measure to prevent the anvil 533 from being rocked until the pawl 506 is in proper relation to the trigger to effect its engagement with the teeth on the ratchet-wheel 505. A spring 539 normally maintains the lever 536 in the position shown in Fig. 51 with its arm 537 engaged against a pin 541 projecting from the side of the oscillator 500. The spring 539 is fastened to the lateral arm 540 of the lever 536 and anchored to the pin 541 on the oscillator 500. The safety lever 536 moves with the oscillator 500 at each stroke to the right or contraclockwise, as viewed in Fig. 40, the end of its arm 537 reaches a position beyond the end of the curved upper edge 535 of the anvil 533. It is therefore only when the safety lever 536 is in this position as shown in Fig. 48 that the anvil 533 will be permitted to be rocked by the shaft 524. Then at the next oscillation of the oscillator 500 in the opposite direction the end of the arm 537 will engage its end with the end of the anvil 533 to cause the arm to be held against the tension of the spring 539 to stretch the latter as the pin 541 recedes from the arm. A spring 542 connected to the downwardly-projecting arm 543 of the anvil 533 and anchored to an ear 544 on the trigger 525 tends to maintain the anvil and trigger locked together in the relationship shown in Fig. 51.

During the normal operation of the machine the spring 508 holds the pawl 506 in disengaged position as illustrated in Fig. 47 with the pin 510 on its side elevated above the shelf 528 on the trigger 525. When the anvil 533 is rotated in contraclockwise direction, as viewed in Fig. 44, the trigger 525 will be rocked in the same direction so that the shelf 528 will be elevated above the pin 510 on the pawl 506. The next oscillation of the oscillator 500 will therefore cause the pin 510 to ride in under the shelf 528 and engage with the vertical edge therebelow to slide the trigger 525 to the left as shown in Fig. 48 so as to disengage the shoulder 535 on the trigger from the ear 534 on the anvil 533. At this juncture the spring 542 will rock the trigger 525 downwardly to cause the shelf 528 through its contact with the pin 510 to rock the pawl 506 contraclockwise and engage it with the teeth on the ratchet-wheel 505.

It has been stated that the oscillator 500 is rocked or oscillated continuously by the cam 479 driven from the power-shaft 5. Therefore it will be understood that when the pawl 506 is carried into position to engage one of the teeth on the ratchet-wheel 505 it will be reciprocated by the oscillator to turn the ratchet-wheel and thereby the gear 455, see Fig. 2, to slide the rack-bar 451 upwardly. The rack-bar 451 will thereby swing the arm 450 in clockwise direction as viewed in Fig. 2 to raise the arm 26 for lifting the package P off from the drive-roll 10 so as to arrest its rotation. In this way the winding of the yarn on the package P is arrested when the latter reaches its predetermined diameter. To prevent the ratchet-wheel 505 from turning in the opposite direction and allow the rack-bar 451 to descend, a hold-back pawl 550 is provided for engaging the teeth on the ratchet-wheel.

Figure 43:
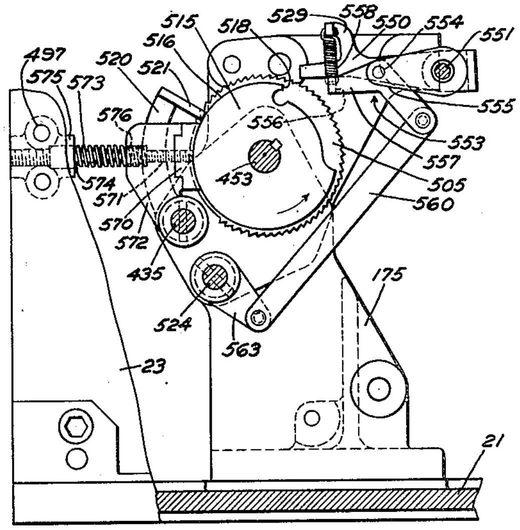
Fig. 43 is a detailed elevational view of the package-sizing means and the snubber for controlling the movement of the winding spindle away from the drive-roll during the growth in diameter of the package.
Figure 45:
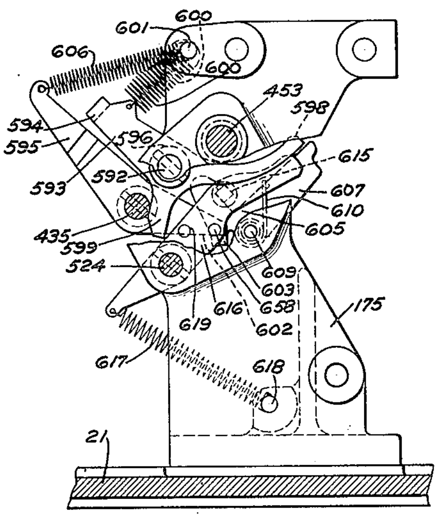
Fig. 45 is a detailed view showing the means for latching the detent-means that holds the package-lifting means.

The hold-back pawl 550, shown in Figs. 43 and 44, has a folded end portion pivoted on a stud 551 screwed into a boss on the inside of the wall 23 of the frame 20. Beneath the hold-back pawl 550 is a bell-crank lifter-lever 553 pivoted at 554 to the end of an arm 555 fastened to the side wall 23 of the frame 20 by the stud 551. The lifter-lever 553 has a right-angular projection 556 at the end of its arm 557 which underlies the forward portion of the hold-back pawl 550 and is pierced with a hole for connecting a helical spring 558 thereto. The upper end of the spring 558 is fastened to a lug on the upstanding curved arm 559 of the pawl 550. When the arm 557 of the lifter-lever 553 is rocked downwardly to the position shown in Fig. 44, the pawl 550 will be yieldingly engaged with one of the teeth on the ratchet-wheel by the tension of the spring 558. Alternately, when the arm 557 of the lifter-lever 553 is rocked upwardly to its normal position shown in Fig. 43, it will raise the pawl 550 clear of the teeth on the ratchet-wheel 505 to allow the latter to rotate clockwise and permit turning of the shaft 453 and gear 455 at its end. The rack-bar 451 will then be free to descend to allow the package P to move down into contact with the drive-roll 10 under the action of gravity.

The lifter-lever 553 is rocked into this last-described relationship to maintain the pawl 550 disengaged from the teeth on the ratchet-wheel 505 by means of a link 560 connected to its downwardly-projecting arm. The lower end of the link 560 is connected to a relatively short lever 563 fast on the rock-shaft 524, previously mentioned. The rock-shaft 524 is rocked by means actuated by the reset lever of the machine, to be later described, and connected with detent-means for cocking and latching the stopping mechanism to continue the winding operation after the cop-tube or the package itself, as the case may be, is carried into driving engagement with the drive-roll.

*Snubbing means for controlling spindle rise*

The cylindrical face 516 of the disk 515 is employed as a brake-drum for snubbing the movement of the winding mandrel 24 away from the drive-roll 10 during the growth in diameter of the package. For this purpose it is engaged by a spring-pressed brake-shoe 570, shown in detail in Fig. 43. The brake-shoe 570 is fastened by a screw 571 to the end of a relatively short lever 572 having its hub fast on the rock-shaft 435. A helical spring 573 having its end pocketed in a counterbore on the back of the lever 572 encircles a pin 574 supported by its end held in a block 575 fastened to the side wall 23 of the frame 20. The spring 573 acts on the lever 572 to press the brake-shoe 570 against the cylindrical face 516 of the disk 515 to apply frictional resistance to the turning of the disk and thereby the gear 455 which engages the rack-bar 451, see Fig. 2. Through this means the movement of the arm 26 is snubbed and effectually controlled to prevent the package P from vibrating or bouncing on the drive-roll 10 as it is rotated thereby during the winding operation.

*Snubber releasing means*

The lever 572 is rocked by the lever 520 to release the brake-shoe 570 from the disk 515 so as to permit the shaft 453 and gear 455 to turn and allow the package to drop back into engagement with the drive-roll 10 in restarting the winding operation. Projecting from one side of the snubber-lever 572 is a lug 576, see Fig. 63 and dotted lines in Fig. 43, which is engaged by the edge of the lever 520 when the latter is released from the recess in the disk 515 in starting the winding operation. The lever 572 is also rocked to release the brake-shoe 570 during the shifting of the package from the drive-roll 10 to the rest 360 and from the rest to the reverse-roll 15 so that the package will be free to drop slightly during its transfer between the drive-roll and the reverse-roll. For this purpose the rock-shaft 435 has secured fast thereto a relatively long lever 580, see Figs. 2, 29, 30 and 44, which has a downwardly-curved end portion terminating in a rounded point. The end of the lever 580 is adapted to be engaged by a pin 581 projecting from the side of the cam 365, shown by dotted lines in Fig. 2 and previously referred to. Rotation of the cam 365 causes the pin 581 to lift the lever 580 as shown in Fig. 29, whereby to rock the shaft 435 and release the lever 520 from the disk 515. As the lever 520 is released its edge will engage the lug 576 on the snubber-lever 572 and rock the latter to release the brake-shoe 570. This release of the brake-shoe 570 allows the shaft 453 and the gear 455 to turn freely for permitting the rack-bar 451 to descend slightly so that the package P can be shifted from the drive-roll 10 onto the rest 360, see Fig. 2. The release of the snubbing means is repeated as the package is shifted from the rest 360 to the reverse roll 15, this action being effected as the pin 581 engages with the angularly-disposed edge 583 of the lever 580 to lift it again as shown in Fig. 30.

The lever 580 has a still further function to assist in the resetting of the package-lifting means. At the rearward end of the lever 580 is a tail-piece 584 formed with a right-angular projection or lug 585 which is positioned above the rearward end of the trigger 525, see Fig. 44. When the shaft 435 is rocked contra-clockwise so as to rock the lever 580 the lug 585 will be located slightly above the end of the trigger 525. Consequently, when the shaft 524 is rocked clockwise to rock the anvil 533 and trigger 525 the rearward end of the trigger will be elevated to contact the lug 585 and be held from further movement in position for its detent-shoulder 535 to positively engage with the ear 534 on the anvil 533 for reconnecting these parts in latched relationship as shown in Fig. 47.

*Jet-air valve operating means*

The rocking motion of the lever 580 and the rock-shaft 435 also acts to open the air-valve 92 on the outside of the wall 23 of the frame 20, see Fig. 2, this valve being employed for furnishing air under pressure to the jets for cleaning the tension-device and slub-catchers. For this purpose the lever 433 which is fast on the end of the shaft 435 has a lug 587 in which is an adjustable screw 588 secured by a check-nut 589. The lower end of the screw 588 is adapted to engage the upper end of the plunger 93 to depress it and open the air-valve 92.

*Reset lever for manually starting machine and cocking automatic end-finding mechanism*

Figure 52:
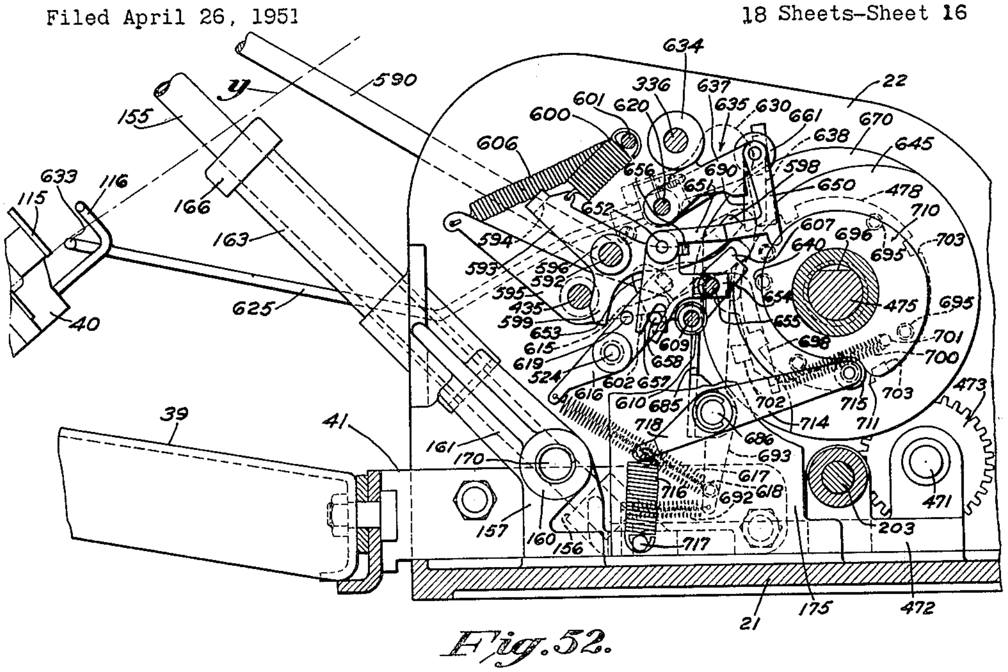
Fig. 52 is an elevational view of the automatically-operated latching mechanism for resetting the detent-means.
Figures 54, 55, 56, 57, 58, 59:
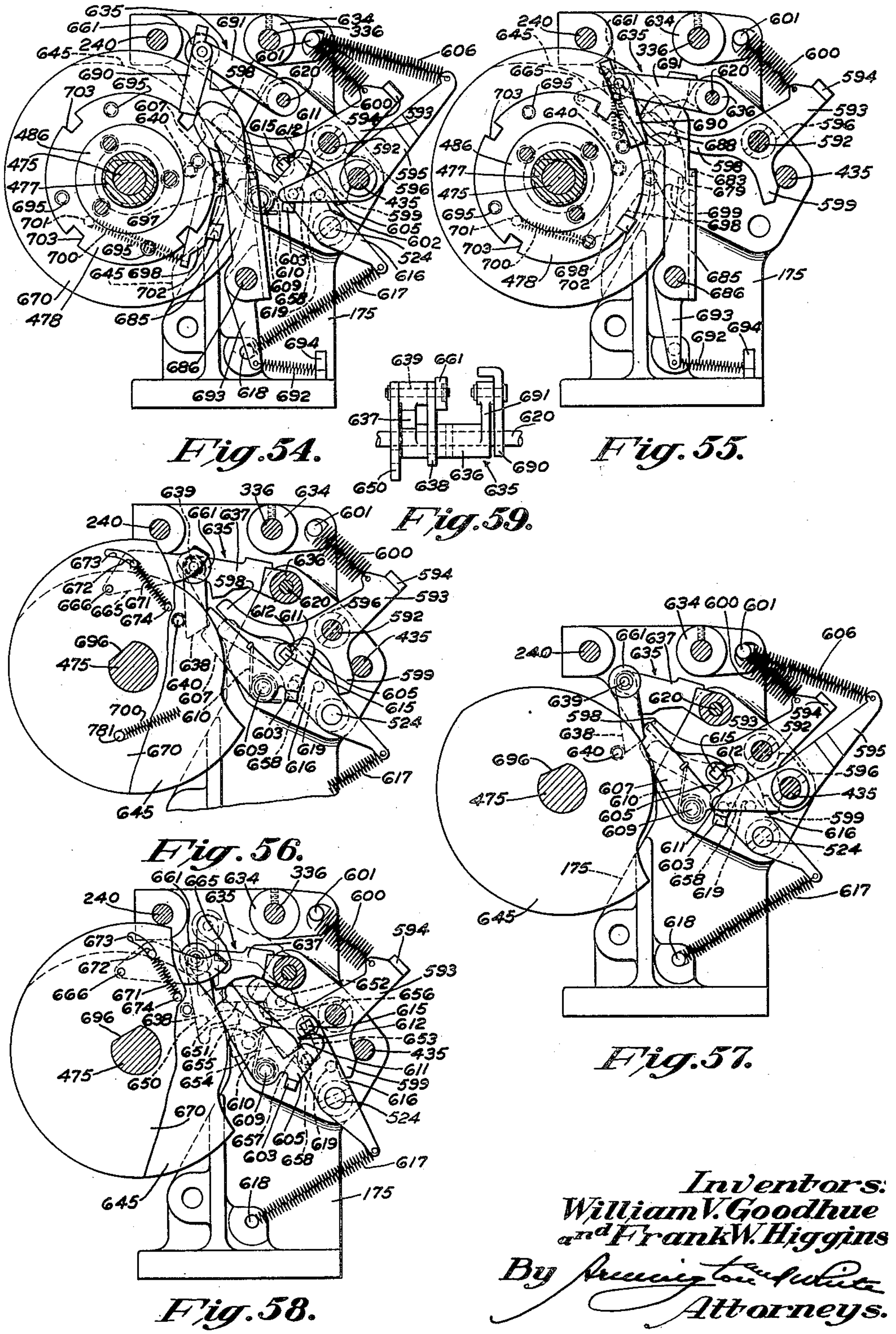
Figs. 54 and 55 are detailed views of the means for actuating the control-unit.
Figs. 56, 57 and 58 are detailed views of the detent-means shown as latched at different stages and unlatched.
Fig. 59 is an end view of the breakage-lever yoke showing the arrangement of the pendants thereon which initiate the operation of the control-unit.
Figure 63:
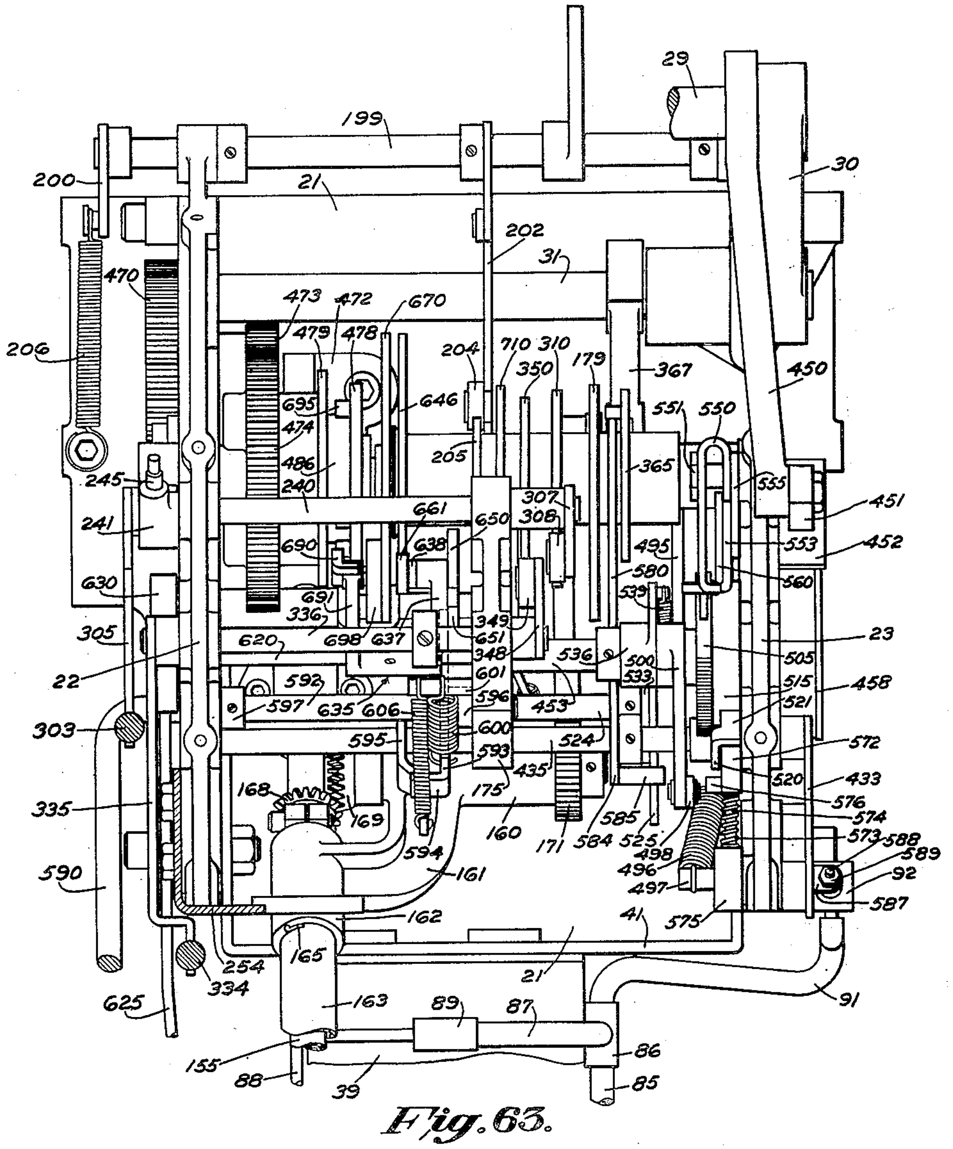
Fig. 63 is a plan view of the control-unit located within the confines of the machine frame.

Referring to Figs. 4, 52 and 63, a reset lever 590 constructed of round rod and provided with a plastic ball 591 at its end for grasping in the hand is located on the outside of the wall 22 of the frame 20. The rod of the lever 590 extends in a portion bent at right-angles to provide a horizontal shaft 592 mounted to rotate in bearings in the wall 22 and the standard 175 above the rock-shaft 435, see Fig. 52. Fast on the horizontal shaft 592 of the lever 590 is a reset arm 593 having its forward end bent at right-angles to form a lug 594 adapted to engage across the upper edge of a sizing lever 595 having its hub pinned to the rock-shaft 435. The hub 596 of the reset arm 593 abuts a finished face on the standard 175 and a collar 597 abuts a finished boss on the inside of the wall 22 of the frame 20 to prevent axial movement of the horizontal shaft 592 of the reset lever 590, see Fig. 63. The reset arm 593 has an arcuately-shaped rearwardly-extending tail-piece 598, see Fig. 56, provided for a purpose later explained, and also a downwardly-extending arm 599. A helical spring 600 connects the outer end of the reset lever 593 to a pin 601 in the standard 175 to normally maintain the lug 594 at its end clear of the lever 595. The arm 599 of the lever 593 is adapted to engage against the shaft 435 to limit the rocking motion of the lever under the force of the spring 600. A triangularly-shaped arm 602, see Fig. 54, extends rearwardly from the lever 595 for engagement with a lug 603 on a latch-lever 605, later described. A spring 606 connects the upper end of the lever 595 to the pin 601, previously mentioned, thereby tending to rock said lever in contra-clockwise direction, as viewed in Fig. 54, to maintain its rearward end bearing against the lug 603 on the latch-lever 605. The latch-lever 605 is pivoted on a stud 609 held in the side of the standard 175 and normally urged to rock in contraclockwise direction, as viewed in Fig. 56, by a spring 610 coiled around the stud 609 with its longer end hooked over the rearward arm 607 of the latch-lever and its shorter end held fast in a hole in the standard 175. The shorter arm of the latch-lever 605 terminates in a rounded toe formed with a rearward recess and two latching teeth or steps 611 and 612. Referring to Figs. 56 and 57, one or the other of the two steps 611 and 612 on the latch-lever 605 is adapted to be engaged with the squared end of a pin 615 projecting from the side of a detent-lever 616 having its hub pinned to the end of the shaft 524, previously referred to as carrying the trigger 525. A spring 617 fastened to the lower end of the detent-lever 616 has its opposite end anchored to a pin 618 in the standard 175 and tends to normally rock said lever in clockwise direction, as viewed in Fig. 54, to maintain the squared end of the pin 615 in engagement with one or the other of the stepped teeth 611 and 612 on the latch-lever 605. A pin 619 projecting from the side of the detent-lever 616 is adapted to be engaged by the arm 599 on the reset-arm 593 for a purpose later explained.

*Yarn-breakage lever*

A relatively short horizontal shaft 620, see Fig. 4, is rockably mounted at its rearward end in the standard 175 with its forward end projecting through a bearing in the side wall 22 of the frame 20. Mounted on this projecting end of the shaft 620 is a bent wire breakage-lever 625 secured to a hub 626 bored to receive the end of the shaft 620 and split at 627 with a binder-screw 628 for clamping it thereto. The hub 626 is formed with a rearwardly-extending enlargement 630 serving as a weight for counterbalancing the lever 625 which has its end held in a split tubular portion 631 of the hub and clamped thereto by a binder-screw 632. The wire breakage lever 625 extends forwardly in angular shape and is bent at right-angles at the end to form a horizontal crossbar 633, see Figs. 6 and 52, normally held depressed by the yarn y drawing thereacross as it feeds to the winding package. The weight 630 at the end of the hub 626 tends to swing the breakage-lever 625 upwardly when the yarn is broken or its supply exhausted to thereby rock the shaft 620 in contraclockwise direction as viewed in Fig. 4.

Figure 53:
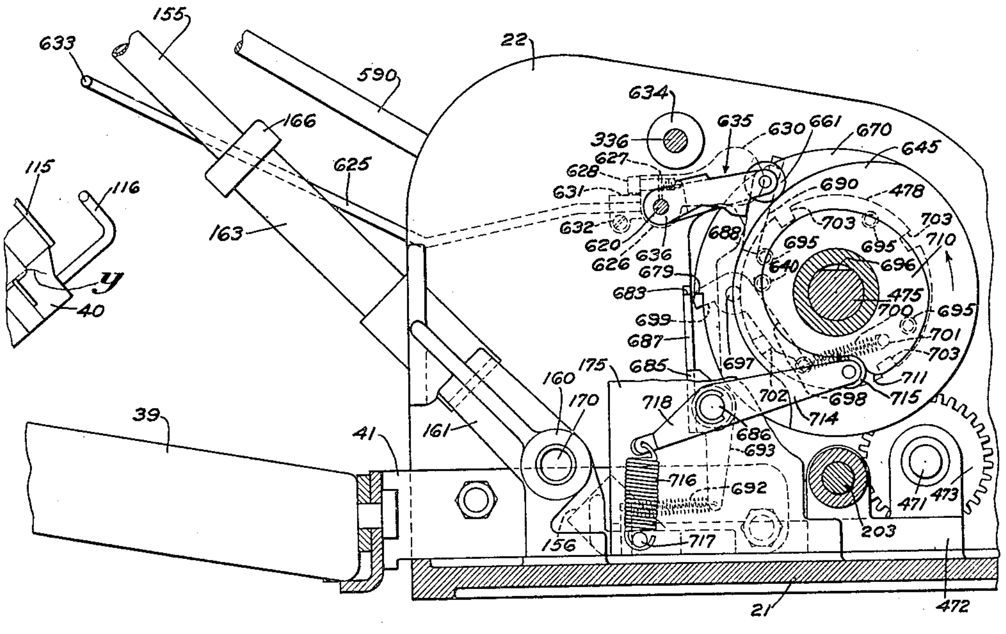
Fig. 53 is a similar view showing the locking means for the cam-shaft as inoperative and also illustrating the means for resisting reverse rotation of the cam-shaft.

The breakage-lever shaft 620 carries a two-armed lever 635 termed the "breakage-lever yoke," see Figs. 53 and 59, having a common hub 636 pinned to the shaft to secure it fast therewith. A collar 634 on the shaft 336, see Fig. 54, is adapted to engage with the yoke 635 to limit its upward movement and thereby the downward swinging movement of the breakage-lever 625. The rearward arm 637 of the yoke 635 carries a pawl 638, termed the "package-lifting pendant," which is pivoted on a stud 639 with its lower end adapted to engage the notched end of the longer arm 607 of the latch-lever 605, as shown in Fig. 56, whereby to rock the latter and release one or the other of its latching teeth from the pin 615 on the detent-lever 616. The pendant 638 is carried into engagement with the notched end of the latch-lever 605 by the engagement therewith of a pin 640 projecting from the side of a breakage-lever cam 645 fast on the cam-shaft 475. The cam-shaft 475 rotates through approximately three hundred and fifty degrees before the pin 640 contacts the package-lifting pendant 638 to move it into engagement with the notched end of the latch-lever 605 and rock the latter sufficiently to release its first step 611 from the detent-pin 615 on the detent-lever 616 and cause its second step 612 to be engaged with the pin, see Fig. 57; whereafter, if the ends of the yarn are not tied the action is repeated to release the detent-pin from the second step 612 of the latch-lever 605 and free the detent-lever 616 and shaft 524 to be rocked under the force of the spring 617. As the latch-lever 605 is rocked in this manner its lug 603 will be moved downwardly to allow the sizing lever 595, shown in Fig. 54, to be rocked by its spring 606 to rock the shaft 435 for lifting the package P off from the drive-roll 10 by the means shown in Fig. 48 and previously described.

Figures 60, 61:
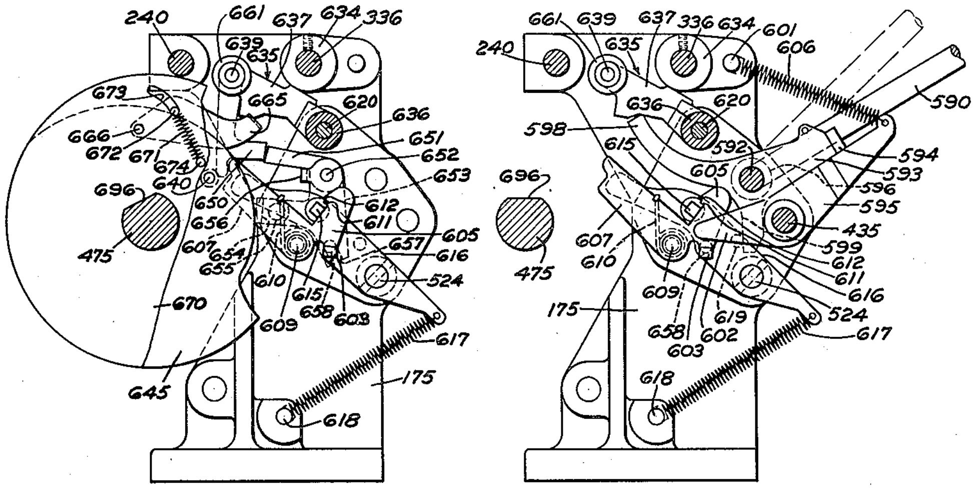
Fig. 60 is a detailed view of the automatically-operative relatching means for the detent-means.
Fig. 61 is a similar view showing the manually-operative latching means.

Pivoted to the end of the rearward arm 637 of the breakage-lever yoke 635 is a second depending L-shaped pawl or pendant 650, see Figs. 52, 59 and 60, having a right-angular projection adjacent its end adapted to engage against the end of an arm 651 pivoted at 652 to a recocking lever 653. The lever 653 is provided with a folded or bifurcated portion 654, see dotted lines in Fig. 60, pivotally mounted on a pin 655 held fast in the side of the standard 175. A finger 656 projects laterally from the lever 653 beneath the pivoted arm 651 to sustain the latter in substantially horizontal position as shown in Fig. 52. The recocking-lever 653 is formed at its lower end with a re-entrant slot 657 engaged by a pin 658 projecting from the side of the detent-lever 616 whereby to rock the latter to engage its pin 615 with the latch-lever 605. The engagement of the pendant 650 with the end of the arm 651 on the recocking lever 653 is effected by the contact of the pin 640 on the cam 645 with its lower rounded end, see Fig. 60.

Journaled on the rearward arm of the breakage-lever yoke 635 is a roller 661 adapted to engage with the periphery of the cam 645, see Fig. 62, it being now explained that the arcuate tail-portion 598 of the reset arm 593 is arranged to engage beneath the arm 637 of the yoke 635, as shown in Fig. 61, to raise the roller 661 off from the edge of the cam 645. The roller 661 on the arm 637 of the yoke 635, which latter is fast on the breakage-lever shaft 620, is adapted to engage the periphery of the cam 645 to rock said shaft and return the breakage-lever 625 to the position shown in Fig. 4 with its crossbar 633 located for engaging under the yarn feeding to the package. For holding the breakage-lever yoke 635 in its upper position pressed firmly against the stop-collar 634, as shown in Fig. 60, a relatively light guard-lever 665 is pivoted at 666 on the side of an actuator-disk 670, fast on the cam-shaft 475 as later described, and formed with its forward portion bent laterally to engage under the roller 661 on the arm 637 of the yoke. The guard-lever 665 normally is urged downwardly by a helical spring 671 fastened to a pin 672 projecting from the side of the lever 665 through an arcuate slot 673 in the disk 670 with its opposite end anchored to a pin 674 on said disk. The guard-lever 665 thus acts to prevent the yoke 635 from vibrating during recocking of the detent-means. The guard-lever 665 is also adapted to ride above the roller 661 and engage therewith to hold the breakage-lever yoke 635 in depressed relationship firmly engaged with the end of the tail 598 of the reset-lever 593; this action taking place during the repeat operation of the end-finding means.

*Locking means for cam-shaft*

To prevent accidental or unwarranted rotation of the cam-shaft 475 and the cams carried thereby during the winding operation of the machine, locking means are provided for engagement with a detent-shoulder 679 on the actuator-disk 670 as shown most clearly in Fig. 62. Referring to Fig. 42, the actuator-disk 670 is keyed to the cam-shaft 475 and acts to initiate the rotation thereof and that of the whole series of cams in the control-unit which are also keyed to the cam-shaft; these connections being described later. The actuator-disk 670 has a generally circular peripheral contour recessed throughout a portion of its circumference to form the detent-shoulder 679 that is adapted to be engaged by a detent-shoulder 683 on a locking lever 685. The locking lever 685 is pivoted on a horizontal shaft 686 and formed with a right-angular flange 687 projecting from one side and terminating in the shoulder 683. Above the shoulder 683 the locking lever 685 terminates in a rounded head 688 with its edge adapted to be engaged by the end of a pendant 690 pivoted to the end of the forward arm 691 on the yoke 635, see Figs. 54, 55 and 59. A spring 692 fastened to the downwardly-extending arm 693 of the locking lever 685 and anchored to a pin 694 in the standard 175 tends to maintain the detent-shoulder 683 against the periphery of the actuator-cam 670. When the pendant 690 is engaged by one of four pins 695 on the cam cycle drive-plate 478 it is rocked forwardly as shown in Fig. 53 to move the lever 685 and release the detent-shoulder 683 on its flange 687 from the shoulder 679 on the actuator-disk 670 whereby to permit the latter to rotate. It is here noted that the cam-shaft 475 is flattened on one side at 696 throughout the portion carrying the several cams and each of the cams and the disks mounted thereon have their bores of the same contour with straight edges engageable with the flat portion of the cam-shaft to key them thereto; the cams and disks being preferably stamped out from sheet-metal with their peripheries contoured to the required shape as shown in the drawings.

Pivoted to the side of the actuator-disk 670 at 697 is a parrot-shaped cam-actuator driver-pawl 698 having a beak-portion 699 adapted to engage across the shoulder 683 on the locking lever 685; a spring 700 fastened to the lower end of the pawl and anchored to a pin 701 on the actuator-disk 670 tends to maintain the pawl in this position as shown by the dotted lines in Fig. 62. The pawl 698 is formed with a lug 702 projecting from its side at its lower end and adapted to engage in one of four square notches 703 spaced equidistantly around the periphery of the drive-plate 478. When the beak 699 of the pawl 698 is released from the shoulder 683 on the locking lever 685 the spring 700 will act to rock the pawl to cause its lug 702 to ride on the periphery of the drive-plate 478 and eventually engage in one of the notches 703 to lock the actuator-disk 670 therewith and thereby drive the cam-shaft 475 to rotate the whole series of cams in the control-unit.

*Hold-back means for cam-shaft*

As a precautionary measure, means are provided for checking reverse rotation of the cam-shaft 475 after it has been locked by engagement of the shoulder 683 on the locking lever 687 with the shoulder 679 on the actuator-disk 670. For this purpose a hold-back cam 710 is mounted fast on the cam-shaft 475 between the package-vacuum valve 205 and the knotter-operating cam 350, see Figs. 53 and 63. The cam 710 has an eccentric periphery formed with a gradual rise terminating in a rounded shoulder at 711. Pivoted on the shaft 686, previously mentioned, is a two-armed lever 714 carrying a roller 715 journaled on its forward end which engages the periphery of the cam 710. A relatively heavy spring 716 anchored to a pin 717 at the base of the standard 175 has its opposite end connected to the rearward arm 718 of the lever 714, tending to maintain the roller 715 bearing against the periphery of the cam 710 under considerable pressure. The driver-pawl 698 is held from pivoting by its engagement with the shoulder 683 on the lever 685 and its lug 702 is thereby prevented from engagement with the notches 703 in the drive-plate 478.

*Method of operation of winding unit*

To prepare the winding unit for operation a cop-tube or package-core C is placed on the winding mandrel or holder 24 and secured in place to rotate therewith about the spindle 25. The yarn *y* from a bobbin or other suitable source of supply, supported therebelow but not herein illustrated, is drawn up and entered in the guide slot 45 of the end-plate 42 on the tension-assembly, see Figs. 1 to 5, then led under the slack-lever 55 and the detector-fingers 61 to lie across the bars of the grid 60. The yarn *y* is then carried down along the vertical extension 83 of the tubular guide 82 to cause it to draw under the circular portion of the guide and enter between the contacting faces of the tension-disks 70. From the tension-disks 70 the yarn is entered between the blades of the dual slub-catchers 95, and under the lower edge of the guide-plate 115, thence above the crossbar 633 of the breakage lever 625 and under the horizontal portion of the wire guide 116. From the tension-assembly the yarn is led upwardly across the horizontal bail 415 in front of the drive-roll 10 and its end secured to the cop-tube C by any suitable means.

A spare or reserve yarn *y'* supplied from another bobbin arranged below is led upwardly therefrom and carried across the shoulder 46 on the guide plate 42, see Fig. 5, thence across the slack-lever 55 in its notch 57 and finally to the clip-lever 120 where its end is engaged in the spring-clip 121, see Fig. 11, to hold the strand under tension.

*Starting the winding operation*

The machine is started to operate by grasping the knob 591 on the end of the starting or reset-lever 590, see Fig. 4, and pressing the latter downwardly to rock its horizontal shaft 592 in contraclockwise direction as viewed in Fig. 52. The reset arm 593 on the shaft 592 will be rocked in the same direction against the force of its spring 600 to cause the lug 594 at its end to engage the edge of the sizing lever 595 and rock the latter downwardly against the tension of its spring 606. The sizing lever 595 is fast on the rock-shaft 435 which is rocked thereby in the same direction to release the means holding the spindle-carrying arm 26 raised when the winding operation is arrested. Referring to Fig. 61, in which the parts are viewed in the opposite direction from that of Fig. 52, when the reset arm 593 is rocked downwardly its depending projection 599 strikes against the pin 619 on the detent-lever 616 to rock the latter against the tension of its spring 617 and thereby rock the shaft 524 in contraclockwise direction as viewed in Fig. 61. In the meantime the lug 594 on the reset arm 593 has rocked the sizing lever 595 to raise its triangularly-shaped tail portion 602 from the lug 603 on the latch-lever 605 so that the latter will be rocked by its spring 610 to engage its toothed or stepped portion with the square-ended pin 615 on the detent-lever 616 as shown in Fig. 61. By this operation the detent-lever 616 is latched to maintain the parts co-ordinated therewith in operative relationship during the winding operation of the machine.

It will be understood that when the machine is prepared for winding the spindle-carrying arm 26 will be in elevated position with the winding mandrel 24 raised above the drive-roll 10 so that the cop-tube C is free from contact therewith. After the machine has been prepared for winding and the starting or reset lever 590 depressed in the manner last explained it will act through the instrumentalities shown in Figs. 47 and 48 to release the ratchet-wheel 505 so that the shaft 453 and its gear 455 can turn to allow the rack-bar 451, see Fig. 2, to descend and lower the winding mandrel 24 for the cop-tube C to make contact with the drive-roll 10. This action is accomplished by the rocking of the shafts 435 and 524 in the manner as explained above. When the shaft 435 is rocked in contraclockwise direction, as viewed in Fig. 47, the angular end 521 will be withdrawn from the shoulder 518 in the recess of the disk 515 and as the lever 520 rocks rearwardly it will engage the lug 576 on the snubber-lever 572, see Fig. 37, to withdraw the brake-shoe 570 from the periphery of the disk 515. Simultaneously, as the shaft 524 is rocked to latch the detent-means, as previously explained, the lever 563 on said shaft will be rocked in clockwise direction as viewed in Fig. 43 whereby to cause the link 560 to operate the bell-crank lifter-lever 553 in clockwise direction about its pivot 554. The lifter-lever 553 will thus be caused to engage under the hold-back pawl 550 to raise the latter and release it from the teeth on the ratchet-wheel 505. This action takes place at the last end of the downward motion of the reset-lever 590 and as the hold-back pawl 550 and snubber brake-shoe 570 are released the shaft 453 will be free to turn so that the weight of the arm 26 and the winding mandrel 24, see Figs. 1 and 2, will cause the arm to descend by gravity to slide the rack-back 451 downwardly in its casing 452 as it rotates the gear 455. As soon as the surface of the cop-tube C makes contact with the periphery of the drive-roll 10 it will be caused to rotate to wind on the yarn, and meanwhile the strand will be received in one of the grooves 14 of the roll to traverse it back and forth and deposit the yarn in helical coils on the cop-tube; it having been stated that the drive-roll 10 is rotated continuously by the shaft 11 driven from the power-means at the end of the gang machine.

As the yarn is deposited in layers on the cop-tube C the winding mandrel 24 recedes from the drive-roll 10 during the growth in diameter of the winding package as permitted by the swinging of the arm 26 about its pivot on the stud-shaft 29, see Fig. 2. It has been stated that the upward movement of the winding mandrel during the growth of the package is controlled by the snubbing action of the brake-shoe 570. After the starting or reset lever 590 has been depressed to latch the detent-means it is released and returns upwardly to a slight extent to allow the lever 520 to ride back into position with its projection 521 bearing against the periphery of the disk 515, which in the meantime has been turned back to first position as the cop-tube C descends into contact with the drive-roll 10. During this motion the lever 520 moves away from the lug 576 on the snubber-lever 572 to release the latter and cause its spring 573, see Fig. 43, to press the brake-shoe 570 against the periphery of the disk 515 to resist any vibration of the arm 26 and thereby prevent the winding package from jumping or bouncing on the drive-roll 10.

*Initiating the operation of end-finding and tying means*

During normal operation of the machine the breakage-lever 625 is maintained depressed in the position shown in Fig. 4 by the yarn *y* feeding above its crossbar 633 to the winding package. When, however, the yarn breaks or its supply is exhausted the breakage-lever 625 will be released and its weight 630 will cause it to tilt upwardly to rock its shaft 620 in contraclockwise direction as viewed in Fig. 55 and thereby swing the two-armed lever or yoke 635 downwardly to initiate the operation of the end-finding means. As the yoke 635 is rocked downwardly the pendant 690 on its arm 691 will be carried into position to be engaged by one of the pins 695 on the cycle drive-plate 478 and thereby rocked forwardly as shown in Fig. 53 into engagement with the rounded head 688 of the locking lever 685. Continued movement of the pendant 690 will thus act to rock the lever 685 and disengage its detent-shoulder 683 from the shoulder 679 on the actuator-disk 670 to release the latter for rotation. Concurrently therewith, the cam-actuator drive-pawl 698 is released from the lever 685 to allow its spring 700 to rock it in contraclockwise direction and thereby engage it with the periphery of the drive-plate 478. Consequently, as the drive-plate rotates the lug 702 on the lever 698 will be engaged in one of the notches 703 in the plate to drivingly connect the latter with the actuator-disk 670. The disk 670, being keyed to the cam-shaft 475, is thus caused to turn the latter to rotate the several cams mounted fast thereon. During this energization of the cam-shaft and its cams the roller 661 on the yoke 635 is carried into engagement with the periphery of the cam 645 at the low point on its periphery, but as the cam continues to rotate the roller will ride up on the high point of the cam and follow therearound to rock the yoke 635 upwardly and thereby depress the breakage-lever 625 to return it to its original position shown in Fig. 52 for engagement with the yarn *y* after its end has been retrieved.

*Package shifting*

During the first part of the rotation of the camshaft 475 the cam 365, see Fig. 29, acts on the roller 366 on the lever 367 to rock the link 30 about its pivot on the shaft 31 so as to shift the package P off from the drive-roll 10 and onto the rest 361 for arresting its rotation. The profile of the cam 365 is designed to cause the movement of the link 30 to halt for an interval while the package P contacts the rest 350; and then as the cam 365 continues its rotation the link 30 will be swung to shift the package P from the rest 360 onto the reverse-roll 15 for rotating it in a direction opposite from that in which it is rotated during the winding operation, see Fig. 30. It should be stated that the roller 366 is maintained bearing against the periphery of the cam 365 by the weight of the parts carried by the stud-shaft 29 which tends to swing the link 30 in clockwise direction, as viewed in Fig. 29, about its pivot 31.

It has been explained that the rotation of the cam 365 causes the pin 581 on its side to rock the lever 580 upwardly as shown in Figs. 29 and 30 so as to release the snubber-lever 572 and withdraw the brake-shoe 570 from the disk 515, thereby freeing the disk to allow the shaft 453 and gear 455 to turn, see Fig. 2, for permitting a slight longitudinal movement of the rack-bar 451.

*Operation of the package-nozzle*

As the package P is started to rotate by the reverse-roll 15, the suction-nozzle 185 is opened to retrieve the loose end of yarn from the package, see Fig. 17, by sliding the cover 210 through operation of the means previously described. This operation is performed by the shaft 240, see Figs. 34 and 35, which is rocked by the cam 310 engaging the roll 308 at the end of the arm 307. As has been explained, the shaft 240 rocks the member 241 to cause the pin 245 to actuate the lever 230 and thereby slide the cover 210 to the right to open it to the position illustrated in Fig. 17. At this juncture the suction-valve 190, see Figs. 19 and 20, is opened by the operation of the cam 205 to create a vacuum in the suction-nozzle 185 to draw the end of yarn from the package into the nozzle and therealong through its neck 211.

*Operation of package-beater*

During the rotation of the package P by the reverse-roll 15 the beater 370 comes into play as it is carried into operation by the rocking of the shaft 240. As previously explained, the pin 405 carried by the member 241 on the shaft 240 is released from the arm 402, see Fig. 35, which permits the frame 371 to swing by gravity and carry the roller 377 into contact with the periphery of the reverse-roll 15. The edge of the wiper-blade 370 will then be carried against the periphery of the package P and be oscillated to wipe along the surface thereof by the turning of the roll 377 and the eccentric motion of the pins 378. The effect of this wiper action is to release the end of yarn if it tends to adhere to the surface of the package P so as to assist in its withdrawal therefrom by the suction-nozzle 185. It has been explained that the brush 410 functions to prevent the broken end of yarn on the package from wrapping around the drive-roll 10, this being a precautionary provision for insuring that the end will be properly withdrawn from the package by the suction-nozzle 185.

*Operation of the yarn-ejector*

It has been explained that the yarn-ejector 250 is normally maintained in depressed relationship with its beak 257 extending across the bottom of the suction-nozzle 185, see Fig. 18, and during the retrieving of the yarn end from the package the pocket 215 at the end of the nozzle is closed. After the yarn end has been sucked into the nozzle, however, the cover 210 is slid to the left as shown in Fig. 18 to close the nozzle along its edge and the pocket 215 is simultaneously opened. It will be understood that as the yarn end is sucked lengthwise of the nozzle 185 and into its neck 211 it will be drawn across the beak 257 of the ejector 250 and while the pocket 215 at this end of the nozzle is open the ejector will be rocked upwardly to withdraw a loop in the yarn and carry it to the knot-tier 330 as indicated in Fig. 21.

The ejector 250 is rocked upwardly from the package-185 and then swung downwardly to carry it toward the knot-tier 330 by the reciprocation of the rack-bar 295, see Fig. 23, which turns the gear 294 and rotates the shaft 252. The rack-bar 295 is reciprocated by the lever 305, see Figs. 14 and 21, which is fast on the shaft 240 carrying the lever 307 with its roller 308 engaging the periphery of the cam 310 rotated by the cam-shaft 475. As the end of the ejector 250 swings downwardly toward the knot-tier 330 the loop of yarn will slide down its extension or arm 256 into engagement with the detent-projection 265 at the end of the arm, see Fig. 22. As this end of the ejector reaches a position opposite the bill of the knotter 330 the detent 265 is withdrawn by operation of the cam-means previously described so that the loop of yarn will slide off from the ejector and the bight therein engage around the bill of the knotter. Thereafter the ejector is swung back into substantially vertical position to move it out of the way of the tension-nozzle 155 which is being operated to retrieve the end of the supply yarn *y* to lay it across the loop of yarn previously deposited on the bill of the knotter by the ejector. Simultaneously with the operation of the ejector 250 the package is shifted back onto the rest 361 to arrest its reverse rotation.

*Operation of the tension-nozzle*

The tension-nozzle 155 is constantly under vacuum with its lower end connected through the opening 159, see Fig. 15, to the vacuum-duct 183 shown in Fig. 19, the cover 181 being closed against its mouth by the suction in the tube of the nozzle. It has been explained that the tube of the nozzle 155 is rotated in its bearings to swing its mouth down toward the tension-assembly by means of the beveled gear 168, see Fig. 14, rotated by the gear 169 on the shaft 170. The shaft 170 is rotated by the gear 171 which is turned by the quadrant 172 as the latter is rocked by the lever 176 carrying the roller 177 engaging the cam 179. The profile of the cam 179 is designed to rock the lever 176 and quadrant 172 in one direction to swing the mouth of the tension-nozzle down into the position shown in Fig. 16, and then as the cam continues its rotation the roller 177 rides down the incline from the high point on the cam to cause the mouth of the nozzle to swing back across the knot-tier. The spring 165 within the sleeve 163 on the nozzle 155 maintains the roller 177 against the periphery of the cam 179 and returns the nozzle into position beyond the knot-tier 330. As the nozzle 155 swings down across the tension-assembly the finger 180 on the cap or closure 181 rides along the upper edge of the cam-lever 150, see Figs. 6 to 10, to depress the lever while at the same time swinging the cap open.

During the winding operation the supply yarn *y* may be broken at either of the slub-catchers 95 by a slub, knot, or other enlargement on the strand that is prevented from passing between the blades and consequently causes the rupture. The broken yarn end *y* will remain tensioned by the disks 70 as the mouth of the nozzle 155 swings slightly beyond the inner end of the cam-lever 150, the cap or cover 181 being held open at this juncture by its finger 180 so that the suction in the nozzle will draw in the length of yarn leading from the tension-device to the slub-catchers. Immediately the end of the yarn *y* is sucked into the mouth of the nozzle 155 the continued movement of the latter will release the finger 180 from the cam-lever 150 to permit the cap 181 to close under the suction in the nozzle so as to seize the end of the yarn and hold it. At the end of this movement of the nozzle 155 it will engage the rod 129 on the clip-lever 120, which remains latched in its upright position, to tilt it slightly towards the left as viewed in Fig. 11 against the tension of its spring 125, shown in Fig. 12. The end of the yarn broken at the slub-catchers 95 will be drawn back into the nozzle as in the meantime the pivoted blades 98 have been swung open by the depression of the cam-lever 150 to rock the shaft 51. The opening of the slub-catcher blades 98 is effected by the levers 107, see Fig. 13, which are rocked with the shaft 51 to force the plunger-pins 105 upwardly and thereby cause them to act against the ears 103 on the blades and swing them to open position in the manner previously explained. This action takes place during the depression of the cam-lever 150 before the finger 180 rides off from the end of the cam 153, and immediately thereafter the cam-lever will be rocked upwardly under the tension of the spring 141, see Fig. 12, which surrounds the shaft 51 and operates on the hub of the lever 140. After the end of the nozzle 155 has seized the yarn *y* and moved to its extreme position in engagement with the rod 129 on the clip-lever 120 it is swung back in the opposite direction during the continued rotation of the cam 179 shown in Fig. 16. During this return motion of the suction-nozzle 155 the finger 180 on the cap 181 rides under the cam 153 on the lever 150 and by its engagement with the edge thereof lifts the lever to rock the shaft 51 in contra-clockwise direction as viewed in Fig. 10. The lever 80 on shaft 51 will thus be carried into engagement with the end of the pin 71 of the tension-device, see Fig. 9, to slide the latter upwardly and move its enlargement 73 against the weight or weights 74 so as to lift them and release their pressure on the upper tension-disk 70. This insures that the yarn will be properly threaded into position between the tension-disks.

*Cleaning tension-device and slub-catchers*

During the interval that the slub-catcher blades 98 are held open by the levers 107 and while the tension-disks 70 are separated slightly the pneumatic means are operated to release jets of air from the supply pipes 82 and 88, see Fig. 6, for cleaning these parts. This is accomplished by opening the valve 92 on the side of the frame 20, see Figs. 1 and 2, during the downward rocking motion of the lever 433, previously referred to. The lever 433 is rocked by the shaft 435 to cause the stud 588 to depress the plunger 93 and open the valve 92. A suitable source of compressed air is supplied to the valve 92 through the pipe 94, shown in Fig. 2, so that jets are emitted from the side of the pipe 88 and sprayed between the edges of the blades of the slub-catchers 95; and a series of jets from the circular portion of the pipe 82 are sprayed across the opposed faces of the tension-disks 70 to clean the lint and other foreign matter from their surfaces. An air jet is also emitted from an orifice in the end of the loop on the upright extension 83 of the pipe 82 to spray it across the grid 60 and fingers 63 to clean these elements. When the nozzle 155 swings away from the tension-assembly during its return movement the levers 107 and the lever 80 which have opened the slub-catchers and tension-device are both returned to first position as the cam-lever 150 drops back to its normal relationship. The pivoted blades 98 of the slub-catchers 95 will thus be released and returned to operative relationship as indicated in Fig. 13 and the pin 71 will be lowered to release the weights 74 so as to return the upper disk 70 into position to apply tension to the yarn.

*Applying end of supply yarn to knot-tier*

It has been stated that after the looped yarn from the package has been applied to the bill of the knotter 330 the ejector 250 is swung upwardly to permit the end of the suction-nozzle 155 to swing past the knotter and lay the yarn carried thereby across the loop previously applied by the ejector; it being understood that one length from the loop referred to above extends back to the package and the other end to the package-nozzle 185 as indicated in Figs. 21 and 28. The mouth of the nozzle 155 swings beyond the knot-tier 330 as shown in Fig. 28 to draw the yarn out and maintain it under tension until the knot is tied. At this point the knotter is operated by the lever 335 on the shaft 336, see Fig. 27, which is rocked by the lever 348 as its roller 349 follows the profile of the cam 350. The action of the cam 350 to rock the lever 348 is very rapid, thereby oscillating the lever 335 to raise the link 334 with a quick motion and operate the knotter in the usual manner to join the two lengths of yarn in a knot of preferred type and thereafter sever the ends therefrom. After the knot has been tied the mouth of the nozzle 155 is swung back toward the knotter 330 and the cap 181 at its end is opened by the engagement of its finger 180 with the cam 355 on the casing 296 of the ejector-mechanism, see Fig. 28; this engagement being effected when the casing 296 is in its lower position shown in Fig. 4. As previously explained, the casing 296 is fast on the rack-bar 295 and therefore descends with it when the ejector 250 is carried back to initial position in the package-nozzle 185. One waste end of yarn severed from the knot is disposed of as it is sucked through the nozzle 155 and down into the vacuum duct 183, while the other end cut from the knot is sucked back into the package-nozzle 185 and thence carried down through its valve 190 into the vacuum duct.

*Retrieving the reserve supply yarn*

When the yarn from the initially-delivering supply bobbin is exhausted the automatic end-finding means is actuated to retrieve the end of the spare supply yarn *y'* to carry it to the knotter for uniting it with the end from the package P. As the yarn *y* runs out its end from the supply bobbin is drawn from beneath the detector-fingers 63 to permit release of the latching means for the clip-lever 120 after the cam-lever 150 has been depressed.

As the mouth of the nozzle 155 swings toward the center of the tension-assembly the finger 180 on its cap 181 rides along the cam 153 and depresses the lever 150 so that the shaft 51 is rocked in clockwise direction as viewed in Figs. 9 and 10. During the rocking of the shaft 51 in this direction the bent end 149 of the lever 147 will engage the edge of the hooked lever 140, see Fig. 11, and rock the latter downwardly to release its cam-edge 145 from the finger 146 on the latching lever 135. As the latching lever 135 is released in this manner gravity causes it to swing downwardly into the position shown in Fig. 10, thereby rocking the shaft 50 in contraclockwise direction. The detector-fingers 63 will then be swung down through the slots in the grid 60, since no yarn remains thereunder to sustain them. As the shaft 50 is rocked contraclockwise the detention-lever 47 will likewise swing downwardly, see Fig. 9, to cause its end to pass under the yarn *y'* for releasing it to enter the slot 43 in the guide-plate 42 shown in Fig. 5. At this point the notched shoulder 57 on the slack-lever 55 applies a drag on the yarn and as the lever swings downwardly it takes up any slack in the yarn. Meanwhile, the lower arm 138 of the latching lever 135, see Fig. 11, has released the latching arm 128 to cause the latter to swing into the position shown in Fig. 10 and engage against the limiting stud 126. The clip-lever 120 is thus released to cause its spring 125 to rock it downwardly and carry the end of the yarn *y'* held in the clip 121 into position to be sucked into the mouth of the nozzle 155 as the latter continues its movement along the cam 153 on the lever 150. As the clip-lever 120 is swung downwardly in this manner it will draw the yarn *y'* laterally against the upright extension 83 of the guide 82 at the side of the tension-disks 70. Continued movement of the suction-nozzle 155 while its cap 181 is still open will cause the yarn to be sucked into the nozzle and as soon as the finger 180 on the cap rides off from the end of the cam 153 the cap will be closed by the suction to seize the yarn *y'* against the mouth of the nozzle.

As before explained, the tension-nozzle 155 continues its movement across the tension-assembly to engage it with the rod 129 on the clip-lever 120 and swing said lever back slightly beyond its vertical position to cause it to be cocked by the latching means. When the clip-lever 120 is rocked in contraclockwise direction against the tension of its spring 125 its latching arm 128 is swung upwardly and as the finger 180 on the cap 181 rides off from the end of the cam 153 the spring 141, see Fig. 12, rocks the hooked lever 140 and shaft 51 contraclockwise to engage the lever with the bent end 149 of the lever 147. The hooked lever 140 is thus swung upwardly to cause the end of its hooked portion to contact the finger 146 on the lever 145, see Fig. 10. Continued movement of the nozzle 155 against the rod 129 on the clip-lever 120 will swing the bent end 127 of the latching arm 128 against the upper arm 136 of the latching lever 135 to rock it in clockwise direction and cause the finger 146 to slide off from the end of the hooked lever 140 and engage the cam-edge 145, see Fig. 11, to retain the shaft 50 in its initial position. As the shaft 50 is rocked clockwise the detention-lever 47, the slack-yarn take-up lever 55, and the detector-fingers 63 will also be rocked clockwise to restore them to initial position. At this juncture the clip-lever 120 will have rocked to its extreme rearward position and the nozzle 155 will have completed its movement across the tension-assembly. Then as the nozzle 155 starts to swing back in the opposite direction the clip-lever 120 is released so that the latching arm 128 will be rocked downwardly to engage its bent end 127 across the lower arm 138 of the latching lever 135 as shown in Fig. 11 to hold the clip-lever cocked in vertical position. During the movement of the nozzle 155 back towards the knotter the spare yarn *y'* will be drawn under the circular portion of the guide-tube 82 to thread it between the tension-disks 70, and as the yarn slides along the upper edge of the guide-member 65 and down across its vertical edge it will be drawn in under the detector-fingers 63 to the delivering position shown in Fig. 6.

After the spare yarn *y'* has been seized by the nozzle 155 it is carried thereby back to the knotter 330 and laid across the loop of yarn from the package which has already been applied to the bill of the knotter 330 in the manner first explained. The knotter is then operated to join the two ends of the yarn for continuing the winding operation in the manner as previously explained. With the tension-assembly elements restored to initial position a fresh bobbin is supplied, the yarn therefrom threaded through the guiding means and its end fastened in the clip 121 on the lever 120 to make it ready for retrieving and joining to the end on the package when the previously-joined end is exhausted from the supply bobbin.

*Repeating the end-finding and knot-tying operations*

As has been stated, the operation of the end-finding and knot-tying means is repeated automatically should the first operation fail to properly join the yarn from the supply to the end on the package. This repeat operation is performed by the instrumentalities previously described that are actuated in the manner as next explained. After the cam-shaft 475 has been energized as previously explained and the correlated elements actuated therefrom to retrieve the ends of the yarn and join them in a knot, if these operations are accomplished successfully, then the parts are restored to their initial position first described. As the cam-shaft 475 continues to rotate with the locking-lever 685 engaged with the drive-plate 478 the shoulder 683 at the end of the flange 687 on the locking lever 685 rides on the periphery of the actuator-disk 670. Eventually, the shoulder 683 on the flange 687 will be carried into the recess in the periphery of the actuator-disk as the tension of the spring 692 rocks the lever 685, and will first engage with the beak 699 of the driver-pawl 698 to rock said pawl and release its lug 702 from the slot 703 in the drive-plate 478 with which it is engaged, see Fig. 62. By this action the actuator-disk 670 is disconnected from the drive-plate 478 and the shoulder 683 on the lever 685 is engaged with the shoulder 679 on the disk to arrest its rotation and thereby the turning of the cam-shaft 475. Should failure ensue, however, that is, if the end-finding means or the knotter misses so that the ends of the yarn are not properly joined, the following cycle of operations takes place.

Referring to Fig. 56, should the breakage-lever 635, see Fig. 53, remain with its crossbar 633 raised the breakage-lever yoke 635 will be depressed so that the pendant 638 will be in position to be struck by the pin 640 on the breakage-lever cam 645 and the rotation of the cam will force the pendant against the notched end of the arm 607 on the latch-lever 605 to rock the latter slightly into the position shown in Fig. 57. Under this action the squared end of the detent-pin 615 will be released from the first tooth or step 611 on the latch-lever 605 and engage with the second step 612. The detent-means will thus be maintained in engagement to continue the parts in connection for repeating the operation of the end-finding and knot-tying means. It will be understood that immediately after the operation of the pendant 638, the previously-mentioned pendant 690, see Fig. 55, comes into action again to engage the rounded head of the locking lever 685 and hold it out so as to prevent the engagement of its shoulder 683 with the beak 699 of the driver-pawl 698. Therefore, the cam-shaft will continue to rotate and the operation of the end-finding means and knot-tier will thus be repeated in the manner as first explained.

If the tying operation is completed during either the first or second attempt then certain instrumentalities come into play to recock the latching lever 605 in initial relationship as shown in Fig. 60. This takes place when the breakage-lever 625 is depressed and the breakage-lever yoke 635 is raised as shown in this latter view, the L-shaped pendant 650 then being elevated into position to cause it to be rocked by the pin 640 on the cam 478 whereof to engage its end with the arm 651 that is pivoted to the recocking lever 653. The pendant 650 will thus be caused to rock the recocking lever 653 to cause it to swing the detent-lever 616 in contraclockwise direction so as to release the detent-pin 615 from either step 611 or 612 on the latching lever 605. This action is effected by the engagement of the slot 657 in the lower end of the recocking lever 653 with the pin 658 on the detent-lever 616, see Fig. 52 where the parts last described are shown as viewed in the opposite direction from that of Fig. 60. As the detent-pin 615 is released from either step on the latching lever 605 the spring 610 will rock the latter to return it to initial position as shown in Fig. 60 so as to restore the parts to their original relationship when the winding unit is operating normally.

*Failure of second attempt to join the ends*

Should the second attempt to join the ends of the yarn fail, then the elements last referred to come into action again when the detent-pin 615 is engaged with the second tooth 612 on the latching lever 605. If the cross-bar 633 of the breakage-lever 625 remains released and raised then the breakage-lever yoke 635 will be depressed as shown by dotted lines in Fig. 58 so that the L-shaped pendant 650 will clear the end of the arm 651 on the recocking lever 653. Consequently, the pin 640 on the breakage-lever cam 645 will come into action to engage the pendant 638, see Fig. 57, and cause it to rock the latching lever 605 to entirely release the detent-pin 615 from the step 612, see Fig. 58, and thereby free the detent lever 616 to be rocked clockwise by its spring 617. The detent-lever 616 is fast on the rock-shaft 524 and thereby it acts through the instrumentalities previously described to lift the package P off from the drive-roll 10 and arrest the winding operation.

*Lifting the package off from the drive-roll*

When the shaft 524 is rocked in clockwise direction as viewed in Fig. 58 and contraclockwise as viewed in Fig. 48, and the arm 537 on the safety lever 536 is free from the anvil 533, the trigger 525 will be rocked to raise its ledge or shelf 528. Then when the oscillator 500 has been swung to the position shown in this last-mentioned view the pin 510 on the tail of the pawl 506 will be engaged under the shelf 528 to thereby rock the pawl 506 and engage it with one of the teeth on the ratchet-disk 505. Consequently, at the next motion of the oscillator 500 its depending portion 507 will actuate the pawl 506 to advance the ratchet-disk 505 in contraclockwise direction as viewed in Fig. 50. Meanwhile, the link 560 connected to the lever 563, see Figs. 43 and 44, will rock the lifter-pawl 553 contraclockwise to release the hold-back pawl 550 and permit it to engage the teeth on the ratchet-disk 505 so as to prevent retrogressive turning of the shaft 453 on which the disk is fast. The shaft 453 will therefore be rotated contraclockwise as viewed in Fig. 50 to turn the gear 455, see Fig. 2, and slide the rack-bar 451 upwardly. It has been explained that the lever 450 is connected to the package-carrying arm 26 through the bearing 28 so that the upward movement of the rack-bar will lift the package P off from the drive-roll 10 to arrest the winding operation. It will be understood that during this last-explained operation the projection 521 on the arm 520 is riding on the cylindrical periphery of the disk 515 since the recess in its edge has not been advanced at this point to allow the projection 521 to drop into said recess. The winding operation is thus arrested when the end-finding and knot-tying means fail to join the ends of the yarn during the repeat operation. The winding unit must then be tended manually to correct the difficulty; whereafter the machine may be started again by depressing the reset-lever 590 to restore the automatic mechanism to operative condition.

*Lifting the completed package from the drive-roll*

Figure 46:
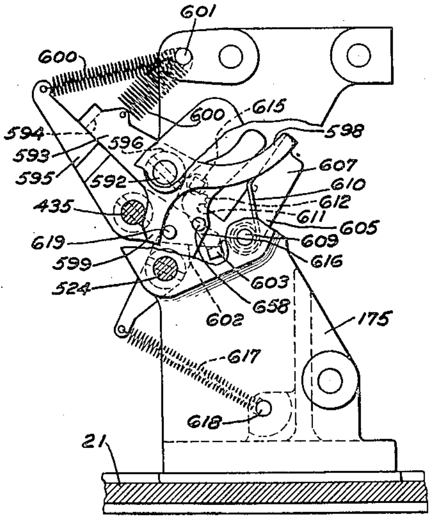
Fig. 46 is a similar view showing the detent-means unlatched.

When the package P reaches the predetermined size the projection 521 on the curved lever 520 will drop into the recess on the disk 515 to rock the shaft 435 and the sizing lever 595, see Fig. 46. The arm 602 on the lever 595 will then force the lug 603 on the latch-lever 605 downwardly to rock the lever 605 contraclockwise, as viewed in Fig. 46, and release the squared pin 615 on the lever 616 from the step 611 or 612 on the latch-lever 605 to cause the shaft 524 to be rocked. It will be understood that when the squared pin 615 on the lever 616 is disengaged from the step 611 or 612 on the latch-lever 605, the latching means becomes inoperative and must be re-engaged by the reset lever 590 to start the winding operation. The rocking of the shaft 524 operates the means above described to cause the pawl 506 to turn the ratchet-disk 505 and thereby rotate the gear 455 for sliding the rack-bar 451 upwardly. The lever 450 connected to the rack-bar 451 will thus be swung upwardly to raise the arm 26 and lift the package P off from the drive-roll 10.

*Adjusting the machine for packages of different size*

It has been explained that to control the size of the package P to be wound the lever 450, see Fig. 2, is adjusted angularly in relation to the package-carrying arm 26 so that the upward sliding movement of the rack-bar 451 will turn the gear 455 and shaft 453 for rotating the disk 515, shown in Fig. 47, to a position to allow the projection 521 on the lever 520 to enter the recess in the disk and engage with the shoulder 518. It will be understood that this adjustment is made by raising the arm 26 above the drive-roll 10 in proportion to the diameter of the package P when completed. With the disk 515 in the position shown in Fig. 47 or 48 the rack-bar 451 will be in its upper position as shown in Fig. 2 with the lever 450 held raised. The screw 36 is first unscrewed to release the bushings 35, see Fig. 3, from engagement with the sleeve 33 to free the package-carrying arm 26 for turning its bearing 28 on the sleeve. The arm 26 is then adjusted in height to locate the surface of the cop-tube C a certain distance from the periphery of the drive-roll 10 in proportion to the diameter of the package to be produced. This may be accomplished by using a measuring gauge between the periphery of the drive-roll 10 and the surface of the cop-tube C. The reset lever 590 may then be manually depressed to disengage the lever 520 from the shoulder 518 on the disk 515 while also rocking the snubber-lever to release the brake-shoe 570 and allow the disk 515 and ratchet-disk 505 to rotate in clockwise direction for sliding the bar 451 downwardly so as to lower the arm 26 and place the cop-tube C in surface contact with the drive-roll 10.

After each package is completed it is removed from the winding mandrel 24, a new cop-tube C applied thereto, the supply yarn attached to the cop-tube and the machine started to operate again by manually depressing the reset lever 590 to lower the cop-tube into contact with the drive-roll 10. The machine will then operate as previously explained to wind a new package with the end-finding and knot-tying mechanism functioning automatically as required.

While the machine is herein shown and described as embodied in a preferred form of construction, modifications may be made in the structure and arrangement of its mechanisms within the scope of the invention as expressed in the following claims. Therefore, without limiting ourselves in this respect, we claim:

1. In a winding machine comprising means for rotating a package to wind yarn thereon, end-finding means operative when the feeding yarn breaks or its supply is exhausted to retrieve the end from the package and the end of the supply yarn, a knotter, means to carry said ends to the knotter, means to operate the knotter to unite the ends for continuing the winding operation, and automatically-actuated detent-means for maintaining the end-finding means and knotter in operation to repeat the cycle of operations for uniting the ends when the first attempt to join the ends is unsuccessful.

2. In a winding machine comprising means for rotating a package to wind yarn thereon, means for guiding a supply yarn to the package, a knotter, end-finding means operative on the package to retrieve the end of the yarn therefrom, separate end-finding means for retrieving the end of the supply yarn from the guiding means, means to operate said end-finding means to carry said ends to the knotter, and automatically actuated detent-means operative with a step-by-step action to repeat the operation of the end-finding means and knotter when one operation thereof fails to join the ends.

3. In a winding machine having means for rotating a package and means for traversing yarn on the package, the combination of end-finding means for retrieving the end of the yarn from the package, separate end-finding means for retrieving the end of the supply yarn, a knot-tier, means for carrying the ends to the knot-tier, means for operating the knot-tier to join the ends, detent-means automatically brought into action to repeat the operation of the end-finding means and knot-tier when one operation fails through any cause to join the ends, said detent-means operative successively with a step-by-step action, and means to restart the winding operation when the ends are joined.

4. In a winding machine comprising means for rotating a package and traversing yarn thereon, the combination of suction-means for retrieving the end of the yarn from the package, separate suction-means for retrieving the end from the supply, a knot-tier, means for operating the end-retrieving means to carry the ends to the knot-tier, means for operating the knot-tier to join the ends, and automatically-operated means having a plurality of detent-steps engageable successively for repeating the operation of the end-finding means and knot-tier whenever one operation thereof fails to join the ends.

5. In a winding machine, means for rotatably supporting a package, a roll for rotating said package to wind yarn thereon, a second roll for rotating the package in reverse direction, means for shifting the package from the first roll to the second roll to reverse its rotation, means between said rolls engageable with the periphery of the package as it is shifted from the first roll to the second roll for arresting its rotation, means for retrieving the end of the yarn from the package during the reverse rotation thereof, means for retrieving the end of the supply yarn, a knot-tier, means for applying said ends to the knot-tier, and means for operating the knot-tier to join the ends.

6. In a winding machine, means for rotatably supporting a package, a drive-roll for rotating the package, a reverse-roll for rotating the package in the opposite direction from that in which it is driven by the drive-roll, means for shifting the package from the drive-roll to the reverse-roll, means between the drive-roll and reverse-roll engageable with the package during its transfer from one roll to the other roll to arrest its rotation, end-finding means for retrieving the end of the yarn from the package during its rotation, end-finding means for retrieving the end of the supply yarn, a knot-tier, means for carrying the ends of the yarn to the knot-tier, and means to operate the knot-tier for joining the ends.

7. In a winding machine comprising means for rotatively supporting a package, a drive-roll for rotating the package to wind yarn thereon, a reverse-roll for rotating the package in the opposite direction from that in which it is driven by the drive-roll, a rest between the drive-roll and reverse-roll, means for shifting the package from the drive-roll to the rest to retard its rotation, means for shifting the package from the rest to the reverse-roll, end-finding means for retrieving the end of the yarn from the package and the end of the supply yarn, a knot-tier, means for applying said ends to the knot-tier to join the ends, means for returning the package from the reverse-roll to the rest to retard its rotation, and means for shifting the package from the rest to the drive-roll.

8. In a winding machine comprising means for rotatively supporting a package, a drive-roll for rotating the package to wind yarn thereon, a reverse-roll for rotating the package in the opposite direction from that in which it is driven by the drive-roll, a rest, means for shifting the package from the drive-roll to the rest to arrest its rotation, means for shifting the package from the rest to the reverse-roll to rotate it in the opposite direction from that in which it is driven by the drive-roll, a stationary suction-nozzle for retrieving the end of the yarn on the package as it is rotated by the reverse-roll, a second suction-means for retrieving the end of the supply-yarn, a knot-tier, means for transferring said ends to the knot-tier, means for operating the knot-tier to join the ends, and means for returning the package to the drive-roll to continue the winding operation.

9. In a winding machine, means for rotatively supporting a package, a drive-roll for rotating the package to wind yarn thereon, a reverse-roll for rotating the package in the opposite direction from that in which it is rotated by the drive-roll, a stationary rest between said rolls, means for shifting the package from the drive-roll to engage it with the rest for arresting its rotation, means for shifting the package from the rest to the reverse-roll, a stationary suction-nozzle for retrieving the end of the yarn from the package as it is rotated by the reverse-roll, a knot-tier, means to carry the yarn from the nozzle to the knot-tier, a movable suction-nozzle for retrieving the end of the supply yarn, means to move said nozzle to carry said end to the knot-tier, and means to operate the knot-tier for joining the ends of the yarn.

10. In a winding machine comprising means for rotating the package to wind yarn thereon, means operative when the yarn breaks or its supply is exhausted to reverse the rotation of the package, a flexible wiper-blade extending the full length of the package and engageable with the surface thereof during its reverse rotation, means to oscillate said wiper-blade to release the end from the surface of the package, a knot-tier, means for retrieving the end of the yarn from the package and applying it to the knot-tier, means for retrieving the end of the supply yarn and applying it to the knot-tier, and means to operate the knot-tier for joining said ends.

11. In a winding machine comprising means for rotatably supporting a package, a drive-roll for rotating the package to wind yarn thereon, a reverse-roll for rotating the package in the opposite direction, a wiper extending the full length of the package for contacting the surface thereof during its reverse rotation, means operated by rotation of the reverse-roll for oscillating the wiper to cause it to wipe the surface of the package to free the end of the yarn therefrom, a knot-tier, end-finding means for retrieving the end of the yarn from the package and the end of the supply yarn and applying said ends to the knot-tier, and means for operating the knot-tier to join said ends.

12. In a winding machine comprising means for rotatively supporting a package, a drive-roll for rotating the package to wind yarn thereon, a reverse-roll for rotating the package in the opposite direction, a resilient wiper-blade arranged with its flexible edge extending the full length of the surface of the package, means for normally supporting said blade disengaged from the surface of the package, means for oscillating said blade to cause it to wipe the surface of the package to free the end of the yarn therefrom, means for engaging said operating means with the reverse-roll to oscillate the wiper-blade, a knot-tier, means for retrieving the end of the yarn from the package and the end of the supply yarn and applying said ends to the knot-tier, and means for operating the knot-tier to join the ends.

13. In a winding machine comprising means for rotating a package to wind yarn thereon, a reverse-roll for rotating the package in the opposite direction when the yarn is broken or its supply exhausted, a pivoted frame, a wiper-blade carried by said frame extending the full length of the package, means for moving said frame to contact the wiper-blade with the package, and means to oscillate said frame to cause the blade to wipe the surface of the package to free the end of the yarn therefrom.

14. In a winding machine comprising means for rotating a package to wind yarn thereon, means for rotating the package in reverse direction when the yarn is broken or its supply exhausted, a rockably-mounted frame, a wiper-blade carried by said frame extending the full length of the package for engagement with the surface thereof, and means for engaging the wiper-blade with the package during its reverse rotation and oscillating the frame to cause the blade to wipe the surface of the package to free the end of the yarn therefrom.

15. In a winding machine comprising means for rotating a package to wind yarn thereon, a stationary suction-nozzle located adjacent the winding package and having an opening extending longitudinally thereof, a cover for closing the opening in the nozzle, means for actuating the cover to open the nozzle for retrieving the end of the yarn from the surface of the package, means to induce a vacuum in the suction-nozzle, means to close the cover along its edge while leaving an opening at its end, an ejector normally maintained within the nozzle, a knot-tier, and means for withdrawing the ejector from the nozzle to carry a loop of the yarn to the knot-tier.

16. In a winding machine comprising means for rotating a package to wind yarn thereon, a trough-like suction-nozzle extending adjacent the surface of the winding package and formed with a pocket at its end, a cover for closing the open side of the nozzle while leaving an opening above the pocket at its end, ejector-means normally located within the pocket at the end of the nozzle, means for moving the cover to open a slit along its side and close the opening to the pocket at its end, means operative to move the cover to close the opening along its side and open the pocket at its end, a knot-tier, and means for operating the yarn-ejector to withdraw the yarn from the nozzle and carry it to the knot-tier for joinder with the end of the supply yarn.

17. In a winding machine comprising means for rotating a package to wind yarn thereon, the combination of a stationary trough-shaped suction-nozzle for retrieving the loose end of the yarn on the package, said suction-nozzle extending longitudinally of the surface of the package and formed with a recessed pocket at one end, a pivoted ejector having its end normally positioned within the recess of the pocket at the end of the suction-nozzle, a cover for closing the nozzle along its length while leaving an opening above the pocket at its end, means to actuate the cover to open a slit along its length and close the opening to the pocket at its end, means to shift the cover to close the slit along its length and open the pocket at its end, and means to actuate the ejector to withdraw a loop of the yarn from the nozzle through the opening at its end.

18. In a suction-means for a winding machine of the type indicated, a trough-shaped nozzle formed with a pocket at one end with a recess in the bottom of the nozzle, a cover slidable on the nozzle to open and close a slit along its longitudinal edge, means for sliding said cover to open the slit along its edge and close the opening to the pocket at its end, and means to slide the cover to close the slit along its edge and open the pocket at its end.

19. Suction-means for a winding machine of the type indicated comprising a trough-shaped nozzle with a hollow neck extending from its end, vacuum means for exhausting the air from the nozzle through the neck at its end, said nozzle having a depressed pocket at one end adjacent its hollow neck, a cover movable on the nozzle to open a slit along its longitudinal edge while closing the entrance to the pocket at its end, means to move the cover to close said slit and open the pocket at the end of the nozzle, an ejector-member adapted to be entered into the pocket at the end of the nozzle beneath a length of yarn drawn thereinto through the slit, and means to retract the ejector-means to withdraw the length of yarn extending through the nozzle and into its neck.

20. In a winding machine comprising means for rotating a package and winding yarn thereon, a trough-like suction-nozzle extending longitudinally adjacent the surface of the package, means to induce a vacuum in said nozzle, a pivotally-mounted ejector-arm formed with a laterally-extending portion with a beak at its end, means to enter said ejector-arm into the nozzle to dispose its beak across the bottom thereof, means for opening a slit along the edge of the nozzle for receiving the end of the yarn on the package, a knot-tier, and means to rock the ejector-arm to cause its beak to withdraw the yarn from the nozzle and carry it to the knot-tier for joining it to the end of a supply yarn.

21. In a winding machine having means for rotating a package to wind yarn thereon, a knot-tier, end-finding means for retrieving the end of the supply yarn and the end of the yarn on the package and applying said ends to the knot-tier, means for operating the end-finding means and knot-tier to unite said ends, cams for actuating the operating means for the end-finding means and knot-tier, driving means for rotating said cams, means actuated by the breakage of the yarn feeding to the package or exhaustion of its supply to connect the cams for rotation by the driving means, and automatically-operated detent-means brought into action to continue the connection between the cams and their driving means for successively repeating the operation of the end-finding means and knot-tier upon failure thereof to unite the ends of the yarn.

22. In a winding machine having means for rotating a package to wind yarn thereon, a knot-tier, end-finding means for retrieving the end of the supply strand and the end on the package and applying said ends to the knot-tier, a series of separate cams for operating said end-finding means and knot-tier, a shaft for rotating said cams, a gear normally rotatable on said shaft, means for continuously driving said gear, means actuated by breakage of the yarn feeding to the package or exhaustion of its supply to connect the gear to rotate the cam-shaft, and detent-means operative successively to continue the driving connection between the gear and cam-shaft upon failure of the knot-tier to join the ends of the yarn.

23. In a winding machine having means for rotating a package to wind yarn thereon, the combination therewith of a knot-tier, end-finding means for retrieving the end of the supply yarn and the end of the yarn on the package and applying said ends to the knot-tier, a control-unit for operating said end-finding means and knot-tier, a series of cams in said control-unit, driving means for rotating said cams, a breakage-lever normally maintained inoperative by the yarn engaging therewith as it feeds to the package, means actuated by the release of said breakage-lever from the yarn to connect the driving means with the control-unit to rotate the cams, detent-means operative successively to repeat the operation of the end-finding means and knot-tier when the first operation thereof fails to unite the ends, and means to restore said breakage-lever to first position for engagement with the yarn when the ends are united whereby to continue the winding operation.

24. In a winding machine having means for rotating a package to wind yarn thereon, the combination therewith of a knot-tier, end-finding means for retrieving the end of the supply yarn and the end of the yarn on the package and applying said ends to the knot-tier, control-means for operating said end-finding means and knot-tier, a series of cams in said control-means, driving means for rotating said cams, a breakage-lever normally maintained inoperative by the yarn engaging therewith as it feeds to the package, means actuated by release of said breakage-lever from the yarn to connect the driving means for rotating the cams, means to restore said breakage-lever to first position for engagement with the yarn when the ends are united to continue the winding operation, and means to maintain the driving means in connection with the control-means when the first attempt to unite the ends is unsuccessful as to repeat the operation of the end-finding means and knot-tier.

25. In a winding machine having means for rotating a package to wind yarn thereon, a knot-tier, end-finding means for retrieving the end of the supply yarn and the end of the yarn on the package and applying said ends to the knot-tier, cam-means for operating the end-finding means and knot-tier, normally inoperative means for driving said cam-means, means for connecting said driving means to drive the cam-means, means actuated by the breakage of the yarn or exhaustion of its supply to operate said connecting means, means to continue the connection between the driving means and the cam-means if the first attempt to unite the ends of the yarn is unsuccessful, and means to arrest the rotation of the winding package when a second attempt to unite the ends of the yarn is unsuccessful.

26. In a winding machine having means for rotating a package to wind yarn thereon, a knot-tier, end-finding means for retrieving the end of the supply yarn and the end of the yarn on the package and applying said ends to the knot-tier, control-means for operating said end-finding means and knot-tier, means actuated by the breakage of the yarn or exhaustion of its supply to initiate the operation of the control-means to effect the joinder of the yarn ends, means operative upon failure to join the ends of the yarn to continue the operation of the control-means, and means to arrest the operation of the machine upon failure of the end-finding means and knot-tier to unite the ends when the operation of the control-means is continued.

27. In a winding machine having means for rotating a package to wind yarn thereon, the combination of a knot-tier, end-finding means for retrieving the end of the supply yarn and the end of the yarn on the package to apply them to the knot-tier, means for operating the end-finding means and knot-tier to unite the ends of the yarn, control means actuated by breakage of the yarn feeding to the package or exhaustion of its supply to initiate the operation of the end-finding means and knot-tier, detent-means for maintaining said control-means operative including a member having two steps, means to shift the detent-means from the first step to the second step on said member when the first attempt to unite the ends is unsuccessful to continue the operation of the control-means, and means to return the detent-means into engagement with the first step after the second attempt to unite the ends is successful.

28. In a winding machine having means for rotating a package to wind yarn thereon, the combination of a knot-tier, end-finding means for retrieving the end of the supply yarn and the end of the yarn on the package to apply said ends to the knot-tier, means for operating the end-finding means and knot-tier to unite the ends of the yarn, control-means actuated by breakage of the yarn feeding to the package or exhaustion of its supply to initiate the operation of the control-means, detent-means for maintaining the control means operative including a member having two steps, means to shift the detent-means from the first step on said member to the second step when the first attempt to unite the ends is unsuccessful to thereby continue the operation of the control-means, means to return the detent-means into engagement with the first step when the second attempt to unit the ends is successful, and means for releasing said detent-means to arrest the winding operation when the second attempt to unite the ends is unsuccessful.

29. In a winding machine having means for rotating a package to wind yarn thereon, a knot-tier, end-finding means for retrieving the end of the supply yarn and the end on the package and applying said ends to the knot-tier, a plurality of cams for operating the end-finding means and knot-tier, a shaft for rotating said cams, a disk fast on said shaft, a second disk rotatable on said shaft, power-operated means for rotating the second disk, a pawl on one of said disks engageable with the other disk to rotate the cam-shaft, and means operative by breakage of the yarn feeding to the package or exhaustion of its supply whereby to engage the pawl with said disk for rotating the cams to actuate the end-finding means and knot-tier.

30. In a machine having means for rotating a package to wind yarn thereon, the combination of a knot-tier, end-finding means for retrieving the end of the supply yarn and the end on the package and applying them to the knot-tier, a control-unit comprising a plurality of cams for operating said end-finding means and knot-tier, a shaft for rotating said cams, hold-back means for preventing rotation of the cam-shaft, a drive-member rotatable on said cam-shaft and formed with notches in its periphery, an actuator-disk keyed to the cam-shaft for rotating the cams, a driver-pawl pivoted to the actuator-disk and having means for engagement with the notches in the actuator-disk, a breakage-lever normally held inoperative by the engagement of the feeding yarn therewith, and means operative by the breakage-lever to release the hold-back means for the cam-shaft and cause the pawl to be rocked to engage it with one of the notches in the actuator-disk for rotating the cam-shaft.

31. In a winding machine having driving means for rotating a package to wind yarn thereon, a knot-tier, end-finding means for retrieving the end of the supply yarn and the end on the package and applying said ends to the knot-tier, means to operate the end-finding means and knot-tier for uniting said ends, means for connecting said operating means for the end-finding means and knot-tier to the driving means of the machine, means actuated by the breakage of the yarn feeding to the package or exhaustion of its supply to operate said connecting means, and detent-means automatically-operated with a step-by-step action to continue the connection between the driving means and the end-finding means and knot-tier upon failure of said knot-tier to unite the ends of the yarn.

32. In a winding machine having means for rotating a package to wind yarn thereon, the combination therewith of a knot-tier, end-finding means for retrieving the end of the supply yarn and the end of the yarn on the package and applying said ends to the knot-tier, power means for operating said end-finding means and knot-tier, a breakage-lever normally maintained inoperative by the yarn engaging therewith as it feeds to the package, means actuated by release of said breakage-lever from the yarn to initiate the operation of said end-finding means and knot-tier, means to restore said breakage-lever to first position for engagement with the yarn when the ends are united whereby to continue the winding operation, and detent-means for maintaining the power means in connection with the means for operating the end-finding means and knot-tier for a predetermined number of repeat operations if the first attempt to unite the ends is unsuccessful.

References Cited in the file of this patent

UNITED STATES PATENTS 1,443,875 Glazier et al. ____________ Jan. 30, 1923

(Other references on following page)

| | | |
|---|---|---|
| 1,498,252 | Vickers | June 17, 1924 |
| 1,616,896 | Greenhill | Feb. 8, 1927 |
| 1,882,539 | Anderson | Oct. 11, 1932 |
| 2,053,296 | Marcellus | Sept. 8, 1936 |
| 2,177,680 | Abbott | Oct. 31, 1939 |
| 2,208,930 | Kahlisch | July 23, 1940 |
| 2,273,241 | Winslow | Feb. 17, 1942 |
| 2,306,871 | Esser et al. | Dec. 29, 1942 |
| 2,309,085 | Abbott | Jan. 26, 1943 |
| 2,338,914 | Esser et al. | Jan. 11, 1944 |
| 2,365,701 | Higgins | Dec. 26, 1944 |
| 2,395,464 | Cotchett | Feb. 26, 1946 |
| 2,395,465 | Cotchett et al. | Feb. 26, 1946 |
| 2,438,034 | Brugger | Mar. 16, 1948 |
| 2,443,002 | Giffin et al. | June 8, 1948 |
| 2,450,074 | Bartholomew | Sept. 28, 1948 |
| 2,675,971 | Abbott | Apr. 20, 1954 |

FOREIGN PATENTS

| | | |
|---|---|---|
| 65,949 | Denmark | Nov. 24, 1947 |
| 123,902 | Sweden | Jan. 25, 1949 |
| 652,311 | Great Britain | Apr. 18, 1951 |